United States Patent
Hiramatsu et al.

(10) Patent No.: US 8,013,694 B2
(45) Date of Patent: Sep. 6, 2011

(54) DIELECTRIC WAVEGUIDE DEVICE, PHASE SHIFTER, HIGH FREQUENCY SWITCH, AND ATTENUATOR PROVIDED WITH DIELECTRIC WAVEGUIDE DEVICE, HIGH FREQUENCY TRANSMITTER, HIGH FREQUENCY RECEIVER, HIGH FREQUENCY TRANSCEIVER, RADAR DEVICE, ARRAY ANTENNA, AND METHOD OF MANUFACTURING DIELECTRIC WAVEGUIDE DEVICE

(75) Inventors: Nobuki Hiramatsu, Soraku-gun (JP); Djuniadi A. Sagala, Soraku-gun (JP); Tetsuya Kishino, Soraku-gun (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/295,586

(22) PCT Filed: Mar. 30, 2007

(86) PCT No.: PCT/JP2007/057287
§ 371 (c)(1),
(2), (4) Date: Jan. 30, 2009

(87) PCT Pub. No.: WO2007/114391
PCT Pub. Date: Oct. 11, 2007

(65) Prior Publication Data
US 2009/0174499 A1    Jul. 9, 2009

(30) Foreign Application Priority Data

Mar. 31, 2006 (JP) ............................ P2006-101040
Apr. 28, 2006 (JP) ............................ P2006-127023

(51) Int. Cl.
*H01P 3/00* (2006.01)
(52) U.S. Cl. .................... 333/239; 333/208; 342/146

(58) Field of Classification Search .......... 342/118–146; 333/24 R, 81, 167, 174
See application file for complete search history.

(56) References Cited

U.S. PATENT DOCUMENTS 5,495,252 A * 2/1996 Adler ............................ 342/127
(Continued)

FOREIGN PATENT DOCUMENTS

JP    08-102604    4/1996
(Continued)

OTHER PUBLICATIONS

Japanese language office action and its English language translation for corresponding Japanese application 2006101040 lists the references above.

(Continued)

*Primary Examiner* — Thomas H Tarcza
*Assistant Examiner* — Timothy A Brainard
(74) *Attorney, Agent, or Firm* — DLA Piper LLP (US)

(57) ABSTRACT

The invention relates to a small and low-voltage operable dielectric waveguide device. First and second electrode are embedded in a dielectric part and are formed to be thinner than a skin depth for a frequency of electromagnetic wave propagating along a first dielectric part included in the dielectric part. Thereby, even if the first and second electrodes are arranged to be in contact with the first dielectric part, the propagating electromagnetic wave can transmit the first and second electrodes, and therefore the electromagnetic wave can propagate without being cut off and there is no influence on waveguide modes of the electromagnetic wave. Further, in a state where a transmission loss due to the embedded of the electrode is suppressed, an electric field with large electric field strength can be applied to the first dielectric part by the first and second electrodes, and a small and low-voltage operable dielectric waveguide device can be achieved.

30 Claims, 29 Drawing Sheets

U.S. PATENT DOCUMENTS

| | | | |
|---|---|---|---|
| 6,148,221 A * | 11/2000 | Ishikawa et al. | 505/210 |
| 6,463,308 B1 | 10/2002 | Wikborg et al. | |
| 6,483,690 B1 | 11/2002 | Nakajima et al. | 361/234 |
| 2004/0066250 A1* | 4/2004 | Hunt et al. | 333/24 R |
| 2005/0110138 A1* | 5/2005 | Dutta | 257/735 |
| 2006/0045454 A1* | 3/2006 | Miller | 385/129 |
| 2006/0170587 A1* | 8/2006 | Kai | 342/70 |

FOREIGN PATENT DOCUMENTS

| | | |
|---|---|---|
| JP | 11-103201 | 4/1999 |
| JP | 11507786 A | 7/1999 |
| JP | 2000-315902 | 11/2000 |
| JP | 2002171115 A | 6/2002 |
| JP | 2002181924 A | 6/2002 |
| JP | 2002330006 A | 11/2002 |
| JP | 2003-110335 | 4/2003 |
| JP | 2003-218611 | 7/2003 |
| JP | 2004531907 A | 10/2004 |
| JP | 2005-257384 | 9/2005 |
| JP | 2005-337864 | 12/2005 |

OTHER PUBLICATIONS

Korean language office action dated Oct. 28, 2010 and its English language translation for corresponding Korean application 20087024771.

* cited by examiner

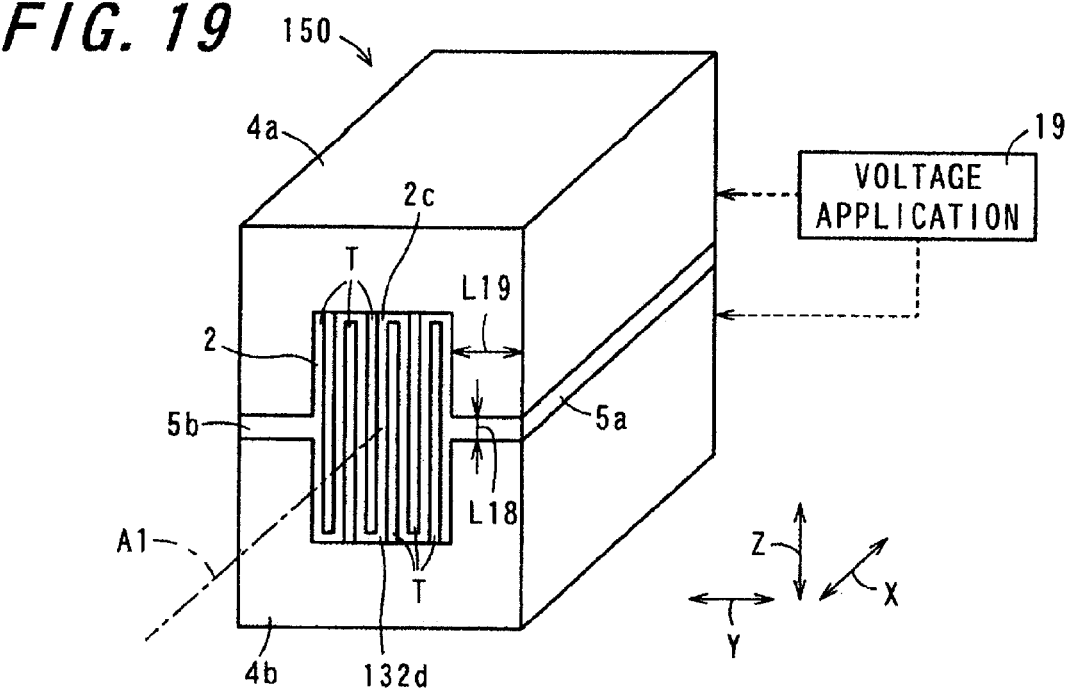
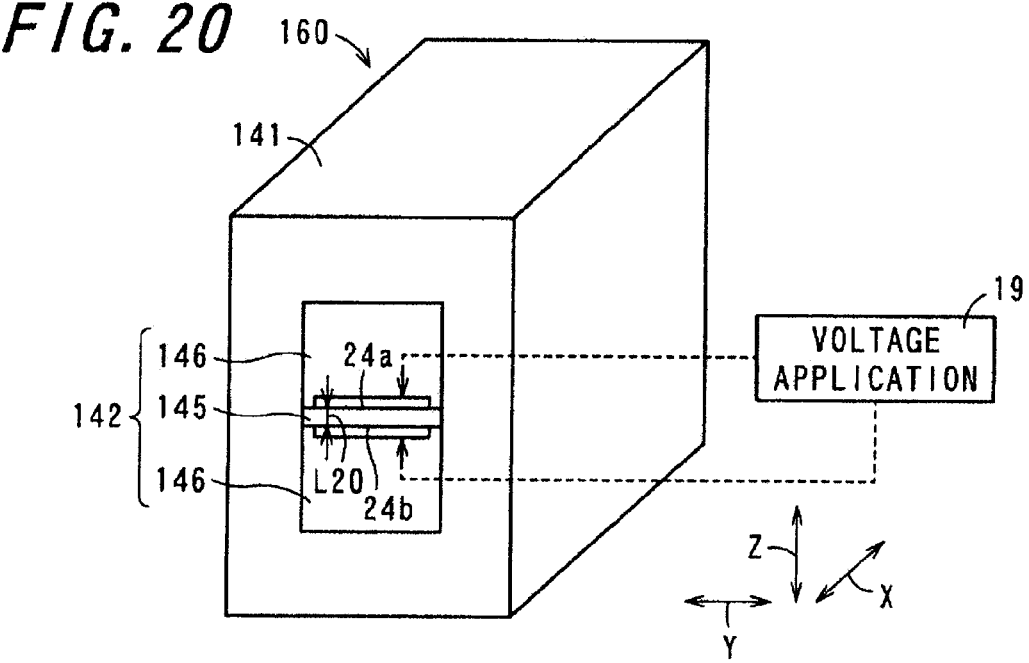

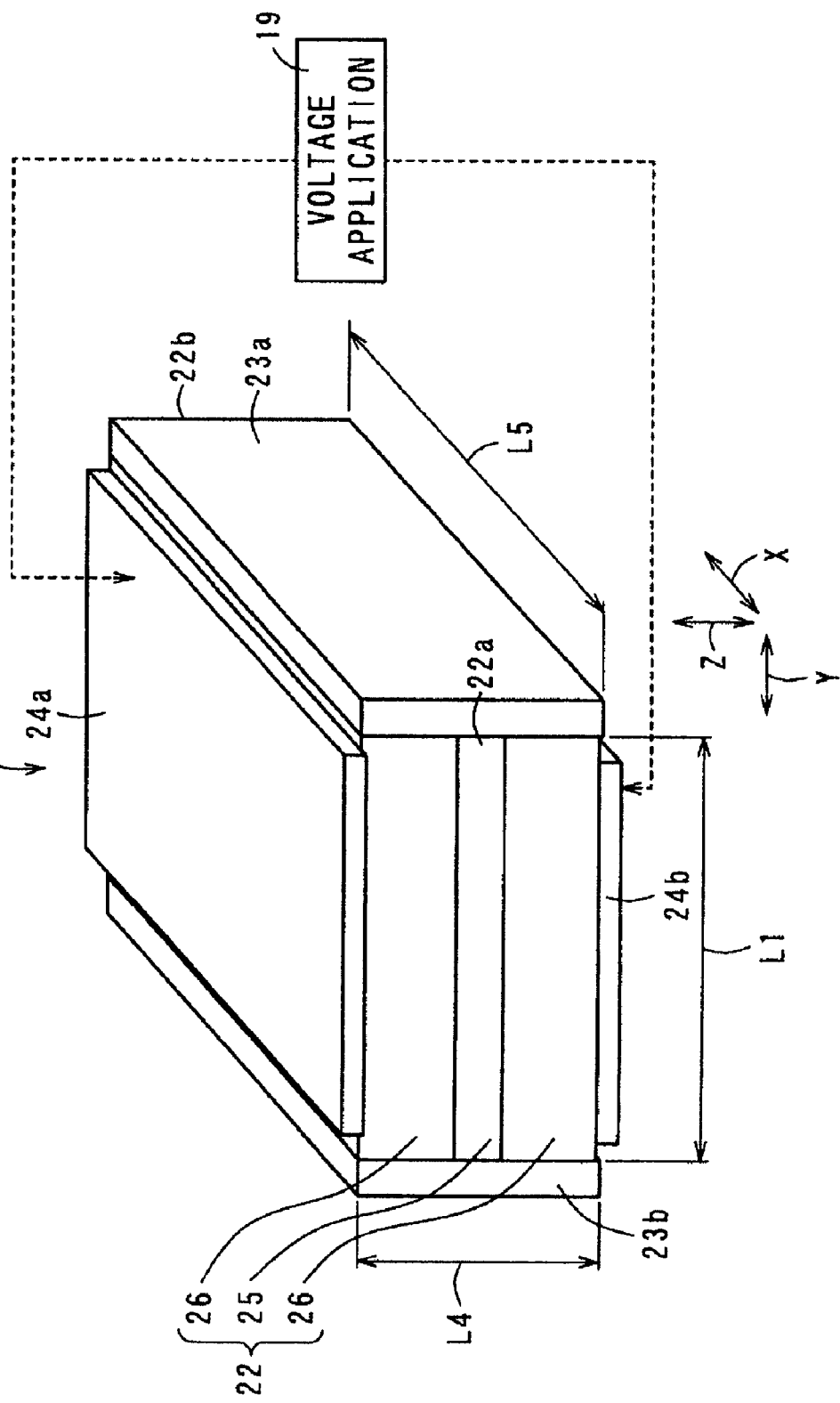

DIELECTRIC WAVEGUIDE DEVICE, PHASE SHIFTER, HIGH FREQUENCY SWITCH, AND ATTENUATOR PROVIDED WITH DIELECTRIC WAVEGUIDE DEVICE, HIGH FREQUENCY TRANSMITTER, HIGH FREQUENCY RECEIVER, HIGH FREQUENCY TRANSCEIVER, RADAR DEVICE, ARRAY ANTENNA, AND METHOD OF MANUFACTURING DIELECTRIC WAVEGUIDE DEVICE

TECHNICAL FIELD

The present invention relates to a dielectric waveguide device for use at high frequency band, such as a microwave band, a submillimeter wave band, or a millimeter wave band, a phase shifter, a high frequency switch and an attenuator, which control the phase of electromagnetic wave at the high frequency band, a high frequency transmitter, a high frequency receiver, a high frequency transceiver, a radar device, an array antenna, and a method of manufacturing a dielectric waveguide device.

BACKGROUND ART

A first example of related art is a phase shifter serving as a dielectric waveguide device that has a coplanar waveguide formed on a ferroelectric thin film and changes the phase of electromagnetic wave by applying a voltage to the ferroelectric thin film (for example, see Japanese Patent Application National Publication JP-A 2003-508942).

A second example of related art is a phase shifter serving as a dielectric waveguide device that has a parallel and flat plate structure with a ferroelectric loaded (for example, see M. Cohn and A. F. Eikenberg, "Ferroelectric Phase Shifters for VHF and UHF," IRE Trans. on Microwave Theory and Techniques Vol. MTT-10, pp. 536-548 (1962)).

A third example of related art is a phase shifter that controls the phase by controlling a dielectric constant of a part of a dielectric body in a non-radioactive dielectric guide (for example, see Japanese Unexamined Patent Publication JP-A 8-102604 (1996)).

In the first example of related art, the amount of a phase change per unit length is insufficient, and accordingly the line length needs to be long in order to obtain a required phase change. For this reason, the phase shifter is increased in size.

In the second and third examples of related art, there is an attempt to obtain the phase change by using a dielectric body having a variable dielectric constant in the dielectric waveguide, but in this case, the thickness of the dielectric waveguide is increased. For this reason, there is a problem in that a high voltage of 4000 V should be applied.

As such, in the related art, it is difficult to achieve a small and low-voltage operable dielectric waveguide device with a dielectric body which varies in dielectric constant depending on the magnitude of an applied electric field.

DISCLOSURE OF THE INVENTION

Accordingly, it is an object of the invention to provide a small and low-voltage operable dielectric waveguide device, a phase shifter, a high frequency switch, and an attenuator provided with a dielectric waveguide device, a high frequency transmitter, a high frequency receiver, a high frequency transceiver, a radar device, an array antenna, and a method of manufacturing a dielectric waveguide device.

A dielectric waveguide device of the invention comprises:

a transmission line that has a dielectric part including a variable part which varies at least one of dielectric constant and dimension of the variable part in accordance with an applied electric field, and that propagates electromagnetic wave; and an electrode that is formed to be thinner than a skin depth for the frequency of the electromagnetic wave propagating along the transmission line, and that is embedded in the dielectric part, the electrode being for applying the electric field to the variable part.

According to the invention, when an electric field is applied to a variable part by an electrode, the variable part can vary in at least one of dielectric constant and dimension. Therefore, it is possible to change the phase of an electromagnetic wave propagating in a transmission line, to change a cutoff frequency in case of a transmission line having cutoff characteristics, or to attenuate the electromagnetic wave propagating in the transmission line. When the variable part varies in dimension, the dimension in a voltage application direction, that is, the thickness in the voltage application direction primarily varies. The electrode is embedded in the dielectric part, and is formed to be thinner than the skin depth for the frequency of the electromagnetic wave propagating in the transmission line. Accordingly, even though the electrode is provided to be close to the variable part or embedded in the variable part, the electromagnetic wave propagating in the transmission line can transmit the electrode. For this reason, the electromagnetic wave can propagate without being cut off. Further, in a state where a transmission loss due to the embedded of the electrode is suppressed, an electric field with large electric field strength can be applied to the variable part by the electrode, and thus it is possible to significantly change at least one of dielectric constant and dimension of the variable part. Even if a voltage to be supplied to the electrode in order to apply an electric field to the variable part is reduced, an electric field with large electric field strength is applied to the variable part. In addition, even if the line length of the transmission line is short, since an electric field with large electric field strength is applied to the variable part, a small and low-voltage operable dielectric waveguide device, such as a phase shifter, a high frequency switch, or an attenuator, can be achieved.

In the dielectric waveguide device of the invention, it is preferable that the dielectric part includes second dielectric parts that are provided to sandwich the variable part therebetween and have a lower dielectric constant than the variable part, the transmission line has a pair of plate conductor parts between which the dielectric part is sandwiched in a direction perpendicular to a lamination direction of the variable part and the second dielectric parts, and to a propagation direction of electromagnetic wave propagating in the transmission line, and the electrode is provided between the variable part and the second dielectric parts.

According to the invention, the transmission line may include an H guide and an NRD guide. Since the electrode is provided between the variable part and the second dielectric parts, an electric field can be effectively applied to the variable part. Further, even if the electrode is applied to the transmission lines, there is no influence on waveguide modes of the electromagnetic wave.

The respective second dielectric parts function as a support member for supporting the plate conductor parts. Therefore, the plate conductor parts can be manufactured by using a thin film forming technology, a thick film printing technology, or a sheet-like ceramic technology, and thus in manufacturing, a dielectric waveguide device suitable for reduction in size can be achieved.

The second dielectric parts are made of a dielectric body, which have a dielectric constant lower than the dielectric constant of a portion having a lowest dielectric constant in the variable part and higher than the dielectric constant of air when an electric field is applied to the variable part and when no electric field is applied to the variable part. Therefore, the wavelength of the propagating electromagnetic wave can be further reduced, and thus the dielectric waveguide device can be small in size.

It is preferable that the dielectric waveguide device of the invention includes a plurality of electrodes that are embedded in the variable part, and are provided at predetermined intervals in the direction perpendicular to the lamination direction of the variable part and the plate conductor part, and the propagation direction of the electromagnetic wave propagating in the transmission line, the transmission line has a pair of plate conductor parts between which the dielectric part is sandwiched, and adjacent electrodes are connected to different plate conductor parts from among the pair of plate conductor parts.

According to the invention, the transmission line may include an H guide and an NRD guide. Since the electrodes are embedded in the variable part, an electric field can be effectively applied to the variable part. Further, since the interval between the electrodes is made smaller, larger electric field strength can be applied to the variable part. Therefore, a small and low-voltage operable dielectric waveguide device can be achieved.

Adjacent electrodes are connected to a different plate conductor part out of the pair of plate conductor parts. Therefore, by applying a voltage to the pair of plate conductor parts, a potential difference is generated between adjacent electrodes, and thus an electric field can be applied to the variable part. Even if a plurality of electrodes are formed, only by applying a voltage to the plate conductor parts, a voltage can be applied to adjacent electrodes, and it is not necessary to separately form a wire to apply a voltage to each electrode.

In the dielectric waveguide device of the invention, it is preferable that the dielectric part includes second dielectric parts which have a dielectric constant lower than the dielectric constant of the variable part, and between which the variable part is sandwiched in a direction perpendicular to a lamination direction of the variable part and the plate conductor parts, and the propagation direction of the electromagnetic wave propagating in the transmission line.

According to the invention, the respective second dielectric parts function as a support member for supporting the plate conductor parts. For this reason, the plate conductor parts can be manufactured by using a thin film technology, a thick film printing technology, or a sheet-like ceramic technology, and in manufacturing, a dielectric waveguide device suitable for reduction in size can be achieved. The second dielectric parts are made of a dielectric body, which has a dielectric constant lower than the dielectric constant of a portion having a lowest dielectric constant in the variable part and higher than the dielectric constant of air when an electric field is applied to the variable part and when no electric field is applied to the variable part. Therefore, the wavelength of the propagating electromagnetic wave can be further reduced, and thus the dielectric waveguide device can be small in size.

In the dielectric waveguide device of the invention, it is preferable that an interval between the pair of plate conductor parts is set to be half or less of the wavelength of electromagnetic wave propagating in the second dielectric parts.

According to the invention, the transmission line may form a non-radioactive dielectric guide (NRD guide). Therefore, radiation of electromagnetic wave from a region sandwiched between the pair of plate conductor parts to the outside can be suppressed, and an insertion loss when a phase shifter is inserted into the transmission line can be reduced. Further, it is possible to achieve a dielectric waveguide device that can effectively apply an electric field to the dielectric part while causing little loss in a high frequency signal of an LSE mode propagating along the dielectric part.

A dielectric waveguide tube device of the invention comprises:

a dielectric part that includes a variable part which varies at least one of dielectric constant and dimension of the variable part in accordance with an applied electric field, and that propagates electromagnetic wave; and a conductor part that includes a pair of electrodes for applying the electric field to the variable part, and surrounds the dielectric part to form a waveguide tube.

According to the invention, it is possible to change the phase of electromagnetic wave propagating along the dielectric part in accordance with a voltage to be applied to the pair of electrodes. When the dimension varies, the dimension in the voltage application direction, that is, the thickness in the voltage application direction primarily varies. The conductor part including the pair of electrodes surrounds the dielectric part to form the waveguide tube, and thus a transmission line having cutoff characteristics, that is, a cutoff frequency is formed by the conductor part and the dielectric part. In forming the waveguide tube, the conductor part may form the waveguide tube to be spaced at a predetermined distance around an axial line. Since the conductor part forming the waveguide tube includes the pair of electrodes, it is not necessary to form an electrode separately from the waveguide tube, and thus ease of manufacturing can be realized. If the electrodes are included in the waveguide tube, even though the frequency of electromagnetic wave propagating the dielectric part is set to be near the cutoff frequency, an electric field to be applied to the variable part can be stably controlled, and thus stable operation near the cutoff frequency can be made. Accordingly, the frequency of electromagnetic wave propagating along the dielectric part can be set to be near the cutoff frequency, and a large phase change is obtained at a short line length near the cutoff frequency. Therefore, if the waveguide tube is used as a phase shifter, the phase shifter can be small in size. Further, by setting the frequency of electromagnetic wave propagating along the dielectric part to be near the cutoff frequency, the dimension of a section which is perpendicular to the propagation direction of the electromagnetic wave of the dielectric part is made small. In addition, since the interval between the pair of electrodes is small, a large electric field can be applied to the dielectric part at a low voltage. As a result, a dielectric waveguide tube device that is small in size and can stably obtain a large phase change at a low voltage can be achieved.

A dielectric waveguide device of the invention comprises a dielectric part that comprises
  a first dielectric part including a variable part which varies
    at least one of dielectric constant and dimension of the
    variable part in accordance with an applied electric field,
    and
  second dielectric parts which have a dielectric constant
    lower than the first dielectric part and between which the
    first dielectric part is sandwiched;
a pair of plate conductor parts between which the dielectric part is sandwiched in a direction perpendicular to a propagation direction of electromagnetic wave propagating along the dielectric part and a lamination direction of the first and second dielectric parts; and a pair of electrodes between which the dielectric part is sandwiched in the lamination direction, and which are spaced from each other at an interval smaller than an interval between the pair of plate conductor parts, the electrodes being for applying the electric field to the variable part.

According to the invention, a transmission line having cutoff characteristics, that is, a cutoff frequency is formed by the first dielectric part and the pair of plate conductor parts. The variable part in the first dielectric part varies in at least one of dielectric constant and dimension in accordance with the applied electric field, that is, the voltage applied to the pair of electrodes, and thus it is possible to change the phase of electromagnetic wave propagating along the dielectric part. When the dimension varies, the dimension in the voltage application direction, that is, the thickness in the voltage application direction primarily varies. The electromagnetic wave primarily propagates the first dielectric part sandwiched between the pair of plate conductor parts and the second dielectric parts. Since the first dielectric part includes the variable part, the change in dielectric constant of the variable part significantly affects the change in phase of the electromagnetic wave. Therefore, a line length for obtaining a required phase change can be reduced, and thus a phase shifter can be small in size. In addition, since the dielectric part is sandwiched between the pair of electrodes in the lamination direction, by applying a voltage to the pair of electrodes, an electric field can be applied to the variable part. An interval between the pair of electrodes is smaller than an interval between the pair of plate conductor parts. Therefore, a large electric field can be applied to the variable part, as compared with a case where an electric field is applied to the variable part by the pair of plate conductor parts, and thus a large electric field can be applied to the variable part at a low voltage.

The second dielectric parts having a dielectric constant smaller than the dielectric constant of the first dielectric part is interposed between the first dielectric part and the electrodes, electromagnetic wave at the electrode part can be sufficiently attenuated, and cannot be set in a cutoff state. The second dielectric parts have a dielectric constant lower than the dielectric constant of a portion having a lowest dielectric constant in the first dielectric part.

If the electrodes are provided in the above-described manner, and an electric field is applied to the variable part, the phase shifter can be stably operated near the cutoff frequency. Accordingly, the frequency of electromagnetic wave propagating along the dielectric part can be set to be near the cutoff frequency. Near the cutoff frequency, a large phase change is obtained at a short line length, and thus the phase shifter can be small in size. Further, by setting the frequency of electromagnetic wave propagating along the dielectric part to be near the cutoff frequency, a section of the dielectric part perpendicular to the propagation direction of electromagnetic wave is reduced in dimension. In addition, since the interval between the pair of electrodes is small, a large electric field can be applied to the dielectric part at a low voltage. As a result, a phase shifter that is small in size and can stably obtain a large phase change at a low voltage can be achieved.

In the dielectric waveguide tube device of the invention, it is preferable that an interval between the pair of plate conductor part is set to be half or less of the wavelength of electromagnetic wave propagating in the second dielectric parts.

According to the invention, a non-radioactive dielectric guide is formed by the dielectric part and the plate conductor parts. Therefore, radiation of electromagnetic wave in the lamination direction from a region sandwiched between the pair of plate conductor part can be suppressed, and an insertion loss when the phase shifter is inserted into the transmission line can be reduced.

A phase shifter of the invention comprises the dielectric waveguide device or the dielectric waveguide tube device, and by varying at least dielectric constant and dimension of the variable part in accordance with an applied electric field, the phase shifter changes the phase of electromagnetic wave propagating in the transmission line.

According to the invention, even though a voltage to be supplied to the electrodes in order to apply an electric field to the variable part is made small, an electric field with large electric field strength is applied to the variable part. Further, when the line length of the transmission line is short, a large phase change is obtained. Therefore, a small and low-voltage operable phase shifter can be achieved. In addition, no mechanical driving portion is provided, and thus a phase shifter having excellent durability and high reliability can be achieved.

In the phase shifter of the invention, it is preferable that fc and f are set to satisfy a condition $1.03 < f/fc < 1.5$, in which fc is a cutoff frequency and f is the frequency of electromagnetic wave propagating along the dielectric waveguide in a case where a prescribed voltage is applied to the pair of electrodes.

According to the invention, since the phase shifter is used near the cutoff frequency at which the phase change is large, a large phase change is obtained at a short line length, and thus the phase shifter can be small in size. In addition, a section of the dielectric part in a direction perpendicular to the propagation direction of electromagnetic wave is reduced in dimension. For this reason, the pair of electrodes can be disposed to be close to each other. Therefore, large electric field strength is obtained at a low voltage, and thus the phase shifter can be operated at a low voltage.

A high frequency switch of the invention comprises the dielectric waveguide device, the transmission line has cutoff characteristics, and the high frequency switch is operable to be switched between a propagation state in which the cutoff frequency in the transmission line becomes lower than the frequency of electromagnetic wave propagating along the transmission line, and a cutoff state in which the cutoff frequency becomes higher than the frequency of electromagnetic wave by varying at least one of dielectric constant and dimension of the variable part in accordance with the applied electric field.

According to the invention, by changing the voltage to be applied to the electrodes, the switch can be easily switched between the propagation state and the cutoff state. In an OFF state, the switch is set in the cutoff state, and accordingly a high ON/OFF ratio can be inherently obtained. Further, no mechanical driving portion is provided, and thus a high frequency switch having excellent durability and high reliability can be achieved. Even if a voltage to be supplied to the electrodes in order to apply an electric field to the variable part is reduced, an electric field with large electric field strength is applied to the variable part. In addition, even if the line length of the transmission line is short, a high ON/OFF ratio that enables the cutoff state to achieve the OFF state can be obtained. Therefore, a small and low-operable high frequency switch can be achieved. Furthermore, no mechanical driving portion is provided, and a high frequency switch having excellent durability and high reliability can be achieved.

An attenuator of the invention comprises the dielectric waveguide device, and by varying at least one of dielectric constant and dimension of the variable part in accordance with the applied electric field, the attenuator attenuates electromagnetic wave propagating in the transmission line.

According to the invention, even if a voltage to be supplied in order to apply an electric field to the variable part is reduced, an electric field with large electric field strength is applied to the variable part. Further, since attenuation near the cutoff frequency is used, even if the line length of the transmission line is short, sufficient attenuation can be obtained. Therefore, a small and low-voltage operable attenuator can be achieved. In addition, no mechanical driving portion is provided, and thus an attenuator having excellent durability and high reliability can be achieved.

A high frequency transmitter of the invention comprises:

a high frequency oscillator that generates a high frequency signal, a high frequency transmission line that is connected to the high frequency oscillator, and transmits the high frequency signal from the high frequency oscillator;

an antenna that is connected to the high frequency transmission line, and radiates the high frequency signal;

the phase shifter that is inserted into the high frequency transmission line such that the high frequency signal passes through the dielectric part; and a stub that is provided in the high frequency transmission line on at least one of upstream and downstream sides of the phase shifter in a transmission direction of the high frequency signal.

According to the invention, the phase shifter is inserted such that electromagnetic wave of the high frequency to be transmitted along the high frequency transmission line passes through the dielectric part. Therefore, it is possible to achieve a high frequency transmitter that can separately control a phase shift due to the high frequency transmission line caused by a variation in shape of a wire and/or a bump for connecting the high frequency oscillator and a variation in guide width of the high frequency transmission line, thereby obtaining a match, has stable oscillation characteristics, and can suppress an insertion loss to be small, thereby having a high transmission output. In addition, as described above, the phase shifter can be small in size and operable at a low voltage. Therefore, even if the phase shifter is provided, a high frequency transmitter can be small in size, and the configuration for supplying a voltage to the phase shifter can be prevented from being complicated.

A high frequency receiver of the invention comprises:

an antenna that receives a high frequency signal, a high frequency transmission line that is connected to the antenna, and transmits the high frequency signal received by the antenna;

a high frequency detector that is connected to the high frequency transmission line, and detects the high frequency signal to be transmitted to the high frequency transmission line;

the phase shifter that is inserted into the high frequency transmission line such that the high frequency signal passes through the dielectric part; and a stub that is provided in the high frequency transmission line on at least one of upstream and downstream sides of the phase shifter in a transmission direction of the high frequency signal.

According to the invention, the phase shifter is inserted such that electromagnetic wave of the high frequency signal to be transmitted along the high frequency transmission line passes through the dielectric part. Therefore, it is possible to achieve a high frequency receiver that can separately control a phase shift due to the high frequency transmission line caused by a variation in shape of a wire or a bump for connecting the high frequency oscillator and a variation in guide width of the high frequency transmission line, thereby obtaining a match, has stable detection characteristics, and can suppress an insertion loss to be small, thereby having a high detection output. In addition, as described above, the phase shifter can be small in size and operable at a low voltage. Therefore, even if the phase shifter is provided, the high frequency receiver can be small in size, and the configuration for applying a voltage to the phase shifter can be prevented from being complicated.

A high frequency transceiver of the invention comprises:

a high frequency oscillator that generates a high frequency signal;

a first high frequency transmission line that is connected to the high frequency oscillator, and transmits the high frequency signal;

a branch that has first, second and third terminals, and selectively outputs to one of the second terminal and the third terminal the high frequency signal which is supplied to the first terminal connected to the first high frequency transmission line;

a second high frequency transmission line that is connected to the second terminal, and transmits a high frequency signal from the second terminal;

a splitter that has fourth, fifth and sixth terminals, outputs to the fifth terminal the high frequency signal, which is supplied to the fourth terminal through the second high frequency transmission line, and outputs to the sixth terminal a high frequency signal which is supplied to the fifth terminal;

a third high frequency transmission line that is connected to the fifth terminal, transmits the high frequency signal outputted from the fifth terminal, and transmits the high frequency signal to the fifth terminal;

an antenna that is connected to the third high frequency transmission line, and radiates and receives the high frequency signal;

a fourth high frequency transmission line that is connected to the third terminal, and transmits a high frequency signal outputted from the third terminal;

a fifth high frequency transmission line that is connected to the sixth terminal, and transmits the high frequency signal outputted from the sixth terminal;

a mixer that is connected to the fourth and fifth high frequency transmission lines, and mixes the high frequency signals supplied from the fourth and fifth high frequency transmission lines to output an intermediate frequency signal; and the phase shifter that is inserted into at least one of the first to fifth high frequency transmission lines such that the high frequency signal passes through the dielectric part.

The phase shifter is inserted into at least one of the first to fifth high frequency transmission lines such that the high frequency signal passes through the dielectric part. Therefore, it is possible to achieve a frequency transceiver that can control the phase of a high frequency signal, which undesirably varies due to the high frequency transmission line caused by a variation in guide width, has stable oscillation characteristics, and can suppress an insertion loss to be small, thereby having a high transmission output. It is also possible to achieve a high frequency transceiver that has stable detection characteristics and can suppress an insertion loss to be small, thereby having a high detection output. It is also possible to improve reliability of the intermediate frequency signal generated by the mixer, for example. In addition, as described above, the phase shifter can be small and operable at a low voltage. Therefore, even though the phase shifter is provided, a high frequency transceiver can be small in size, and the configuration for applying a voltage to the phase shifter can be prevented from being complicated.

A high frequency transmitter of the invention comprises:

a high frequency oscillator that generates a high frequency signal;

a high frequency transmission line that is connected to the high frequency oscillator, and transmits the high frequency signal from the high frequency oscillator;

an antenna that is connected to the high frequency transmission line, and radiates the high frequency signal; and the high frequency switch that is inserted into the high frequency transmission line, wherein the high frequency switch allows to be transmitted the high frequency signal to be transmitted along the high frequency transmission line when the high frequency switch is set in the propagation state, and allows to be cut off the high frequency signal to be transmitted along the high frequency transmission line when the high frequency switch is set in the cutoff state.

According to the invention, when the high frequency switch is set in the propagation state, the high frequency signal generated by the high frequency oscillator transmits the high frequency switch. Therefore, the high frequency signal is transmitted to the high frequency transmission line, and is supplied to the antenna to be then radiated as electric wave. When the high frequency switch is set in the cutoff state, the high frequency signal generated by the high frequency oscillator does not transmit the high frequency switch. Therefore, the high frequency signal is cut off and is not radiated from the antenna. By switching the high frequency switch between the propagation state and the cutoff state, pulse signal wave can be radiated from the antenna. By using a high frequency switch that can obtain a large ON/OFF ratio, and has excellent durability and high reliability, a reliable high frequency transmitter can be achieved.

A high frequency transceiver of the invention comprises:

a high frequency oscillator that generates a high frequency signal;

a first high frequency transmission line that is connected to the high frequency oscillator, and transmits the high frequency signal;

a branch that has first, second and third terminals, and selectively outputs to one of the second terminal and the third terminal the high frequency signal which is supplied to the first terminal connected to the first high frequency transmission line;

a second high frequency transmission line that is connected to the second terminal, and transmits a high frequency signal supplied from the second terminal;

a splitter that has fourth, fifth and sixth terminals, outputs to the fifth terminal the high frequency signal which is supplied to the fourth terminal through the second high frequency transmission line, and outputs to the sixth terminal a high frequency signal, which is supplied to the fifth terminal;

a third high frequency transmission line that is connected to the fifth terminal, transmits the high frequency signal outputted from the fifth terminal, and transmits the high frequency signal to the fifth terminal;

an antenna that is connected to the third high frequency transmission line, and radiates and receives the high frequency signal;

a fourth high frequency transmission line that is connected to the third terminal, and transmits a high frequency signal outputted from the third terminal;

a fifth high frequency transmission line that is connected to the sixth terminal, and transmits the high frequency signal outputted from the sixth terminal; and a mixer that is connected to the fourth and fifth high frequency transmission lines, and mixes the high frequency signals supplied from the fourth and fifth high frequency transmission lines to output an intermediate frequency signal, the branch including two pieces of the high frequency switches, a third high frequency switch allowing the high frequency signal to be transmitted between the fourth terminal and the fifth terminal when the third frequency switch is set in the propagation state, and allowing the high frequency signal to be cut off between the fourth terminal and the fifth terminal when the third frequency switch is set in the cutoff state, and a fourth high frequency switch allowing the high frequency signal to be transmitted between the fifth terminal and the sixth terminal when the fourth frequency switch is set in the propagation state, and allowing the high frequency signal to be cut off between the fifth terminal and the sixth terminal when the fourth frequency switch is set in the cutoff state.

The branch includes two pieces of the high frequency switches. A first high frequency switch, when set in the propagation state, allows the high frequency signal to be transmitted between the first terminal and the second terminal, and, when set in the cutoff state, allows the high frequency signal to be cut off between the first terminal and the second terminal. A second high frequency switch, when set in the propagation state, allows the high frequency signal to be transmitted between the first terminal and the third terminal, and, when set in the cutoff state, allows the high frequency signal to be cut off between the first terminal and the third terminal. In a case where the second high frequency switch is set in the cutoff state when the first high frequency switch is set in the propagation state, and where the second high frequency switch is set in the propagation state when the first high frequency switch is set in the cutoff state, the high frequency signal inputted from the first terminal can be selectively outputted to one of the second and third terminals. By configuring a branch to include a high frequency switch, which can obtain a large ON/OFF ratio, and has excellent durability and high reliability, a reliable high frequency transceiver can be achieved.

A high frequency transceiver of the invention comprises:

a high frequency oscillator that generates a high frequency signal;

a first high frequency transmission line that is connected to the high frequency oscillator, and transmits the high frequency signal;

a branch that has first, second, and third terminals, and selectively outputs to one of the second terminal and the third terminal the high frequency signal which is supplied to the first terminal connected to the first high frequency transmission line;

a second high frequency transmission line that is connected to the second terminal, and transmits a high frequency signal supplied from the second terminal;

a splitter that has fourth, fifth and sixth terminals, outputs to the fifth terminal the high frequency signal which is supplied to the fourth terminal through the second high frequency transmission line, and outputs to the sixth terminal a high frequency signal which is supplied to the fifth terminal;

a third high frequency transmission line that is connected to the fifth terminal, transmits the high frequency signal outputted from the fifth terminal, and transmits the high frequency signal to the fifth terminal;

an antenna that is connected to the third high frequency transmission line, and radiates and receives the high frequency signal;

a fourth high frequency transmission line that is connected to the third terminal, and transmits a high frequency signal outputted from the third terminal;

a fifth high frequency transmission line that is connected to the sixth terminal, and transmits the high frequency signal outputted from the sixth terminal; and a mixer that is connected to the fourth and fifth high frequency transmission lines, and mixes the high frequency signals supplied from the fourth and fifth high frequency transmission lines to output an intermediate frequency signal, the splitter including two pieces of the high frequency switches, a third high frequency switch allowing the high frequency signal to be transmitted between the fourth terminal and the fifth terminal when the third high frequency switch is set in the propagation state, and allowing the high frequency signal to be cut off between the fourth terminal and the fifth terminal when the third high frequency switch is set in the cutoff state, and a fourth high frequency switch allowing the high frequency signal to be transmitted between the fifth terminal and the sixth terminal when the fourth high frequency switch is set in the propagation state, and allowing the high frequency signal to be cut off between the fifth terminal and the sixth terminal when the fourth high frequency switch is set in the cutoff state.

According to the invention, the splitter includes the two pieces of the high frequency switches. A third high frequency switch, when set in the propagation state, allows the high frequency signal to be transmitted between the fourth terminal and the fifth terminal, and, when set in the cutoff state, allows the high frequency signal to be cut off between the fourth terminal and the fifth terminal. A fourth high frequency switch, when set in the propagation state, allows the high frequency signal to be transmitted between the fifth terminal and the sixth terminal, and, when set in the cutoff state, allows the high frequency signal to be cut off between the fifth terminal and the sixth terminal. In a case where the fourth high frequency switch is set in the cutoff state when the third high frequency switch is set in the propagation state, and where the fourth high frequency switch is set in the propagation state when the third high frequency switch is set in the cutoff state, the high frequency signal inputted from the fourth terminal can be outputted from the fifth terminal, and the high frequency signal inputted from the fifth terminal can be outputted from the sixth terminal. By configuring a branch to include a high frequency switch, which can obtain a large ON/OFF ratio, and has excellent durability and high reliability, a reliable high frequency transceiver can be achieved.

A high frequency transceiver of the invention comprises:

a high frequency oscillator that generates a high frequency signal;

a first high frequency transmission line that is connected to the high frequency oscillator, and transmits the high frequency signal;

a branch that has first, second, and third terminals, and selectively outputs to one of the second terminal and the third terminal the high frequency signal which is supplied to the first terminal connected to the first high frequency transmission line;

a second high frequency transmission line that is connected to the second terminal, and transmits a high frequency signal supplied from the second terminal;

a splitter that has fourth, fifth, and sixth terminals, outputs to the fifth terminal the high frequency signal, which is supplied to the fourth terminal through the second high frequency transmission line, and outputs to the sixth terminal a high frequency signal, which is supplied to the fifth terminal;

a third high frequency transmission line that is connected to the fifth terminal, transmits the high frequency signal outputted from the fifth terminal, and transmits the high frequency signal to the fifth terminal;

an antenna that is connected to the third high frequency transmission line, and radiates and receives the high frequency signal;

a fourth high frequency transmission line that is connected to the third terminal, and transmits a high frequency signal outputted from the third terminal;

a fifth high frequency transmission line that is connected to the sixth terminal, and transmits the high frequency signal outputted from the sixth terminal;

a mixer that is connected to the fourth and fifth high frequency transmission lines, and mixes the high frequency signals supplied from the fourth and fifth high frequency transmission lines to output an intermediate frequency signal; and the high frequency switch that is inserted into at least one of the first to third transmission lines such that the high frequency signal passes through the dielectric part in the propagation state.

According to the invention, the high frequency switches which are inserted into one or more of the first to third high frequency transmission lines are all set in the propagation state. If doing so, the high frequency signal generated by the high frequency oscillator is transmitted to the first high frequency transmission line, is supplied to the first terminal of the branch, and is supplied from the second terminal of the branch to the second high frequency transmission line. Then, the high frequency signal is supplied to the fourth terminal of the splitter, is supplied from the fifth terminal of the splitter to the third high frequency transmission line, and is radiated from the antenna. If any one of the high frequency switches which are inserted into one or more of the first to third high frequency transmission lines is set in the cutoff state, the high frequency signal generated by the high frequency oscillator does not transmit the high frequency switch. Therefore, the high frequency signal is cut off and is not radiated from the antenna. By switching the high frequency switch between the propagation state and the cutoff state, pulse signal wave can be radiated from the antenna. By using a high frequency switch which can obtain a large ON/OFF ratio, and has excellent durability and high reliability, a reliable high frequency transceiver can be achieved. In addition, the high frequency signal received by the antenna is supplied to the third high frequency transmission line, and is then supplied to the fifth terminal of the splitter. Then, the high frequency signal is supplied from the sixth terminal of the splitter to the fifth high frequency transmission line, and is then supplied to the mixer. To the mixer, the high frequency signal generated by the high frequency oscillator is supplied from the third terminal of the branch through the fourth high frequency transmission line as a local signal. The mixer mixes the high frequency signal generated by the high frequency oscillator and the high frequency signal received by the antenna to output the intermediate frequency signal. Therefore, information included in the received high frequency signal is obtained.

A high frequency transceiver of the invention comprises:

a high frequency oscillator that generates a high frequency signal;

a first high frequency transmission line that is connected to the high frequency oscillator, and transmits the high frequency signal;

a branch that has first, second, and third terminals, and selectively outputs to one of the second terminal and the third terminal the high frequency signal which is supplied to the first terminal connected to the first high frequency transmission line;

a second high frequency transmission line that is connected to the second terminal, and transmits a high frequency signal supplied from the second terminal;

a splitter that has fourth, fifth, and sixth terminals, outputs to the fifth terminal the high frequency signal, which is supplied to the fourth terminal through the second high frequency transmission line, and outputs to the sixth terminal a high frequency signal, which is supplied to the fifth terminal;

a third high frequency transmission line that is connected to the fifth terminal, transmits the high frequency signal outputted from the fifth terminal, and transmits the high frequency signal to the fifth terminal;

an antenna that is connected to the third high frequency transmission line, and radiates and receives the high frequency signal;

a fourth high frequency transmission line that is connected to the third terminal, and transmits a high frequency signal outputted from the third terminal;

a fifth high frequency transmission line that is connected to the sixth terminal, and transmits the high frequency signal outputted from the sixth terminal;

a mixer that is connected to the fourth and fifth high frequency transmission lines, and mixes the high frequency signals supplied from the fourth and fifth high frequency transmission lines to output an intermediate frequency signal; and the attenuator that is inserted into at least one of the first to fifth high frequency transmission lines such that the high frequency signal passes through the dielectric part.

According to the invention, the attenuator is inserted into at least one of the first to fifth high frequency transmission lines such that the high frequency signal passes through the dielectric part. Therefore, amplitude modulation can be made, for example, by changing the amplitude of the high frequency signal. Further, a stable high frequency transceiver of little change can be achieved, for example, by adjusting a change in transmission output and intermediate signal due to a change in frequency of the high frequency signal and a change in temperature. As described above, the attenuator can be small in size and operable at a low voltage. Therefore, even if an attenuator is provided, a high frequency transceiver can be small in size, and the configuration for applying a voltage to the attenuator can be prevented from being complicated.

In the high frequency transceiver of the invention, it is preferable that the splitter is formed by a hybrid circuit or a circulator.

According to the invention, the splitter may be formed by a hybrid circuit or may be formed by a circulator. The hybrid circuit is a direction coupler, and is implemented by magic T, hybrid ring, or rat race.

A radar device of the invention comprises:

the high frequency transceiver; and a distance detector that detects a distance from the high frequency transceiver to an object to be detected on the basis of the intermediate frequency signal from the high frequency transceiver.

According to the invention, the distance detector detects the distance from the high frequency transceiver to the object to be detected on the basis of the intermediate frequency signal from the high frequency transceiver. Therefore, a radar device that can accurately detect the distance to the object to be detected can be provided.

An array antenna of the invention comprises a plurality of phase shifter-equipped antennas that are arranged in line, each antenna having an antenna element and the phase shifter.

According to the invention, the phase of electric wave radiated from each antenna element is adjusted by shifting the phase of the high frequency signal supplied to the antenna element by using the phase shifter attached to the antenna element. Then, radiating beam can be inclined in a predetermined direction from the front surface of the antenna. The phase shifter is small in size and operable at a low voltage, and thus there is no case where the array antenna is increased in size. The array antenna includes the phase shifter, and thus as described above, the direction of radiating beam can be changed. Therefore, the direction of radiating beam can be changed without mechanically operating the antenna element, and thus convenience can be improved.

A radar device of the invention comprises:

the array antenna; and a high frequency transceiver that is connected to the array antenna, supplies a high frequency signal to the array antenna, and receives a high frequency signal trapped by the array antenna.

According to the invention, the direction of radiating beam can be easily changed without increasing the size of the radar device. Therefore, a convenient radar device can be achieved.

A method of manufacturing a dielectric waveguide device of the invention comprises:

forming on a substrate a first dielectric film made of a dielectric having a dielectric constant;

forming on the first dielectric film a laminate in which an electrode film, and a second dielectric film is alternatively laminated such that adjacent electrode films partially overlap each other to lean toward a first direction and a second direction in a predetermined direction perpendicular to a lamination direction of the electrode film and the second dielectric film, the electrode film being thinner than a skin depth for a prescribed frequency of electromagnetic wave, the second dielectric film having a dielectric constant higher than the first dielectric film, and the second dielectric film varying dielectric constant thereof in accordance with an applied voltage;

forming on the laminate a third dielectric film which has a dielectric constant lower than that of the second dielectric film;

etching the first dielectric film, the laminate and the third dielectric film to form a convex portion having a first end face and a second end face opposed to the first end face in a direction perpendicular to the lamination direction, the electrode film formed to lean toward the first direction of the predetermined direction being exposed from the first end face, and the electrode film to lean toward the second direction of the predetermined direction being exposed from the second end face; and forming a plate conductor part on each of the first and second end faces of the convex portion.

According to the invention, it is possible to achieve the phase shifter in which even-numbered electrode films and odd-numbered electrode films in the lamination direction from among the electrode films are connected to different plate conductor parts. In addition, the laminated electrode films can be accurately and reliably led to the first end face and the second end face. Therefore, a manufacturing method suitable for a known semiconductor process is provided, and thus a small, accurate, and stable dielectric waveguide device can be manufacturing with good mass productivity. The dielectric waveguide device is a phase shifter, a high frequency switch, an attenuator or the like.

BRIEF DESCRIPTION OF DRAWINGS

Other and further objects, features, and advantages of the invention will be more explicit from the following detailed description taken with reference to the drawings.

FIG. 19 is a perspective view schematically showing a phase shifter 150 according to yet another embodiment of the invention.

FIG. 20 is a perspective view schematically showing a phase shifter 160 according to yet another embodiment of the invention.

FIG. 21 is a sectional view schematically showing a phase shifter 170 according to yet another embodiment of the invention.

BEST MODE FOR CARRYING OUT THE INVENTION

Figure 1:
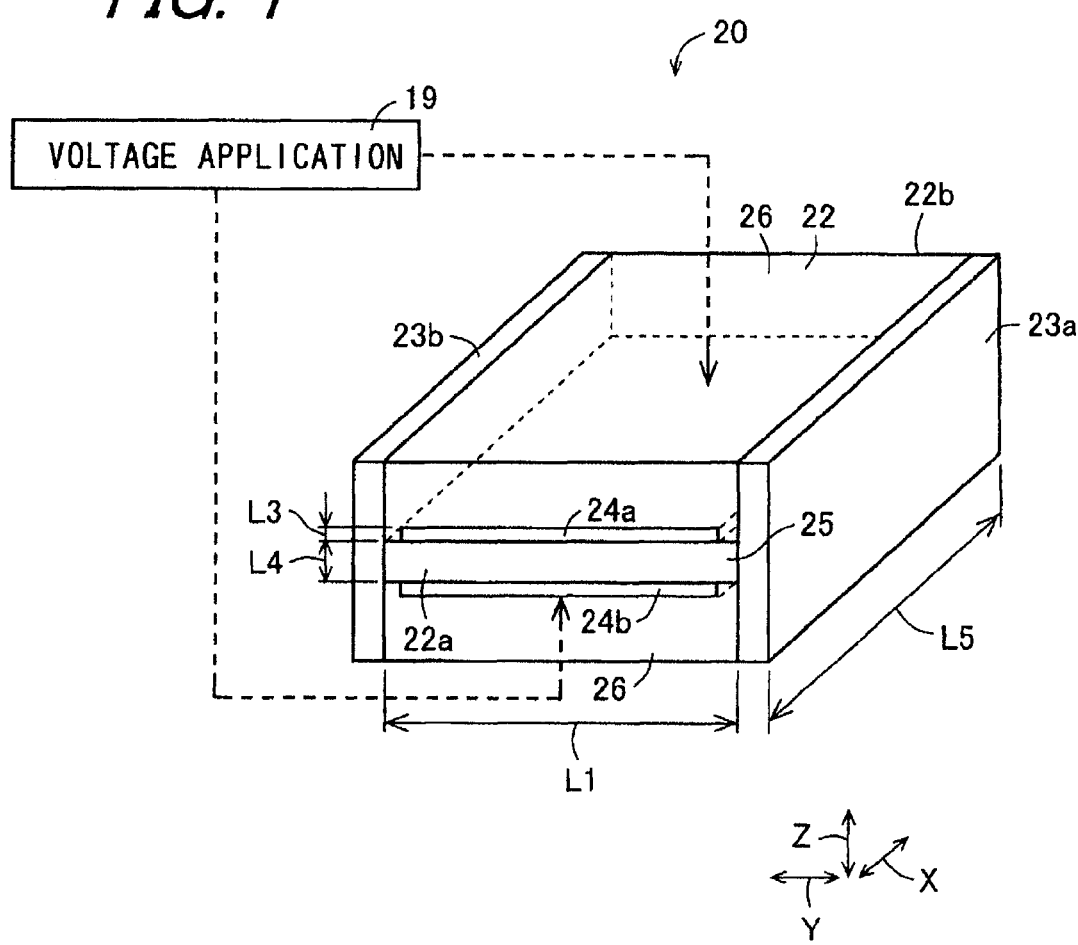
FIG. 1 is a perspective view schematically showing a phase shifter 20 according to an embodiment of the invention.

Now referring to the drawings, preferred embodiments of the invention are described below.

FIG. 1 is a perspective view schematically showing a phase shifter 20 according to an embodiment of the invention. The phase shifter 20 includes a dielectric part 22, a pair of first and second plate conductor parts 23a and 23b, a pair of first and second electrodes 24a and 24b, and a voltage application unit 19. The phase shifter 20 according to the embodiment of the invention substantially has a rectangular parallelepiped shape. A section of the phase shifter 20 perpendicular to a propagation direction X of electromagnetic wave has the same shape as an end face of the phase shifter 20 in the propagation direction X.

The dielectric part 22 is made of a dielectric, and includes a first dielectric part 25 having a variable part which varies in dielectric constant depending on an applied electric field and second dielectric parts 26. The dielectric part 22 has a first input/output end 22a to which the electromagnetic wave is inputted, and a second input/output end 22b from which the electromagnetic wave is outputted. The first input/output end 22a and the second input/output end 22b are individually formed on the upstream and downstream sides of the propagation direction X along the propagation direction (an extension direction of the guide) X in which electromagnetic wave propagates. In the embodiment of the invention, the dielectric part 22 has a rectangular parallelepiped shape, and the first input/output end 22a and the second input/output end 22b are formed by planes perpendicular to the propagation direction X, and are opposed to each other. The sections of the dielectric part 22 perpendicular to the propagation direction X have a rectangular shape. The directions which are perpendicular to the propagation direction X and are also perpendicular to each other are referred to as "width direction Y" and "thickness direction z", respectively. In the embodiment of the invention, the width direction Y is a longitudinal direction on the section of the first dielectric part 25 of the dielectric part 22 perpendicular to the propagation direction X, and the thickness direction Z is a lateral direction on the section of the first dielectric part 25 of the dielectric part 22 perpendicular to the propagation direction X.

In the embodiment of the invention, the first dielectric part 25 has a variable part, and is made of, for example, $Ba_{(1-x)}Sr_xTiO_3$ (abbreviated to BST), $Mg_{(1-x)}Ca_xTiO_3$, $Zn_{(1-x)}Sn_xTiO_3$, BaO—PbO—$Nd_2O_3$—$TiO_2$ or $Bi_{1.5}Zn_{1.0}Nb_{1.5}O_7$. As the applied electric field becomes larger, that is, as the strength of an electric filed to be applied is increased, the dielectric constant of the first dielectric part 25 becomes smaller. The first dielectric part 25 has a rectangular parallelepiped shape, and is formed between both end portions of the dielectric part 22 in the propagation direction X and between both end portions of the dielectric part 22 in the width direction Y.

The second dielectric parts 26 are laminated on both sides of the first dielectric part 25 with the first dielectric part 25 sandwiched therebetween. The second dielectric parts 26 are symmetrically formed with the first dielectric part 25 sandwiched therebetween. The second dielectric parts 26 are provided on both sides of the first dielectric part 25 in the thickness direction Z. The second dielectric parts 26 substantially have a rectangular parallelepiped shape. The second dielectric parts 26 are made of a material having a dielectric constant lower than the dielectric constant of the first dielectric part 25. The second dielectric parts 26 are made to have a dielectric constant less than the dielectric constant of the first dielectric part 25 when the first dielectric part 25 is changed in dielectric constant and has the smallest dielectric constant.

The second dielectric parts 26 are made of glass, single crystal, ceramics, or resin. Examples of glass include quartz glass and crystallized glass. Examples of single crystal include crystal, sapphire, MgO, and $LaAlO_3$. Examples of ceramics include alumina, forsterite, and cordierite. Examples of resin include epoxy resin, fluorine resin, and a liquid crystal polymer. The second dielectric parts 26 may be made of air, but it is preferable made of the above-described solid material that can mechanically hold the first dielectric part 25 and has a dielectric constant higher than air.

By providing the second dielectric parts 26 made of the solid material, the wavelength of electromagnetic wave propagating along the first dielectric part 22 can be reduced in a portion sandwiched between the first and second plate conductor parts 23a and 23b, excluding the first dielectric part 25, than the wavelength of electromagnetic wave in air. Accordingly, the phase shifter 20 can be small in size. The first and second plate conductor parts 23a and 23b are mechanically supported by the second dielectric parts 26, and thus mechanical strength can be improved. In addition, the first and second plate conductor parts 23a and 23b can be manufactured by a thin film forming technology, a thick film printing technology, or a sheet-like ceramic technology. Therefore, in manufacturing, a phase shifter suitable for reduction in size can be achieved.

The first and second plate conductor parts 23a and 23b are provided to be in close contact with the dielectric part 22 with the dielectric part 22 sandwiched therebetween in the width direction Y perpendicular to the propagation direction X of the electromagnetic wave in the dielectric part 22 and the thickness direction Z in which the first and second dielectric parts 25 and 26 are laminated. That is the first and second plate conductor parts 23a and 23b are provided on both sides of the first and second dielectric parts 25 and 26. The first and second plate conductor parts 23a and 23b are formed to have conductivity and to be plate-shaped in such a manner that the surfaces facing the dielectric part 22 are in parallel to each other. The first and second plate conductor parts 23a and 23b are individually laminated on the end faces of the dielectric part 22 in the width direction Y, and are formed over the entire end face in the width direction Y.

The first and second plate conductor parts 23a and 23b are made of a low-resistivity metal, a metal which can be fired simultaneously with the dielectric part 22 at high temperature, a solder, or a conductive paste. The low-resistivity metal is selected from a group consisting of gold (Au), copper (Cu), aluminum (Al), platinum (Pt), titanium (Ti), silver (Ag), palladium (Pd), zinc (Zn), and chromium (Cr). The first and second plate conductor parts 23a and 23b may be made of one selected from a group consisting of gold (Au), copper (Cu), aluminum (Al), platinum (Pt), titanium (Ti), silver (Ag), palladium (Pd), zinc (Zn), and chromium (Cr), an alloy of at least two metals, or a laminate of them. Examples of the metal which can be fired simultaneously with the dielectric part 22 at high temperature include tungsten (W). Examples of the conductive paste include a material containing a metal filler and binder resin binding the metal filler. The first and second plate conductor parts 23a and 23b may be made of an oxide conductor, such as ITO (Indium Tin Oxide), tin oxide, iridium oxide, or $SrRuO_3$. The first and second plate conductor parts 23a and 23b are preferably made of a low-resistivity metal. The first and second plate conductor parts 23a and 23b are made to have a thickness, that is, in the width direction Y, larger than a skin depth for the frequency of electromagnetic wave propagating along the dielectric part 22.

An interval L1 between the first and second plate conductor parts 23a and 23b is set depending on the wavelength of the electromagnetic wave which should propagate along the dielectric part 22, and is set to be half or less of the wavelength of electromagnetic wave propagating along the second dielectric parts 26. By setting the interval L1 in this way, a non-radioactive dielectric guide (NRD guide) serving as a transmission line is formed by the dielectric part 22 and the first and second plate conductor parts 23a and 23b. The electromagnetic wave propagating along the first dielectric part 25 does not leak between the first and second plate conductor parts 23a and 23b and becomes non-radioactive. Thus a loss can be reduced.

The first and second electrodes 24a and 24b are embedded in the dielectric part 22. The first and second electrodes 24a and 24b are individually provided between the first dielectric part 25 and the second dielectric parts 26. The first and second electrodes 24a and 24b are provided to be surface symmetric with respect to a virtual plane perpendicular to the thickness direction Z. The first dielectric part 25 is sandwiched between the first and second electrodes 24a and 24b, and are individually laminated on both end faces of the first dielectric part 25 in the thickness direction Z. The first and second electrodes 24a and 24b are provided between both end portions of the first dielectric part 25 in the propagation direction X, and are individually provided away from the first and second plate conductor parts 23a and 23b. The first and second electrodes 24a and 24b have a rectangular parallelepiped shape, and are laminated on the first dielectric part 25 of the dielectric part 22, excluding both end portions in the width direction Y.

The first and second electrodes 24a and 24b are electrodes for applying an electric field to the first dielectric part 25. The first and second electrodes 24a and 24b are made of the same material as the first and second plate conductor parts 23a and 23b. Alternatively, the first and second electrodes 24a and 24b are made of a semiconductor material, such as silicon (Si), germanium (Ge), or gallium arsenide (GaAs), or a high-resistance material, such as tantalum nitride or a NiCr alloy.

The first and second electrodes 24a and 24b are made to have a thickness L3 less than the skin depth for the frequency of the electromagnetic wave which should propagate along the first dielectric part 25. When the skin depth is "$\delta$", permeability is "$\mu$", conductivity is "$\sigma$", and an angular frequency is "$\omega$", the skin depth is expressed by Expression 1. Moreover, $\omega=2\pi f$ (f is a frequency). If electromagnetic wave enters the conductor, the amplitude of the electromagnetic wave becomes 1/e at the skin depth.

$$\delta = \sqrt{\frac{2}{\mu\sigma\omega}} \quad (1)$$

Accordingly, when the first and second electrodes 24a and 24b are embedded in the dielectric part 22, a loss due to the first and second electrodes 24a and 24b can be suppressed. In addition, the first and second electrodes 24a and 24b can be provided to be close to each other, and thus the phase shifter 20 can be driven at a low voltage. In this embodiment, the first and second electrodes 24a and 24b are made to have volume resistivity of $10^{-5}\Omega\cdot m$ or more, and preferably, $10^{-4}\Omega\cdot m$ or more. However, if the first and second electrodes 24a and 24b are excessively thinned, it is difficult for electric charge to move in the first and second electrodes 24a and 24b, and thus it is difficult to uniformly apply an electric field over the first and second electrodes 24a and 24b. Therefore, the first and second electrodes 24a and 24b are formed to have a prescribed thickness or more such that the movement of electric charge in the first and second electrodes 24a and 24b is not interfered with, and the electric field can be uniformly applied over the first and second electrodes 24a and 24b.

The first and second electrodes 24a and 24b embedded in the second dielectric parts 22 preferably have resistivity of $10^{-5}\Omega\cdot m$ to $10^{8}\Omega\cdot m$. If the first and second electrodes 24a and 24b have resistivity less than $10^{-5}\Omega\cdot m$, undesirably, the electromagnetic wave in the electrodes is largely attenuated, and a loss is increased. If the resistivity of the first and second electrodes 24a and 24b is much smaller than $10^{-5}\Omega\cdot m$, a desired mode may be cut off, and electromagnetic wave may not be propagated. To the contrary, if the resistivity of the first and second electrodes 24a and 24b exceeds $10^{8}\Omega\cdot m$ and becomes excessively large, a difference in resistivity between the first and second electrodes 24a and 24b and the dielectric sandwiched between the first and second electrodes 24a and 24b is decreased, and accordingly a desired voltage may not be applied to the dielectric due to voltage drop.

The thicknesses of the first and second electrodes 24a and 24b are determined depending on resistivity of a material for the first and second electrodes 24a and 24b. If the first and second electrodes 24a and 24b are excessively thick, the loss is increased, and if they become much thicker, a desired mode may be cut off and the electromagnetic wave may not be propagated. If the first and second electrodes 24a and 24b are excessively thin, a desired voltage may not be applied to the dielectric due to voltage drop. For example, when it is assumed that the first and second electrodes 24a and 24b have resistivity of $1\times10^{-4}$ ($\Omega\cdot m$) (assuming that TaN is used for the first and second electrodes 24a and 24b) or resistivity of $1\times10^{-3}$ ($\Omega\cdot m$), a loss due to the electrode per 1 mm for electromagnetic wave of 77 GHz according to electromagnetic analysis is shown in Table 1.

TABLE 1

| Resistivity = $1 \times 10^{-4}$ ($\Omega \cdot m$) | |
|---|---|
| Electrode Thickness (nm) | Loss (dB) |
| 10 | 0.9 |
| 30 | 2.5 |
| 100 | 8.2 |
| 320 | 21 |

TABLE 2

| Resistivity = $1 \times 10^{-3}$ ($\Omega \cdot m$) | |
|---|---|
| Electrode Thickness (nm) | Loss (dB) |
| 10 | 0.1 |
| 30 | 0.3 |
| 100 | 1.0 |
| 320 | 3.0 |

The results of electromagnetic analysis shown in Tables 1 and 2 indicate that, when the electrode has resistivity of $1\times10^{-4}$ ($\Omega\cdot m$), the electrode thickness is preferably 30 nm or less for practical use, and when the electrode has resistivity of $1 \times 10^{-3}$ (Ω·m), the electrode thickness is preferably 320 nm or less for practical use. Here, as a practical reference, a loss of 3 dB is used.

The phase shifter 20 also includes a voltage application unit 19. The voltage application unit 19 is implemented by an electrical circuit that applies a voltage within a prescribed range between the pair of first and second electrodes 24a and 24b. The voltage application unit 19 is connected to the first and second electrodes 24a and 24b, and sets the electrodes at predetermined potentials to apply a voltage between the first and second electrodes 24a and 24b. Accordingly, an electric field is applied to the first dielectric part 25 sandwiched between the first and second electrodes 24a and 24b. The voltage application unit 19 includes, for example, a voltage divider, and supplies voltages divided by the voltage divider to the first and second electrodes 24a and 24b. The voltage application unit 19 may apply a multi-level voltage to the first and second electrodes 24a and 24b. The voltage application unit 19 applies an AC voltage of a frequency lower than the frequency of the propagating electromagnetic wave or a DC voltage to the first and second electrodes 24a and 24b. The voltage application unit 19 applies a voltage according to the amount of a phase to be shifted to the first and second electrodes 24a and 24b.

By causing the voltage application unit 19 to apply the voltage between the first and second electrodes 24a and 24b, and changing the magnitude of the voltage to be applied within a prescribed range, it is possible to change the phase of the electromagnetic wave to be guided along the dielectric part 22 in accordance with the magnitude of the voltage to be applied, that is, the magnitude of the applied electric field. If the applied electric field becomes larger, the dielectric forming the first dielectric part 25 is decreased in dielectric constant. Thus, it is possible to change the phase of electromagnetic wave guided along the dielectric part 22.

The cutoff frequency fc of the non-radioactive dielectric guide formed by the dielectric part 22 and the first and second plate conductor parts 23a and 23b in the phase shifter 20 is determined in accordance with the dielectric constant of the dielectric forming the first dielectric part 25, the size of the first dielectric part 25 (the size of the section perpendicular to the propagation direction X), an interval L4 between the first and second electrodes 24a and 24b, the interval L1 between the plate conductor parts 23a and 23b, and the dielectric constant of dielectric bodies forming the second dielectric parts 26. The size of the first dielectric part 25 selected such that the cutoff frequency is less than the frequency (usable frequency) of the propagating electromagnetic wave. Let the cutoff frequency when a predetermined voltage is applied between the first and second electrodes 24a and 24b and when the first dielectric part 25 is decreased in dielectric constant be fc, and a usable frequency, that is, the frequency of the electromagnetic wave propagating along the dielectric part 22 be f. Then, the size of the first dielectric part 25, the interval L4 between the first and second electrodes 24a and 24b, the interval L1 between the first and second plate conductor parts 23a and 23b, and the dielectric constant of the dielectric bodies forming the second dielectric parts 26 are set such that the condition 1.03<f/fc<1.5, and preferably the condition 1.03<f/fc<1.2 is satisfied. In manufacturing the phase shifter 20, first, a dielectric material for forming the first dielectric part 25 and a dielectric material for forming the second dielectric parts 26 are determined, and the interval L1 between the first and second plate conductor parts 23a and 23b is determined. Thereafter, the size of the first dielectric part 25 is determined, and accordingly the interval L4 between the first and second electrodes 24a and 24b is determined.

The length L5 in the propagation direction X of the first dielectric part 25 to which an electric field is applied by the first and second electrodes 24a and 24b is set to an extent that a required phase change is obtained, for example, to be (2 m−1)/4 (where m is a natural number) times of the wavelength of the electromagnetic wave propagating along the dielectric part 22. Therefore, a difference in phase between reflected wave, which is reflected at a connection interface from another transmission line to the phase shifter 20 in the propagation direction X, and reflected wave, which passes through the phase shifter 20, is reflected at a connection interface from the phase shifter 20 to another transmission line, and returns to another transmission line, is set to π (rad), and thus the reflected waves can cancel each other. In addition, reflection at an interface of the phase shifter 20 and another transmission line is reduced, and thus an insertion loss can be suppressed.

As described above, according to the phase shifter 20, the electromagnetic wave primarily propagates along the first dielectric part 25 sandwiched between the first and second plate conductor parts 23a and 23b and between the second dielectric parts 26. The change in dielectric constant of the first dielectric part 25 significantly affects the change in phase of the electromagnetic wave, and thus the line length for obtaining a required phase change can be reduced. Therefore, the phase shifter 20 can be small in size. In addition, no mechanical driving part is provided, and thus a phase shifter having excellent durability and high reliability can be achieved.

The first and second electrodes 24a and 24b are embedded in the dielectric part 22, and are formed to be thinner than the skin depth for the frequency of the electromagnetic wave propagating the first dielectric part 25. Accordingly, even if the first and second electrodes 24a and 24b are provided to be in contact with the first dielectric part 25, the propagating electromagnetic wave can penetrate through the first and second electrodes 24a and 24b. For this reason, the electromagnetic wave can propagate without being cut off and there is no influence on waveguide modes. Further, in a state where a transmission loss due to the embedded of the first and second electrodes 24a and 24b is suppressed, an electric field with large electric field strength can be applied to the first dielectric part 25 by the first and second electrodes 24a and 24b, and thus it is possible to stably change the phase of the electromagnetic wave. Therefore, even if a voltage which is supplied to the first and second electrodes 24a and 24b in order to apply an electric field to the first dielectric part 25 is reduced, an electric field with large electric field strength is applied to the first dielectric part 25. In addition, even if the length of the transmission line is short, since the electric field with large electric field strength is applied to the first dielectric part 25, the amount of a phase change per unit length of the line length of the transmission line is increased. As a result, a small and low-voltage operable phase shifter 20 can be achieved.

In the phase shifter 20, by setting the frequency of the electromagnetic wave propagating along the dielectric part 22 to be near the cutoff frequency, a large phase change is obtained at a short line length around the cutoff frequency. Therefore, the phase shifter 20 can be small in size.

In this embodiment, the interval between the first and second plate conductor parts 23a and 23b is half or less of the wavelength of the electromagnetic wave propagating in the second dielectric parts 26. In other embodiments of the invention, however, the interval between the first and second plate conductor parts 23a and 23b may be set to be larger than half of the wavelength of the electromagnetic wave propagating in the second dielectric parts 26. In this case, an H guide is formed by the first and second plate conductor parts 23a and 23b and the dielectric part 22. Although a transmission loss is increased, as compared with the phase shifter 20 of the embodiment shown in FIG. 1, the same effects can be obtained.

In this embodiment, the first and second electrodes 24a and 24b are formed to extend from the first input/output end 22a to the second input/output end 22b in the propagation direction X. Alternatively, the first and second electrodes 24a and 24b may be formed to be discontinuous in the propagation direction X.

In the phase shifter 20 of the foregoing embodiment, the first dielectric part 25 is made of a material which varies in dielectric constant. In other embodiments of the invention, however, any first dielectric part 25 may be used insofar as it includes a variable part made of a material which varies in dielectric constant. The variable part is preferably formed in a portion where electric field strength becomes large. For example, the variable part is formed in a central portion along the width direction Y and the thickness direction Z. With this configuration, the amount of the phase change obtained when a phase shifter of the same size is manufactured is determined in accordance with an occupation ratio of the variable part in the first dielectric part 25 and a region of the first dielectric part 25 where the variable part is to be formed. Therefore, the amount of the phase change is small, as compared with a case where the entire first dielectric part 25 is made of a material which varies in dielectric constant, but a small phase shifter can be provided, similarly to the foregoing embodiment.

Figure 2:
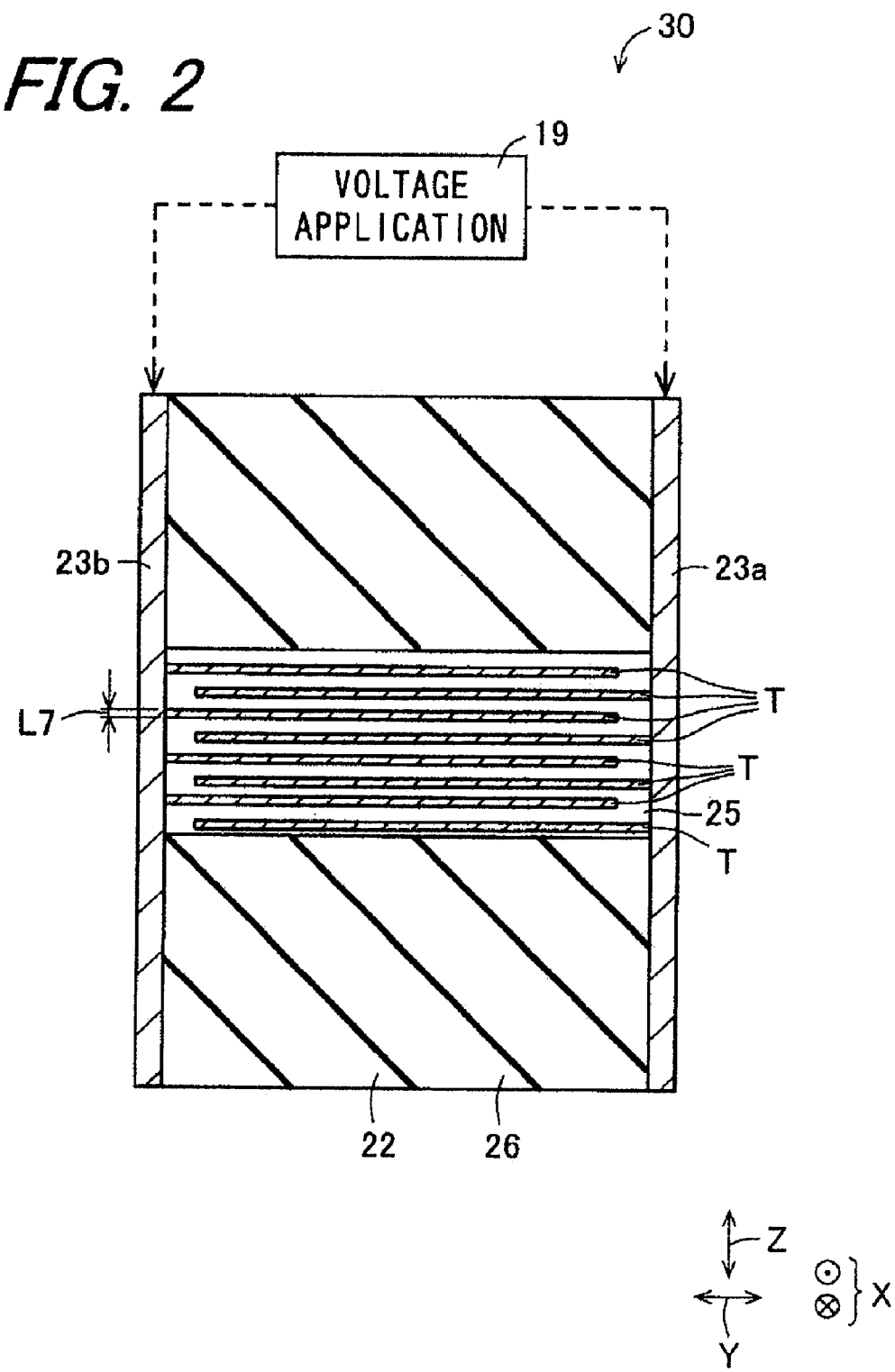
FIG. 2 is a sectional view schematically showing a phase shifter 30 according to another embodiment of the invention.

FIG. 2 is a sectional view schematically showing a phase shifter 30 according to another embodiment of the invention. The phase shifter 30 includes a dielectric part 22, a pair of first and second plate conductor parts 23a and 23b, a pair of first and second electrodes 24a and 24b, and a voltage application unit 19. The phase shifter 30 according to the embodiment of the invention substantially has a rectangular parallelepiped shape. The sections of the phase shifter 30 perpendicular to the propagation direction X of electromagnetic wave have the same shape at both end portions of the phase shifter 30 in the propagation direction X.

The phase shifter 30 of this embodiment is similar to the phase shifter 20 shown in FIG. 1, except for the configuration and positions of the electrodes. The same parts as those in the foregoing embodiment are represented by the same reference numerals, and descriptions thereof will be omitted.

The phase shifter 30 includes a dielectric part 22, first and second plate conductor parts 23a and 23b, a plurality of electrodes T1, T2, . . . , Tn−1, and Tn, and a voltage application unit 19. In the phase shifter 20 of the foregoing embodiment, the first and second electrodes 24a and 24b are individually provided between the first and second dielectric parts 25 and 26. In the phase shifter 30 of this embodiment, a plurality of electrodes T1, T2, . . . , $T_{n_1}-1$, and $T_{n_1}$ (where $n_1$ is a natural number of 2 or more) are embedded in the first dielectric part 25. Hereinafter, the electrodes T1, T2, . . . , $T_{n_1}-1$, and $T_{n_1}$ are collectively referred to as "electrodes T". Also, an unspecified electrode from among the electrodes T1, T2, . . . , $T_{n_1}-1$, and $T_{n_1}$ is referred to as "electrode T". The first dielectric part 25 is sandwiched between the second dielectric parts 26, that is, the second dielectric parts 26 are provided on both sides of the first dielectric part 25 in the thickness direction Z.

The electrodes T are provided to be spaced at intervals from each other in the thickness direction Z.

In addition, the thickness L7 of the electrodes T is the same as the thickness of the first and second electrodes 24a and 24b. The electrodes T are formed to have the same shape as that of the first and second electrodes 24a and 24b, and are made of the same material as the first and second electrodes 24a and 24b. The electrode T is provided such that its thickness direction is in parallel to the thickness direction Z.

Adjacent electrodes T in the thickness direction Z are connected to different plate conductor parts from among the first and second plate conductor parts 23a and 23b. That is, from among the electrodes T, odd-numbered electrodes T1, T3, . . . , Tm−2, and Tm (where m is a positive odd number) toward a first direction of the thickness direction Z are connected to the first plate conductor part 23a, and even-numbered electrodes T2, T4, . . . , Tk−2, and Tk (where k is a positive even number) toward the first direction of the thickness direction Z are connected to the second plate conductor part 23b.

As such, by individually connecting the electrodes T to one of the first and the second plate conductor parts 23a and 23b, if a voltage is applied to one of the first and second plate conductor parts 23a and 23b, a potential difference is generated between adjacent electrodes, and thus an electric field can be applied to the first dielectric part 25. Even if a plurality of electrodes T are formed, only by applying a voltage to the first and second plate conductor parts 23a and 23b, a voltage can be applied by adjacent electrodes T, and it is not necessary to separately form a wire to apply a voltage to each electrode T.

Preferably, a larger number of electrodes T are formed since the strength of an electric field to be applied to the first dielectric part 25 becomes larger, and the phase change can be increased. Meanwhile, if the number of electrodes T is excessively large, a loss is increased. The loss is determined depending on the sum of the thicknesses L7 of the individual electrodes T. When the electrodes T have resistivity of $1 \times 10^{-4}$ (Ω·m), the sum of the thicknesses L7 of the electrodes T is preferably 30 nm or less for practical use. When the electrodes T have resistivity of $1 \times 10^{-3}$ (Ω·m), the sum of the thicknesses L7 of the electrodes T is preferably 320 nm or less for practical use.

The individual electrodes T are provided to be spaced from one of the first and second plate conductor parts 23a and 23b to which the electrodes T are not connected.

According to the phase shifter 30, since the electrodes T are embedded in the first dielectric part 25, an electric field can be effectively applied to the first dielectric part 25. In addition, by making the interval between the electrodes T smaller, larger electric field strength can be applied to the first dielectric part 25. Therefore, the phase shifter 30 can be small in size and operable at a low voltage.

Only by applying a voltage to the first and second plate conductor parts 23a and 23b, a voltage can be applied by adjacent electrodes T. Further, it is not necessary to separately form a wire to apply a voltage to each electrode T. Therefore, simple implementation on a circuit board can be achieved.

Figure 3:
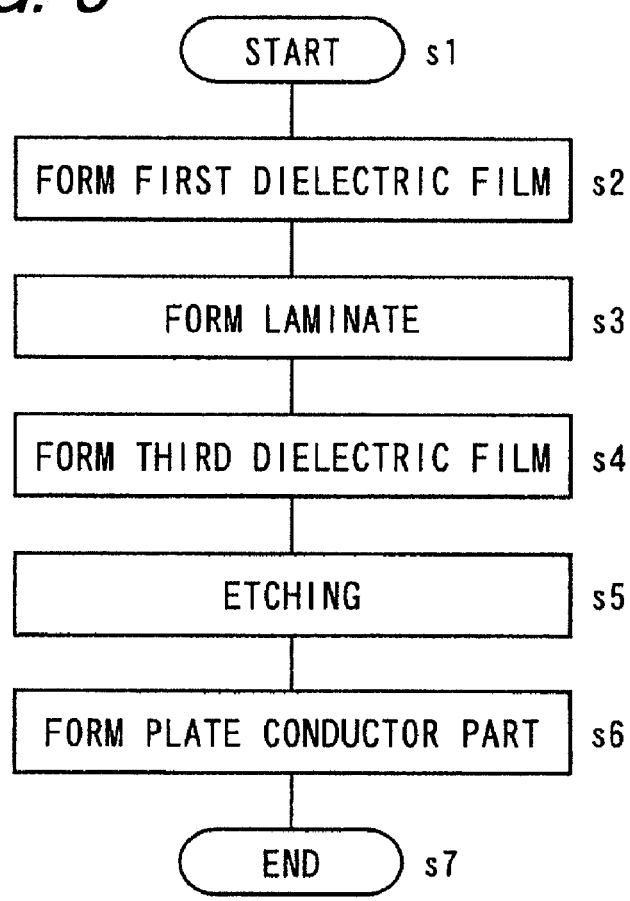
FIG. 3 is a flowchart showing a manufacturing process of the phase shifter 30.
Figure 4A:
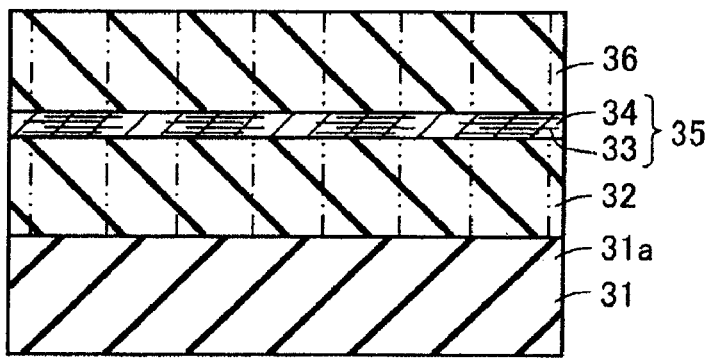
FIGS. 4A to 4C are schematic views showing a manufacturing process of the phase shifter 30.
Figure 4B:
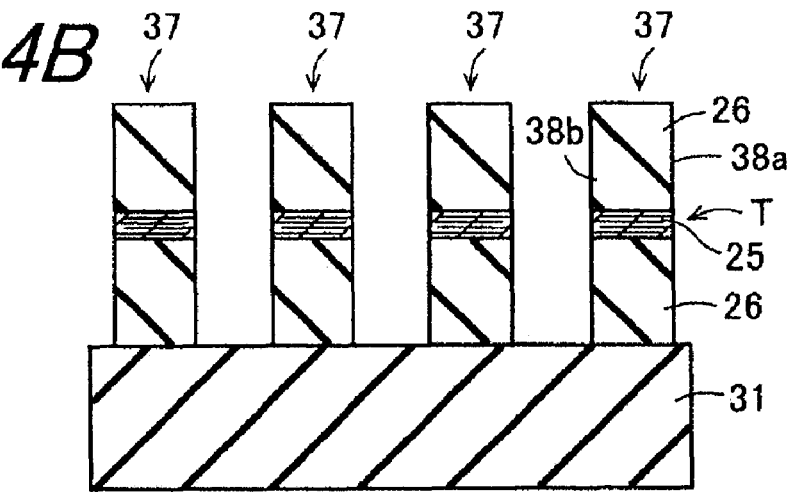
Figure 4C:
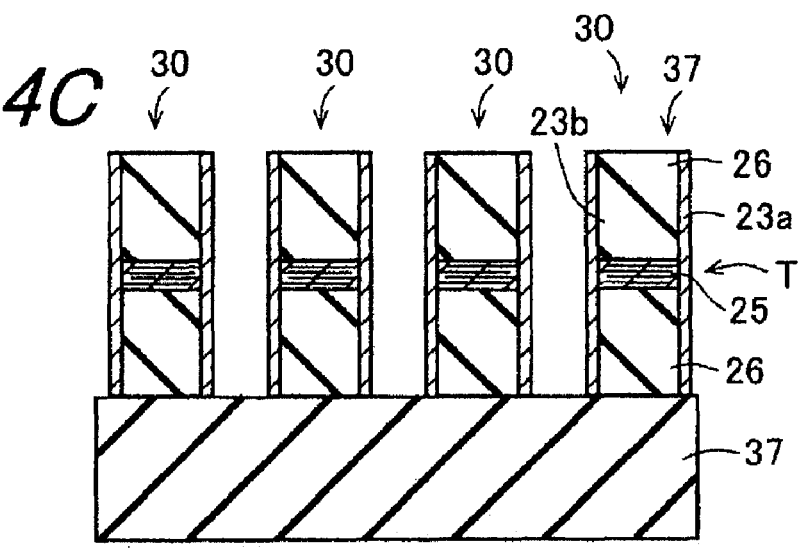

FIG. 3 is a flowchart showing a manufacturing process of the phase shifter 30. FIGS. 4A to 4C are schematic views showing a manufacturing process of the phase shifter 30. If the manufacturing process of the phase shifter 30 is started, the process progresses from Step s1 to Step s2. In Step s2, a first dielectric film 32 made of a dielectric having a predetermined dielectric constant is laminated on a first surface 31a of a substrate 31, and then the process progresses to Step s3. The substrate 31 is made of, for example, MgO single crystal.

In Step s3, an electrode film 33 which is made to be thinner than the skin depth for a prescribed frequency (usable frequency) of electromagnetic wave and a second dielectric film 34 which has a higher dielectric constant than that of the first dielectric film 32 and varies in dielectric constant depending on the magnitude of a voltage to be applied are alternatively laminated on the first dielectric film 32, thereby forming a laminate 35. In Step s3, adjacent electrode films 33 in a lamination direction of the electrode films 33 are formed to partially overlap each other. The electrode films 33 are made of a semiconductor material, such as silicon (Si), germanium (Ge), or gallium arsenide (GaAs), or a high-resistance material, such as tantalum nitride or a NiCr alloy. The second dielectric film 34 is made of, for example, $Ba_{(1-x)}Sr_xTiO_3$ (abbreviated to BST), $Mg_{(1-x)}Ca_xTiO_3$, $Zn_{(1-x)}Sn_xTiO_3$, BaO—PbO—$Nd_2O_3$—$TiO_3$, or $Bi_{1.5}Zn_{1.0}Nb_{1.5}O_7$.

Figure 5:
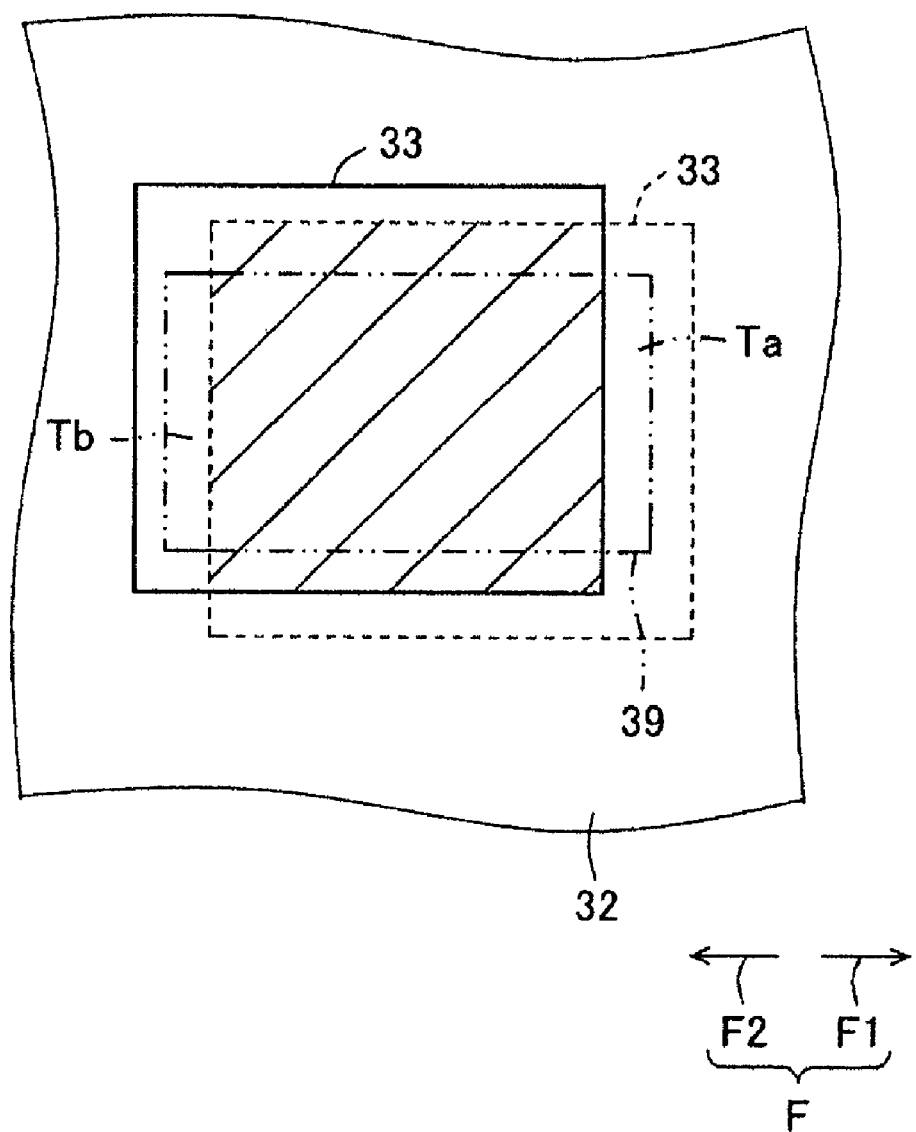
FIG. 5 is a plan view showing an example where a plurality of electrode films 33 and a plurality of second dielectric films 34 are laminated in Step s3.

FIG. 5 is a plan view showing an example where a plurality of electrode films 33 and a plurality of second dielectric films 34 are laminated in Step s3. In forming the electrode films 33, a metal mask having a rectangular through hole is used, and the electrode film 33 is formed at a portion corresponding to the through hole. Accordingly, a pattern can be formed simultaneously with the electrode film 33. After the electrode film 33 is formed, the second dielectric film 34 is formed to cover the electrode film 33 over the entire surface of the portion where the electrode film 33 is laminated, and the electrode film 33 is laminated on the second dielectric film 34 again. The electrode films 33 are individually formed to lean toward a first direction F1 or a second direction F2 in a predetermined direction F perpendicular to the lamination direction of the electrode films 33 and the second dielectric films 34 such that adjacent electrode films 33 in the lamination direction of the electrode films 33 partially overlap each other. The electrode films 33 have the same size. Therefore, in forming adjacent electrode films 33, the electrode films 33 are formed by shifting the metal mask toward the first direction F1 or the second direction F2 of the predetermined direction F, such that a plurality of electrode films 33 can be formed to partially overlap each other in the lamination direction. In FIG. 5, an overlap portion of adjacent electrode films 33 is indicated by a hatched region.

Next, the process progresses to Step s4. In Step s4, a third dielectric film 36 having a lower dielectric constant than that of the second dielectric film 34 is formed on the laminate 35. The third dielectric film 36 is made of the same material as the first dielectric film 32. For example, the third dielectric film 36 is made of glass, single crystal, ceramics, or resin. The first dielectric film 32 and the third dielectric film 36 have the same film thickness. If Step s4 is ended, a laminate shown in FIG. 4A can be obtained.

Next, the process progresses to Step s5. In Step s5, the first dielectric film 32, the laminate 35, and the third dielectric film 36 are etched. Thus, convex portions 37 shown in FIG. 4B are formed. Each of the convex portions 37 includes parts of the first dielectric film 32, the laminate 35, and the third dielectric film 36. The convex portions 37 are formed such that the electrode films 33, which are formed to lean toward the first direction F1 of the predetermined direction F, are exposed from a first end face 38a among a pair of end faces 38a and 38b opposed to each other in the lamination directions of the electrode films 33 and the second dielectric films 32, and the electrode films 33, which are formed to lean toward the second direction F2 of the predetermined direction F, are exposed from the second end face 39b among a pair of end faces 38a and 38b. As for etching, a known etching method, such as chemical dry etching, reactive ion etching, or wet etching, may be used. The materials of the electrode film 33 and the second dielectric film 34 are selected such that the etching rate of the second dielectric film 34 is higher than that of the electrode film 33. Therefore, the end portions of the electrode films 33 can be exposed to the first and second end faces 38a and 38b of each of the convex portions 37. For example, a portion excluding a region indicated by a virtual line 39 shown in FIGS. 4A to 4C is removed by etching. In this way, electrodes Ta are formed to be exposed to the end face in the first direction F1 while being not exposed to the end face in the second direction F2, and electrodes Tb are formed to be exposed to the end face in the second direction F2 while being not exposed to the end face in the first direction F1 are formed.

Next, the process progresses to Step s6. In Step s6, first and second plate conductor parts 23a and 23b are formed on the first and second end faces 38a and 38b of each of the convex portions. Thus, as shown in FIG. 4C, the phase shifter 30 is formed. The first and second plate conductor parts 23a and 23b are formed by forming a conductive film to cover the convex portion 37 and removing the conductive film excluding the first and second end faces 38a and 38b by photolithography. If Step s6 is ended, the process progresses to Step s7, and the manufacturing process is ended. The first to third dielectric films 32, 34, and 36 and the electrode film 33 may be formed by a known thin film forming method, such as vapor deposition, sputtering, or CVD (Chemical Vapor Deposition).

By this process, the phase shifter 30 can be achieved in which the even-numbered electrodes T and the odd-numbered electrodes T in the lamination direction of the electrode films 33 are connected to different plate conductor parts. By this manufacturing process, the laminated electrode films 33 can be accurately and reliably led to the first end face 38a and the second end face 38b. Therefore, the phase shifter 30 can be formed by a manufacturing method suitable for a known semiconductor process. As a result, a small, accurate, and stable phase shifter can be manufactured with good mass productivity.

If the electrode films 33 are formed by using a photomask having a plurality of through holes, a plurality of phase shifters 30 can be formed on the substrate 31. In this case, a boundary portion of the substrate 31 between adjacent phase shifters 30 may be diced and cut out separately.

Figure 6:
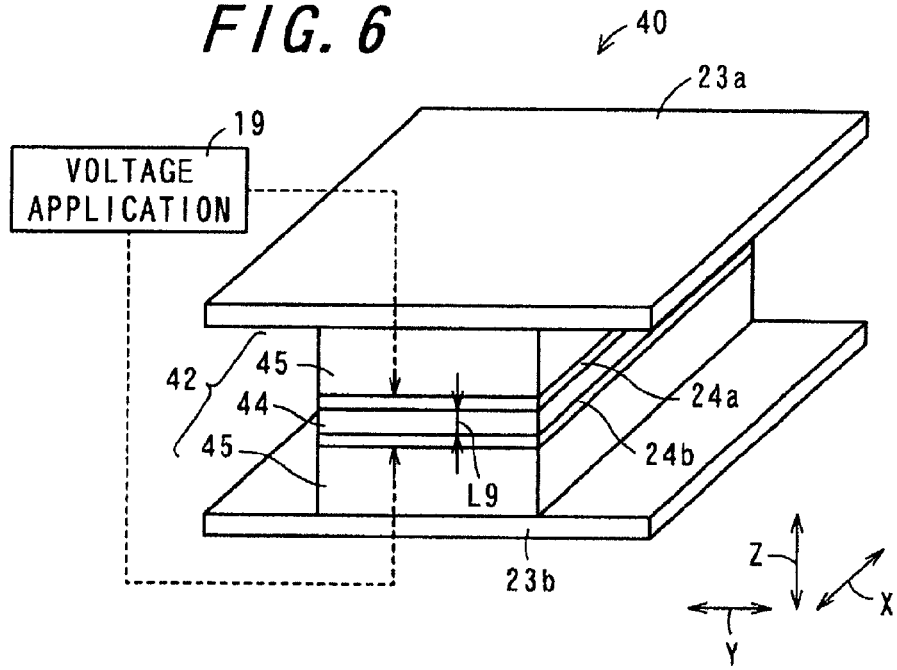
FIG. 6 is a perspective view schematically showing a phase shifter 40 according to yet another embodiment of the invention.

FIG. 6 is a perspective view schematically showing a phase shifter 40 according to yet another embodiment of the invention. In this embodiment, the same parts as those in the foregoing embodiments are represented by the same reference numerals, and descriptions thereof will be omitted. The section of the phase shifter 40 perpendicular to the propagation direction X of the electromagnetic wave has the same shape as the end face of the phase shifter 40 in the propagation direction X.

The phase shifter 40 forms a non-radioactive dielectric guide (NRD guide). The phase shifter 40 includes a dielectric part 42, first and second plate conductor parts 23a and 23b, first and second electrodes 24a and 24b, and a voltage application unit 19. The dielectric part 42 has a rectangular parallelepiped shape.

The dielectric part 42 includes a first dielectric part 44 and second dielectric parts 45, and the first and second electrodes 24a and 24b are embedded in the dielectric part 42. The first dielectric part 44 is made of the same material as the first dielectric part 25 in the foregoing embodiment, and second dielectric parts 45 are made of the same material as the second dielectric parts 26 in the foregoing embodiment.

The dielectric part 42 is provided to be sandwiched between the first and second plate conductor parts 23a and 23b. In a lamination direction Z of the dielectric part 42 and the first and second plate conductor parts 23a and 23b, and a width direction Y perpendicular to the propagation direction X of the electromagnetic wave, the dielectric part 42 is provided to be spaced from the end portions of the first and second plate conductor parts 23a and 23b.

The first dielectric part 44 is provided in the central portion of the lamination direction Z. On both sides of the first dielectric part 44 in the lamination direction Z, the second dielectric parts 45 are provided. The first and second electrodes 24a and 24b are provided on both end faces of the first dielectric part 44 in the thickness direction Z, and are embedded between the first and second dielectric parts 44 and 45 with the first dielectric part 44 sandwiched therebetween. The first and second electrodes 24a and 24b are formed over both end faces of the first dielectric part 44 in the thickness direction Z.

The second dielectric parts 46 are symmetrically formed with the first dielectric part 45 sandwiched therebetween, and the first and second electrodes 24a and 24b are symmetrically formed with the first dielectric part 45 sandwiched therebetween.

The voltage application unit 19 is connected to the first and second electrodes 24a and 24b, thereby changing the phase of the electromagnetic wave propagating along the phase shifter 40. Therefore, the same effects as the phase shifters in the foregoing embodiments can be obtained.

Figure 7:
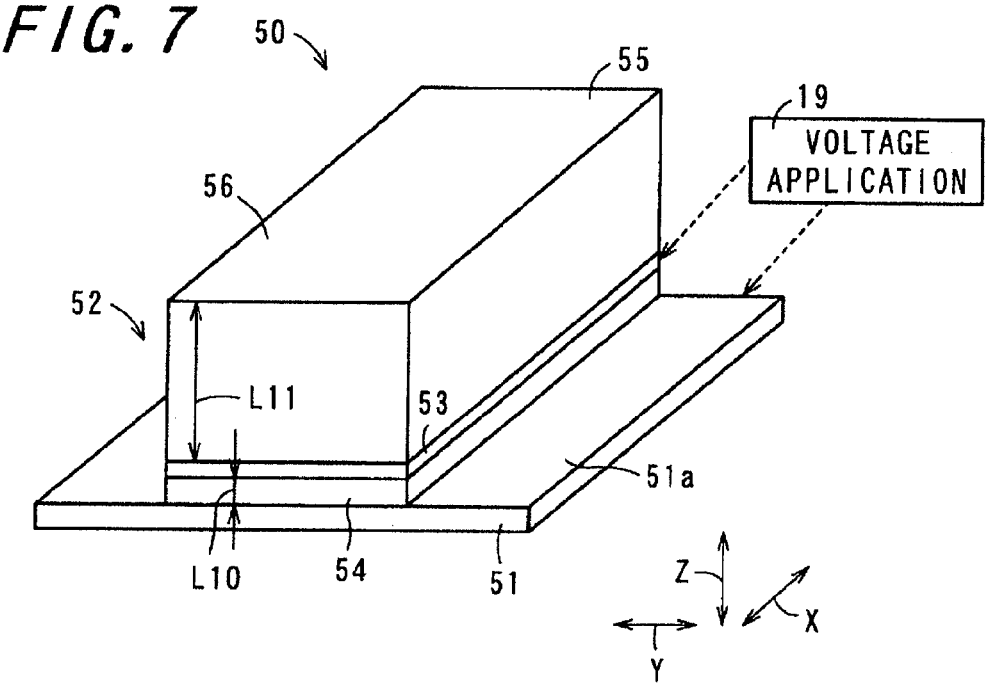
FIG. 7 is a perspective view schematically showing a phase shifter 50 according to yet another embodiment of the invention.

FIG. 7 is a perspective view schematically showing a phase shifter 50 according to yet another embodiment of the invention. In this embodiment, the same parts as those in the foregoing embodiments are represented by the same reference numerals, and descriptions thereof will be omitted. The section of the phase shifter 50 perpendicular to the propagation direction X of the electromagnetic wave has the same shape as the end face of the phase shifter 50 in the propagation direction X.

The phase shifter 50 forms an image guide. The phase shifter 50 includes a ground conductor plate 51, a dielectric part 52, and an electrode 53. The ground conductor plate 51 has a rectangular parallelepiped shape, and its first surface 51a in the thickness direction Z is a planar surface. The dielectric part 52 is laminated on the first surface 51a.

The dielectric part 52 includes a first dielectric part 54 and second dielectric parts 55, and the electrode 53 is embedded in the dielectric part 52. The first dielectric part 54 is laminated on the first surface 51a, the electrode 53 is laminated on the first dielectric part 25, and the second dielectric parts 26 is laminated on the electrode 53. A laminate 56 of the first dielectric part 54, the electrode 53, and the second dielectric parts 55 have a rectangular parallelepiped shape, and is formed between both end portions of the ground conductor plate 51 in the propagation direction X. The laminate 56 is provided to be spaced from the end portions of the ground conductor plate 51 in the width direction Y.

The first dielectric part 54 is made of the same material as the first dielectric part 25 in the foregoing embodiment, and the second dielectric parts 55 are made of the same material as the first dielectric part 25 or the second dielectric parts 26 in the foregoing embodiment. The electrode 53 is made of the same material and thickness as the first and second electrodes 24a and 24b in the foregoing embodiments. The ground conductor plate 51 is made of the same material as the plate conductor parts 23a and 23b in the foregoing embodiments.

The length L11 of the second dielectric parts 55 in the thickness direction is set such that, assuming a cutoff frequency when a predetermined voltage is applied between the electrode 53 and the ground conductor plate 51 and the dielectric constant of the first dielectric part 54 is decreased is fc, and a usable frequency, that is, the frequency of the electromagnetic wave propagating along the dielectric part 52 is f, the condition 1.03<f/fc<1.5, and preferably the condition 1.03<f/fc<1.2 is satisfied.

The voltage application unit 19 is connected to the electrode 53 and the ground conductor plate 51, thereby changing the phase of the electromagnetic wave propagating along the phase shifter 40. Therefore, the same effects as the phase shifters in the foregoing embodiments can be obtained.

Figure 8:
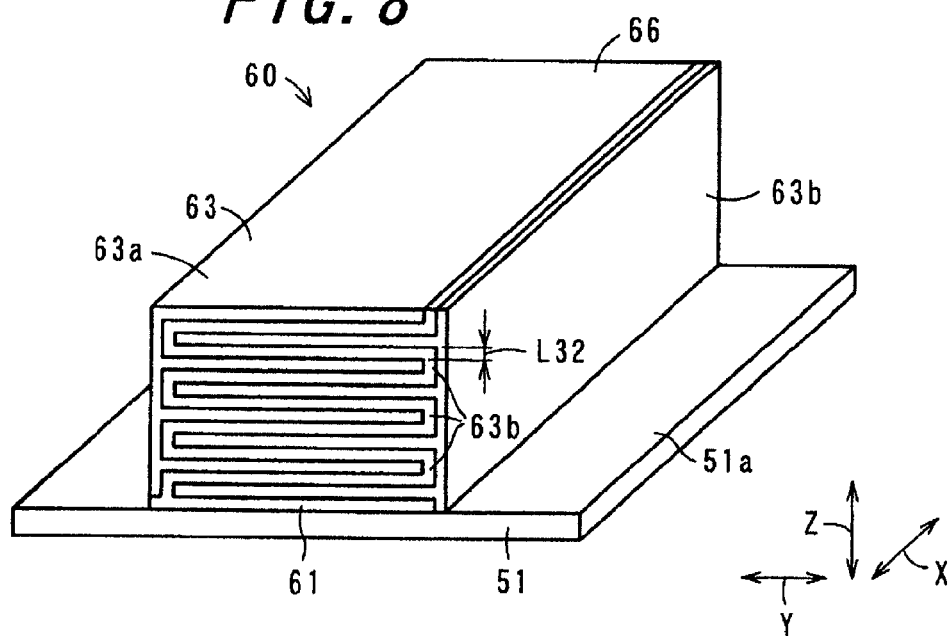
FIG. 8 is a perspective view schematically showing a phase shifter Go according to yet another embodiment of the invention.

FIG. 8 is a perspective view schematically showing a phase shifter 60 according to yet another embodiment of the invention. In this embodiment, the same parts as those in the foregoing embodiments are represented by the same reference numerals, and descriptions thereof will be omitted. The section of the phase shifter 60 perpendicular to the propagation direction X of the electromagnetic wave has the same shape as the end face of the phase shifter Go in the propagation direction X.

The phase shifter 60 forms an image guide. The phase shifter 60 includes a ground conductor plate 51, a dielectric part 61, and an electrode 63.

The dielectric part 61 is made of the same material as the first dielectric part 25 in the foregoing embodiment. The dielectric part 61 has a rectangular parallelepiped shape and is formed between both end portions of the ground conductor plate 51 in the propagation direction X. The dielectric part 61 is provided to be spaced from the end portions of the ground conductor plate 51 in the width direction Y.

The electrode 63 is embedded in the dielectric part 61. The electrode 63 includes a first electrode 63a and a second electrode 63b that are formed at a prescribed interval L32 in the thickness direction Z. The prescribed interval L32 is set, for example, to be in a range of 0.1 μm to 50 μm. Preferably, the interval L32 is small since the strength of an electric field to be applied to the dielectric part 61 becomes larger, and the phase change can be increased. Meanwhile, if the interval L32 is excessively small, a loss is increased. If the interval L32 is excessively large, the strength of the electric field to be applied to the dielectric part 61 becomes smaller. Accordingly, a line length required for obtaining a desired phase change becomes longer, and the phase shifter is increased in size.

The dielectric part 61 has a rectangular parallelepiped shape and a plate shape, and is formed between both end portions of the dielectric part 61 in the propagation direction X. The thickness of each of the first electrode 63a and the second electrode 63b is the same as the first and second electrodes 24a and 24b. In addition, the length of the first electrode 63a in the width direction Y is set as long as possible within a range to be not in contact with the second electrode 63b.

The dielectric part 61 is formed to extend in the thickness direction Z while meandering in the width direction Y on a section perpendicular to the propagation direction X.

An end portion of the second electrode 63b close to the ground conductor plate 51 in the thickness direction Z is connected to the ground conductor plate 51.

The voltage application unit 19 is connected to the first and second electrode 63a and 63b, and, in the phase shifter 60, similarly to the above-described phase shifters, it is possible to change the phase of the propagating electromagnetic wave. Therefore, the same effects as the phase shifters in the foregoing embodiments can be obtained.

Figure 9:
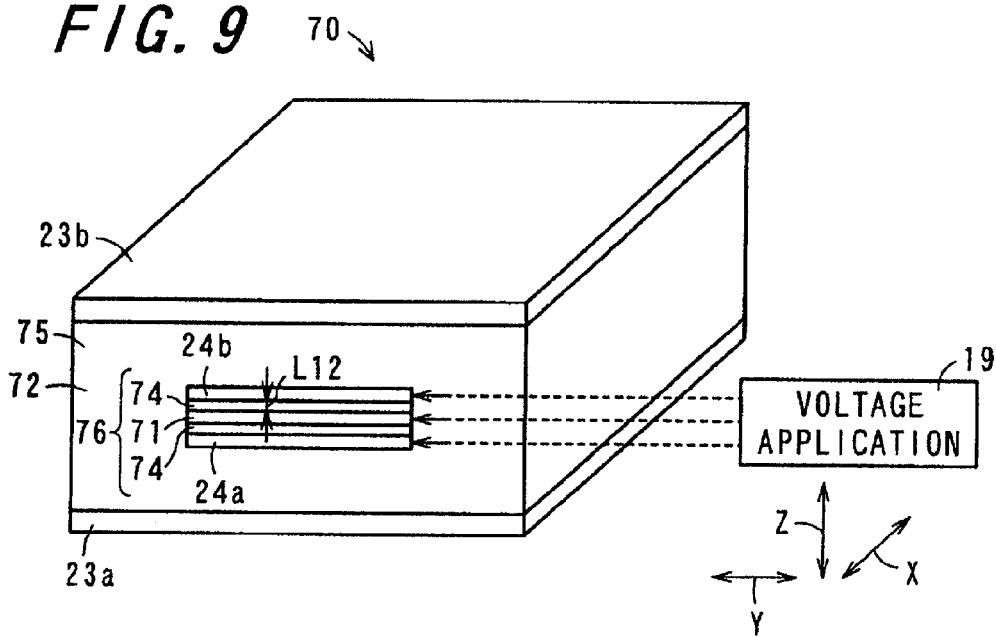
FIG. 9 is a perspective view schematically showing a phase shifter 70 according to yet another embodiment of the invention.

FIG. 9 is a perspective view schematically showing a phase shifter 70 according to yet another embodiment of the invention. In this embodiment, the same parts as those in the foregoing embodiments are represented by the same reference numerals, and descriptions thereof will be omitted. The section of the phase shifter 70 perpendicular to the propagation direction X of the electromagnetic wave has the same shape as the end face of the phase shifter 70 in the propagation direction X. The phase shifter 70 has a rectangular parallelepiped shape.

The phase shifter 70 forms a strip guide. The phase shifter 70 includes a strip conductor part 71, a dielectric part 72, first and second electrodes 24a and 24b, and first and second plate conductor parts 23a and 23b.

The strip conductor part 71 is made of a conductor and has a rectangular parallelepiped shape. The strip conductor part 71 is made of the same material as the first and second plate conductor parts 23a and 23b. The strip conductor part 71 is embedded in the dielectric part 72.

The dielectric part 72 has a rectangular parallelepiped shape. The strip conductor part 71 is embedded in the dielectric part 72 such that both end portions of the strip conductor part 71 in an extension direction are exposed from the end faces of the dielectric part 72. That is, the extension direction of the strip conductor part 71 is the propagation direction X of the electromagnetic wave. The strip conductor part 71 is formed in the central portion of the dielectric part 72.

The first and second plate conductor parts 23a and 23b are individually provided on both end faces of the dielectric part 72 in the thickness direction Z, and the dielectric part 72 is sandwiched between the first and second plate conductor parts 23a and 23b. The strip conductor part 71 is formed to be in parallel with the first and second plate conductor parts 23a and 23b. The size of the strip conductor part 71 in the thickness direction Z is set to be smaller than the size in the width direction Y.

The dielectric part 72 includes first and second dielectric parts 74 and 75. The first dielectric parts 74 are made of the same material as the first dielectric part 25 in the foregoing embodiment, and the second dielectric part 75 is made of the same material and thickness as the second dielectric parts 26 in the foregoing embodiment.

The first dielectric parts 74 are individually provided on both sides of the strip conductor part 71 in the thickness direction Z with the strip conductor part 71 sandwiched therebetween. The first dielectric parts 74 are formed over entireties of both end faces of the strip conductor part 71 in the thickness direction Z. A laminate 76 of the first dielectric parts 74 and the strip conductor part 71 has a rectangular parallelepiped shape.

The second dielectric part 75 is provided to surround the laminate 76. The first and second electrodes 24a and 24b are individually embedded between the first and second dielectric parts 74 and 75. The first and second electrodes 24a and 24b are individually provided on both sides of the laminate 76 in the thickness direction Z with the laminate 76 sandwiched therebetween. The first and second electrodes 24a and 24b are formed over entireties of the end faces of the laminate 76 in the thickness direction Z.

The voltage application unit 19 is connected to the strip conductor part 71 and the first and second electrodes 24a and 24b. Then, by applying a voltage between the strip conductor part 71 and the second electrode 24a and applying a voltage between the strip conductor part 71 and the second electrode 24b, it is possible to change the phase of the electromagnetic wave propagating along the phase shifter 70. Therefore, the same effects as the phase shifters in the foregoing embodiments can be obtained.

Figure 10:
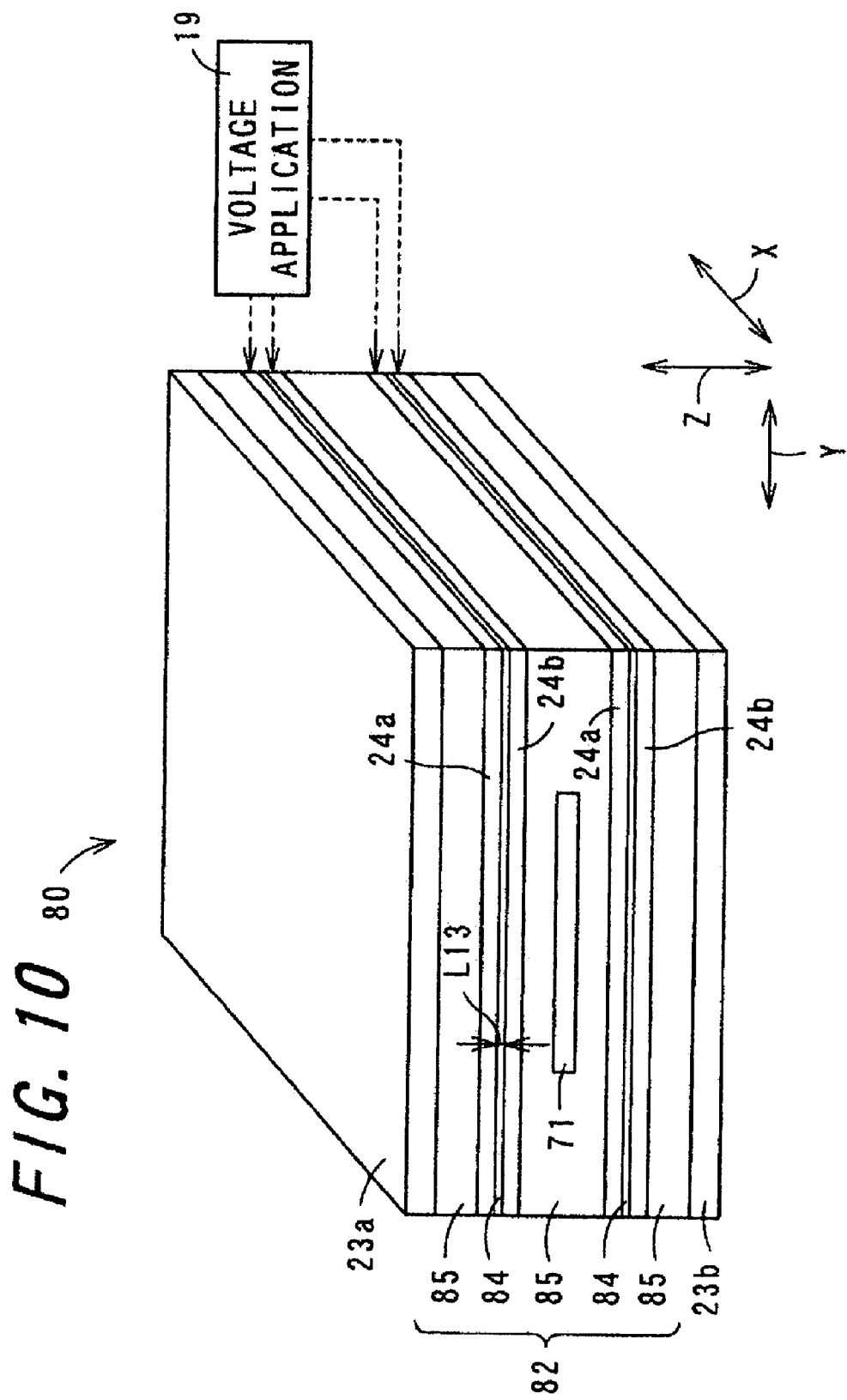
FIG. 10 is a perspective view schematically showing a phase shifter 80 according to yet another embodiment of the invention.

FIG. 10 is a perspective view schematically showing a phase shifter 80 according to yet another embodiment of the invention. In this embodiment, the same parts as those in the foregoing embodiments are represented by the same reference numerals, and descriptions thereof will be omitted. The phase shifter 80 has a rectangular parallelepiped shape. The section of the phase shifter 80 perpendicular to the propagation direction X of the electromagnetic wave has the same shape as the end face of the phase shifter 80 in the propagation direction X. The phase shifter 80 has a rectangular parallelepiped shape.

The phase shifter 80 forms a strip guide. The phase shifter 80 includes a strip conductor part 71, a dielectric part 82, first and second electrodes 24a and 24b, and first and second plate conductor parts 23a and 23b.

The dielectric part 82 has a rectangular parallelepiped shape. The strip conductor part 71 is embedded in the dielectric part 82 such that both end portions of the strip conductor part 71 in an extension direction are exposed from the end faces of the dielectric part 82. That is, the extension direction of the strip conductor part 71 is the propagation direction X of the electromagnetic wave. The strip conductor part 71 is formed in the central portion of the dielectric part 82.

The first and second plate conductor parts 23a and 23b are individually provided on both end faces of the dielectric part 82 in the thickness direction Z, and the dielectric part 82 is sandwiched between the first and second plate conductor parts 23a and 23b. The strip conductor part 71 is formed to be in parallel with the first and second plate conductor parts 23a and 23b. The size of the strip conductor part 71 in the thickness direction Z is set to be smaller than the size in the width direction Y.

the dielectric part 82 includes first and second dielectric parts 84 and 85. The first dielectric parts 84 are made of the same material as the first dielectric part 25 in the foregoing embodiment, and the second dielectric parts 85 are made of the same material as the second dielectric parts 26 in the foregoing embodiment.

The first dielectric parts 84 are individually provided on both sides of the strip conductor part 71 in the thickness direction Z so as to be spaced from the strip conductor part 71. The first dielectric parts 84 are formed between both end portions of the dielectric part 82 in the width direction Y and the thickness direction Z. The first dielectric parts 84 are formed at the same distance in the thickness direction Z with respect to the strip conductor part 71. That is, the first dielectric parts 84 are formed to be surface symmetric with respect to a virtual plane, which includes the axial line of the strip conductor part 71 and is perpendicular to the thickness direction Z. The individual first dielectric parts 84 are sandwiched between the second dielectric parts 85.

The first and second electrodes 24a and 24b are provided on both sides of the individual first dielectric parts 84 in the thickness direction Z with the first dielectric part 84 sandwiched therebetween. That is, the first and second electrodes 24a and 24b are individually provided on both sides of the individual first dielectric parts 84 and are embedded between the first and second dielectric parts 84 and 85. The first and second electrodes 24a and 24b are formed over entireties of the end faces of the individual first dielectric parts 84 in the thickness direction Z.

The dielectric part 84 and 85 are individually provided at positions to lean toward the strip conductor part 71, at which electric field strength of the propagating electromagnetic wave is large, between the strip conductor part 71 and the first and second plate conductor parts 23a and 23b in the thickness direction Z.

The voltage application unit 19 is connected to the first and second electrodes 24a and 24b, and thus it is possible to change the phase of the electromagnetic wave propagating along the phase shifter 80. Therefore, the same effects as the phase shifters in the foregoing embodiments can be obtained.

Figure 11:
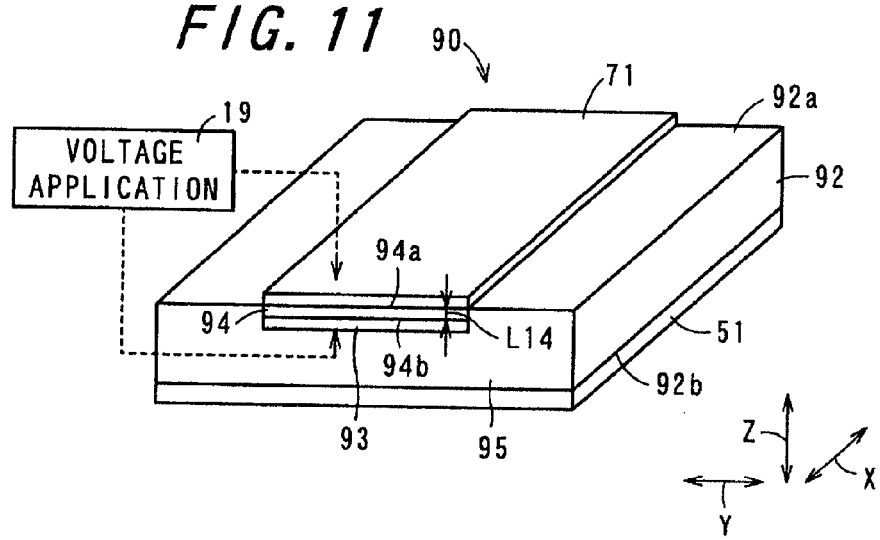
FIG. 11 is a perspective view schematically showing a phase shifter 90 according to yet another embodiment of the invention.

FIG. 11 is a perspective view schematically showing a phase shifter 90 according to yet another embodiment of the invention. In this embodiment, the same parts as those in the foregoing embodiments are represented by the same reference numerals, and descriptions thereof will be omitted. The section of the phase shifter 90 in the propagation direction X of the electromagnetic wave has the same shape as the end face of the phase shifter 90 in the propagation direction X.

The phase shifter 90 forms a microstrip guide. The phase shifter 90 includes a strip conductor part 71, a ground conductor plate 51, a dielectric part 92, and an electrode 93. The dielectric part 92 has a rectangular parallelepiped shape.

The strip conductor part 71 is laminated on a first surface 92a of the dielectric part 92 in the thickness direction Z. The strip conductor part 71 is formed at the center of the dielectric part 92 in the width direction Y between both end portions of the dielectric part 92 in the propagation direction X so as to be spaced from the end portions of the dielectric part 92 in the width direction Y. The ground conductor plate 51 is laminated over an entire second surface 92b of the dielectric part 92 in the thickness direction Z.

The dielectric part 92 includes a first dielectric part 94 and a second dielectric part 95, and the electrode 93 is embedded in the dielectric part 92. The first dielectric part 94 is made of the same material as the first dielectric part 25 in the foregoing embodiment, and the second dielectric part 95 is made of the same material as the second dielectric parts 26 in the foregoing embodiments. The electrode 93 is made of the same material and thickness as the first and second electrodes 24a and 24b in the foregoing embodiments.

The electrode 93 is laminated on a second end face 94b of the first dielectric part 94 in the thickness direction z opposite to a first end face 94a on which the strip conductor part 71 is laminated, and is embedded between the first and second dielectric parts 94 and 95. The electrode 93 is laminated over the entire second end face 94b of the first dielectric part 94.

The voltage application unit 19 is connected to the electrode 93 and the strip conductor part 71, and thus it is possible to change the phase of the electromagnetic wave propagating along the phase shifter 90. Therefore, the same effects as the phase shifters in the foregoing embodiments can be obtained.

Figure 12:
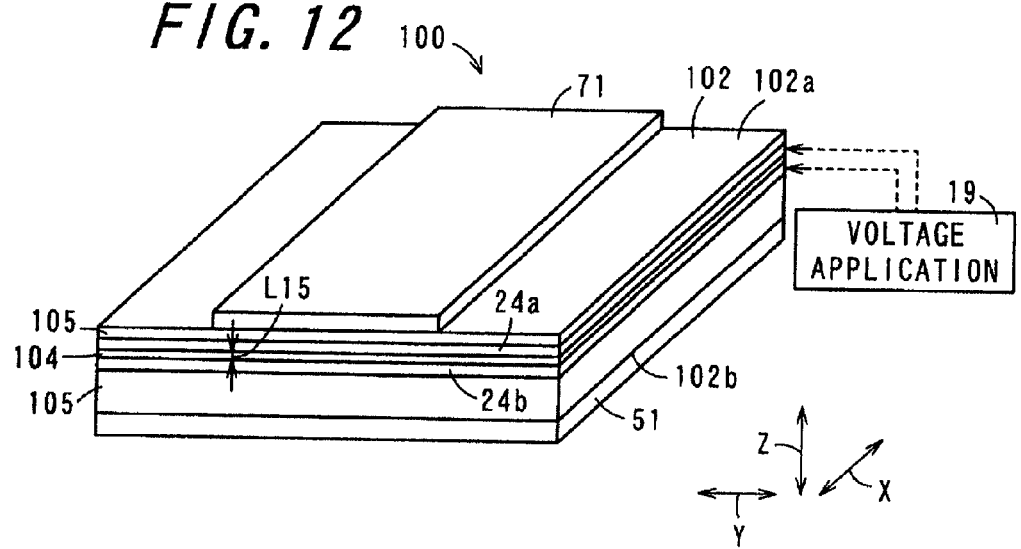
FIG. 12 is a perspective view schematically showing a phase shifter 100 according to yet another embodiment of the invention.

FIG. 12 is a perspective view schematically showing a phase shifter 100 according to yet another embodiment of the invention. In this embodiment, the same parts as those in the foregoing embodiments are represented by the same reference numerals, and descriptions thereof will be omitted. The phase shifter 100 has a rectangular parallelepiped shape. The section of the phase shifter 100 perpendicular to the propagation direction X of the electromagnetic wave has the same shape as the end face of the phase shifter 100 in the propagation direction X.

The phase shifter 100 forms a microstrip guide. The phase shifter 100 includes a strip conductor part 71, a ground conductor plate 51, a dielectric part 102, and first and second electrodes 24a and 24b.

The strip conductor part 71 is laminated on a first surface 102a of the dielectric part 102 in the thickness direction Z. The strip conductor part 71 is formed at the center of the dielectric part 102 in the width direction Y between both end portions of the dielectric part 102 in the propagation direction X so as to be spaced at a predetermined distance from the end portions of the dielectric part 102 in the width direction Y. The ground conductor plate 51 is laminated over an entire second surface 102b of the dielectric part 102 in the thickness direction Z.

The dielectric part 102 includes a first dielectric part 104 and second dielectric parts 105, and the first and second electrodes 24a and 24b are embedded in the dielectric part 102. The first dielectric part 104 is made of the same material as the first dielectric part 25 in the foregoing embodiment, and the second dielectric parts 105 are made of the same material as the second dielectric parts 26 in the foregoing embodiment.

The first dielectric part 104 is provided between the strip conductor part 71 and the ground conductor plate 51 so as to be spaced from the strip conductor part 71. The first dielectric part 104 is formed between both end portions of the dielectric part 102 in the width direction Y and the thickness direction Z. The first dielectric part 104 is provided to be sandwiched between the second dielectric parts 105.

The first and second electrodes 24a and 24b are individually provided on both sides of the first dielectric part 104 in the thickness direction Z with the first dielectric part 104 sandwiched therebetween. The first and second electrodes 24a and 24b are individually embedded between the first and second dielectric parts 104 and 105. The first and second electrodes 24a and 24b are individually formed over the entire end faces of the first dielectric part 105 in the thickness direction Z.

The first dielectric part 104 is provided at a position to lean toward the strip conductor part 71, at which electric field strength of the propagating electromagnetic wave is large, between the strip conductor part 71 and the ground conductor plate 51 in the thickness direction Z.

The voltage application unit 19 is connected to the first and second electrodes 24a and 24b, and thus it is possible to change the phase of the electromagnetic wave propagating along the phase shifter 100. Therefore, the same effects as the phase shifters in the foregoing embodiments can be obtained.

Figure 13:
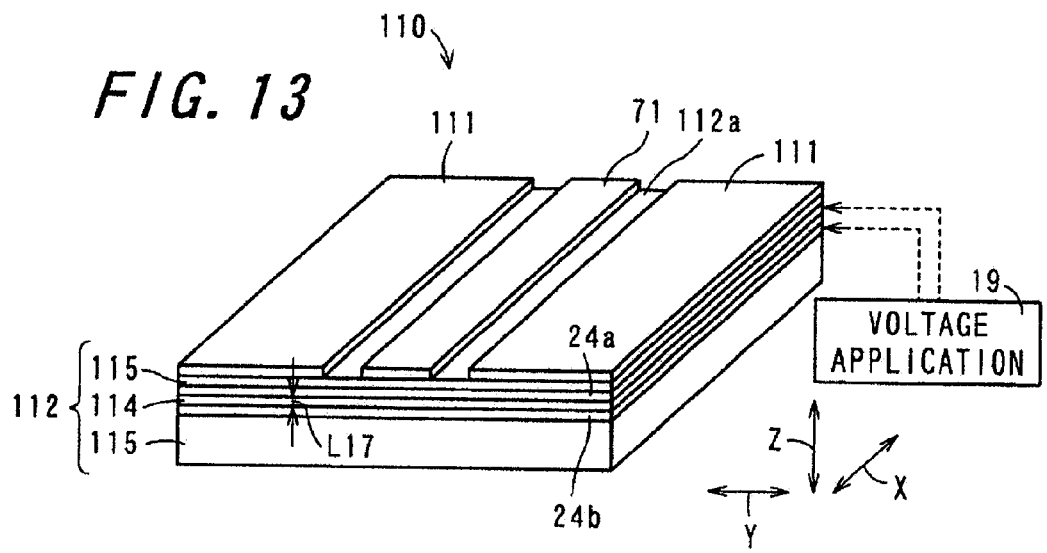
FIG. 13 is a perspective view schematically showing a phase shifter 110 according to yet another embodiment of the invention.

FIG. 13 is a perspective view schematically showing a phase shifter 110 according to yet another embodiment of the invention. In this embodiment, the same parts as those in the foregoing embodiments are represented by the same reference numerals, and descriptions thereof will be omitted. The section of the phase shifter 110 perpendicular to the propagation direction X of the electromagnetic wave has the same shape as the end face of the phase shifter 110 in the propagation direction X.

The phase shifter 110 forms a coplanar guide. The phase shifter 110 includes a strip conductor part 71, ground conductor parts 111, a dielectric part 112, and first and second electrodes 24a and 24b. The dielectric part 112 has a rectangular parallelepiped shape.

The strip conductor part 71 is laminated on a first surface 112a of the dielectric part 112 in the thickness direction Z. The strip conductor part 71 is formed at the center of the dielectric part 112 in the width direction Y between both end portions of the dielectric part 112 in the propagation direction X. The ground conductor parts 111 are individually formed on both sides of the strip conductor part 71 in the width direction Y on the first surface 112a so as to be spaced from the strip conductor part 71. The ground conductor parts 111 are formed along the strip conductor part 71. The ground conductor parts 111 has the same thickness as that of the strip conductor part 71, and are formed over the end portions of the dielectric part 112 in the width direction Y.

The dielectric part 112 includes a first dielectric part 114 and second dielectric parts 115, and the first and second electrodes 24a and 24b are embedded in the dielectric part 112. The first dielectric part 114 is made of the same material as the first dielectric part 25 in the foregoing embodiment, and the second dielectric parts 115 are made of the same material as the second dielectric parts 26 in the foregoing embodiment.

The first dielectric part 114 is provided to be spaced from the strip conductor part 71 and the ground conductor parts 111 in the thickness direction Z. The first dielectric part 114 is formed between both end portions of the dielectric part 102 in the width direction Y and the thickness direction Z. The first dielectric part 114 is provided to be sandwiched between the second dielectric parts 115.

The first and second electrodes 24a and 24b are individually provided on both sides of the first dielectric part 114 in the thickness direction Z with the first dielectric part 114 sandwiched therebetween. The first and second electrodes 24a and 24b are individually embedded between the first and second dielectric parts 114 and 115. The first and second electrodes 24a and 24b are individually formed over the entire end faces of the first dielectric part 114 in the thickness direction Z.

The first dielectric part 114 is provided at a position as close as possible to the strip conductor part 71 and the ground conductor parts 111, at which electric field strength of the propagating electromagnetic wave is large, in the thickness direction Z.

The voltage application unit 19 is connected to the first and second electrodes 24a and 24b, and thus it is possible to change the phase of the electromagnetic wave propagating along the phase shifter 110. Therefore, the same effects as the phase shifters in the foregoing embodiments can be obtained.

The dimensions L9, L10, L12, L13, L14, L15, and L17 of the first dielectric parts 45, 54, 74, 84, 94, 104, and 114 in the thickness direction Z are, for example, in a range of 0.1 μm to 50 μm. If the dimensions L9, L10, L12, L13, L14, L15, and L17 are smaller than 0.1 μm, a part which varies in dielectric constant is decreased. For this reason, a line length required for obtaining a desired phase change becomes longer, and the phase shifter is increased in size. If the dimensions L9, L10, L12, L13, L14, L15, and L17 are larger than 50 μm, the strength of an electric field to be applied becomes smaller. For this reason, a line length required for obtaining a desired phase change becomes longer, and the phase shifter is increased in size. If an electrode laminate as described above is formed with the dimensions L9, L10, L12, L13, L14, L15, L17 increased, a loss due to the electrode is increased.

Figure 14:
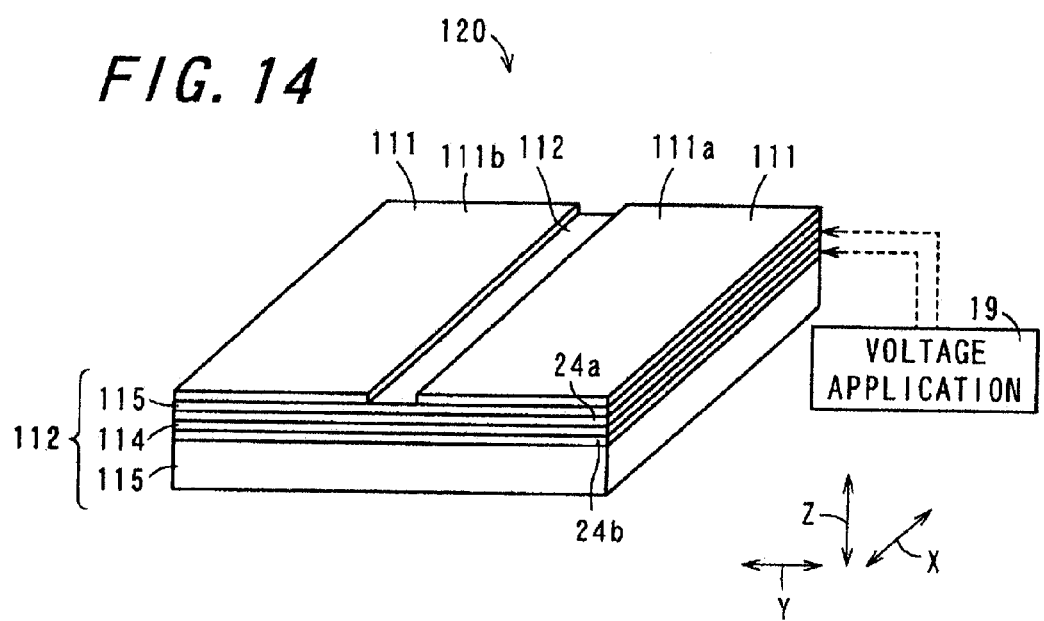
FIG. 14 is a perspective view schematically showing a phase shifter 120 according to yet another embodiment of the invention.

FIG. 14 is a perspective view schematically showing a phase shifter 120 according to yet another embodiment of the invention. In this embodiment, the same parts as those in the foregoing embodiments are represented by the same reference numerals, and descriptions thereof will be omitted. The section of the phase shifter 120 perpendicular to the propagation direction X of the electromagnetic wave has the same shape as the end face of the phase shifter 120 in the propagation direction X.

The phase shifter 120 forms a slot guide. The phase shifter 20 includes a slot conductor part 121, a dielectric part 112, and first and second electrodes 24a and 24b.

The slot conductor part 121 is laminated on a first surface 112a of the dielectric part 112 in the thickness direction Z. The slot conductor part 121 is made of the same material and thickness as the above-described strip conductor part 71. The slot conductor part 121 is laminated on the dielectric part 112, excluding the central portion of the dielectric part 112 in the width direction Y. The slot conductor part 121 has a first slot conductor part 121a and a second slot conductor part 121b. The first slot conductor part 121a and the second slot conductor part 121b are provided to be spaced from each other in the width direction Y.

The voltage application unit 19 is connected to the first and second electrodes 24a and 24b, and thus it is possible to change the phase of the electromagnetic wave propagating along the phase shifter 20. Therefore, the same effects as the phase shifters in the foregoing embodiments can be obtained.

FIG. 1 is a sectional view schematically showing a phase shifter 130 according to yet another embodiment of the invention. The phase shifter 130 includes a dielectric part 2 along which the electromagnetic wave propagates, and a conductor part 3 that surrounds the dielectric part 2 to form a waveguide tube. The phase shifter 130 according to the embodiment of the invention has a rectangular parallelepiped shape. The section of the phase shifter 130 perpendicular to the propagation direction X of the electromagnetic wave has the same shape as the end face of the phase shifter 130 in the propagation direction X.

The dielectric part 2 is made of a dielectric and includes a variable part which varies in dielectric constant depending on an applied electric field. In the embodiment of the invention, the dielectric part 2 includes the variable part and is made of the same material as the first dielectric part 25.

The dielectric part 2 has first and second input/output ends 2a and 2b through which the electromagnetic wave is inputted and outputted. The first and second input/output ends 2a and 2b are individually formed at the end portions in the propagation direction X along the propagation direction X in which the electromagnetic wave propagates. In the embodiment of the invention, the dielectric part 2 has a rectangular parallelepiped shape, and the first and second input/output ends 2a and 2b are formed by planes perpendicular to the propagation direction X, and are opposed to each other. The sections of the dielectric part 2 perpendicular to the propagation direction X have a rectangular shape. The directions which are perpendicular to the propagation direction X and are also perpendicular to each other are referred to as "width direction Y" and "thickness direction Z", respectively. In this embodiment, the width direction Y is a lateral direction on the section of the dielectric part 2 perpendicular to the propagation direction X, and the thickness direction Z is a longitudinal direction on the section of the dielectric part 2 perpendicular to the propagation direction X.

The conductor part 3 is made of a conductor, and includes a pair of first and second electrodes 4a and 4b for applying an electric field to the dielectric part 2. The first and second electrodes 4a and 4b are laminated on the outer surface of the dielectric part 2. In the embodiment of the invention, the conductor part 3 includes the first and second electrodes 4a and 4b. The first and second electrodes 4a and 4b surround the dielectric part 2 to be in close contact with the dielectric part 2 around an axial line A1 of the dielectric part 2 along the propagation direction X while being spaced from each other around the axial line A1 in a state where both end faces of the dielectric part 2 in the propagation direction X are exposed, thereby forming a waveguide tube. The first and second electrodes 4a and 4b are provided separately, that is, in a non-contact manner.

The first and second electrodes 4a and 4b are formed between both end portions of the dielectric part 2 in the propagation direction X. The first and second electrodes 4a and 4b are formed to be rotation symmetric around the axial line A1. In the embodiment of the invention, the first and second electrodes 4a and 4b are formed such that the sections perpendicular to the propagation direction X substantially have a U shape. The first electrode 4a covers the dielectric part 2 from a first end portion 2c side of the dielectric part 2 in the thickness direction z and extends to an intermediate portion in the thickness direction Z. The second electrode 4b covers the dielectric part 2 from a second end portion 2d side of the dielectric part 2 in the thickness direction Z and extends to an intermediate portion in the thickness direction Z. The first and second electrodes 4a and 4b are formed separately so as to be not in contact with each other, and to be spaced at a prescribed distance L18 from each other around the axial line A1 along the outer surface of the dielectric part 2. The prescribed distance L1B is set such that the electromagnetic wave propagating along the dielectric part 2 does not leak between the first and second electrodes 4a and 4b. For example, the distance L18 is set to be half or less of the length a of a long side (the size in the thickness direction Z) from among the inner dimensions of the waveguide tube formed by the first and second electrodes 4a and 4b.

The first and second electrodes 4a and 4b are made of a low-resistivity metal, a metal which can be fired simultaneously with the dielectric part 2 at high temperature, a solder, or a conductive paste. The low-resistively metal is selected from a group consisting of gold (Au), copper (Cu), aluminum (Al), platinum (Pt), titanium (Ti), silver (Ag), palladium (Pd), zinc (Zn), and chromium (Cr). The first and second electrodes 4a and 4b may be made of one selected from a group consisting of gold (Au), copper (Cu), aluminum (Al), platinum (Pt), titanium (Ti), silver (Ag), palladium (Pd), zinc (Zn), and chromium (Cr), an alloy of at least two metal, or a laminate of them. Examples of the metal which can be fired simultaneously with the dielectric part 2 at high temperature include tungsten (W). Examples of the conductive paste include a material containing a metal filler and binder resin binding the metal filler. The first and second electrodes 4a and 4b may be made of a transparent electrode material, such as ITO (Indium Tin Oxide). The first and second electrodes 4a and 4b are preferably made of a low-resistivity metal.

The thickness of each of the first and second electrodes 4a and 4b is set to be larger than a skin depth for the electromagnetic wave propagating along the dielectric part 2, for example, 1 µm.

Insulating parts 5a and 5b are provided in the dielectric part 2 as a single body with the dielectric part 2. The insulating parts 5a and 5b are made of the same material as the dielectric part 2. The insulating parts 5a and 5b are provided between the first and second electrodes 4a and 4b around the axial line A1, and prevent adjacent first and second electrodes 4a and 4b from being in contact with each other. The insulating parts 5a and 5b are provided between both end portions of the dielectric part 2 in the propagation direction X to be in contact with the first and second electrodes 4a and 4b.

The insulating parts 5a and 5b protrude by a prescribed distance L19 from the surfaces of the dielectric part 2 in the width direction Y. The prescribed distance L19 is set to be the same as the thickness of each of the first and second electrodes 4a and 4b laminated on the dielectric part 2 in the width direction Y. The prescribed distance L19 is set to be $(2n_2-1)/4$ (where $n_2$ is a natural number) times of the wavelength of plane wave propagating along the dielectric part 2. If the prescribed lengths L18 and L19 are set as described above, even though the first and second electrodes 4a and 4b are spaced from each other around the axial line A1, the electromagnetic wave propagating along the dielectric part 2 can be prevented from leaking from spaced portions of the first and second electrodes 4a and 4b, that is, the insulating parts 5a and 5b.

The phase shifter 130 also includes a voltage application unit 19. The voltage application unit 19 is implemented by an electrical circuit that applies a voltage within a prescribed range between the pair of first and second electrodes 4a and 4b. The voltage application unit 19 is connected to the first and second electrodes 4a and 4b, and sets the electrodes at predetermined potentials to apply a voltage between the first and second electrodes 4a and 4b. Accordingly, an electric field is applied to the dielectric part 2 sandwiched between the first and second electrodes 4a and 4b. The voltage application unit 19 applies an AC voltage or a DC voltage of a frequency lower than the frequency of the propagating electromagnetic wave to the first and second electrodes 4a and 4b. The voltage application unit 19 applies a voltage according to the amount of a phase to be shifted to the first and second electrodes 4a and 4b.

By causing the voltage application unit 19 to apply the voltage between the pair of electrodes 4a and 4b, and changing the magnitude of the voltage to be applied within a prescribed range, it is possible to change the phase of the electromagnetic wave to be guided along the dielectric part 2 in accordance with the magnitude of the voltage to be applied, that is, the magnitude of the applied electric field. If the applied electric field becomes larger, the dielectric forming the dielectric part 2 is decreased in dielectric constant. Thus, it is possible to change the phase of the electromagnetic wave guided along the dielectric part 2.

In the embodiment of the invention, the phase shifter 130 is formed such that the electromagnetic wave propagates along a $TE_{10}$ mode of the waveguide tube.

The phase shifter 130 can be regarded as a waveguide tube. Therefore, a description will be given for a case where the phase shifter 130 is regarded as a waveguide tube in which a dielectric is filled in a waveguide of the waveguide tube. Here, a case where the dielectric forming the dielectric part 2 is changed in relative dielectric constant $\epsilon r$ from 800 to 760 will be described. Let a dielectric loss of the dielectric forming the dielectric part 2 be tan δ, the length of the long side (the size in the thickness direction Z) from among the inner dimensions of the waveguide formed by the first and second electrodes 4a and 4b be a, and the length of a short side (the size in the width direction Y) be b=a/2, electrical conductivity of a conductor forming the waveguide be a, and the cutoff frequency of the waveguide be fc. Then, the cutoff frequency fc is expressed by Expression 2. In the invention, the cutoff frequency is a frequency at which a propagating high-frequency signal is attenuated by 3 dB.

$$fc = \frac{1}{2a\sqrt{\mu_0 \varepsilon_0 \varepsilon_r}} \quad (2)$$

In Expression 2, $\mu_0$ denotes vacuum permeability, and $\epsilon_0$ is a dielectric constant in vacuum. Therefore, the cutoff frequency is determined depending on the length a. Here, the length b of the short side is set to be b=a/2, but what is necessary is that the length b of the short side should be shorter than the length a of the long side. If the length b of the short side becomes longer than the length a of the long side, a $TE_{01}$ mode perpendicular to a desired $TE_{10}$ mode may not become a cutoff mode, and an unnecessary mode may occur. In addition, if the length b of the short side becomes excessively short, a conductor loss due the conductor is increased. Therefore, the length b of the short side is preferably about b=a/2. When an attenuation constant is α and a phase constant is β, α is expressed by Expressions 3 and 4, and β is expressed by Expression 5.

[Equation 3]

$$\alpha = \frac{4\pi^2 f^2 \mu_0 \varepsilon_0 \varepsilon_r \tan\delta}{2\beta} + \frac{R_s}{2\pi a^3 b \beta f \mu_0}(2b\pi^2 + 4a^3\pi^2 f^2 \mu_0 \varepsilon_0 \varepsilon_r) \quad (3)$$

$$R_s = \sqrt{\frac{2\pi f \mu_0}{2\sigma}} \quad (4)$$

$$\beta = \pi\sqrt{4f^2\mu_0\varepsilon_0\varepsilon_r - \frac{1}{a^2}} \quad (5)$$

The phase change per unit length is a change amount $\Delta\beta$ of the phase constant $\beta$. The larger this value is, the more a phase shifter can be reduced in size.

Figure 16:
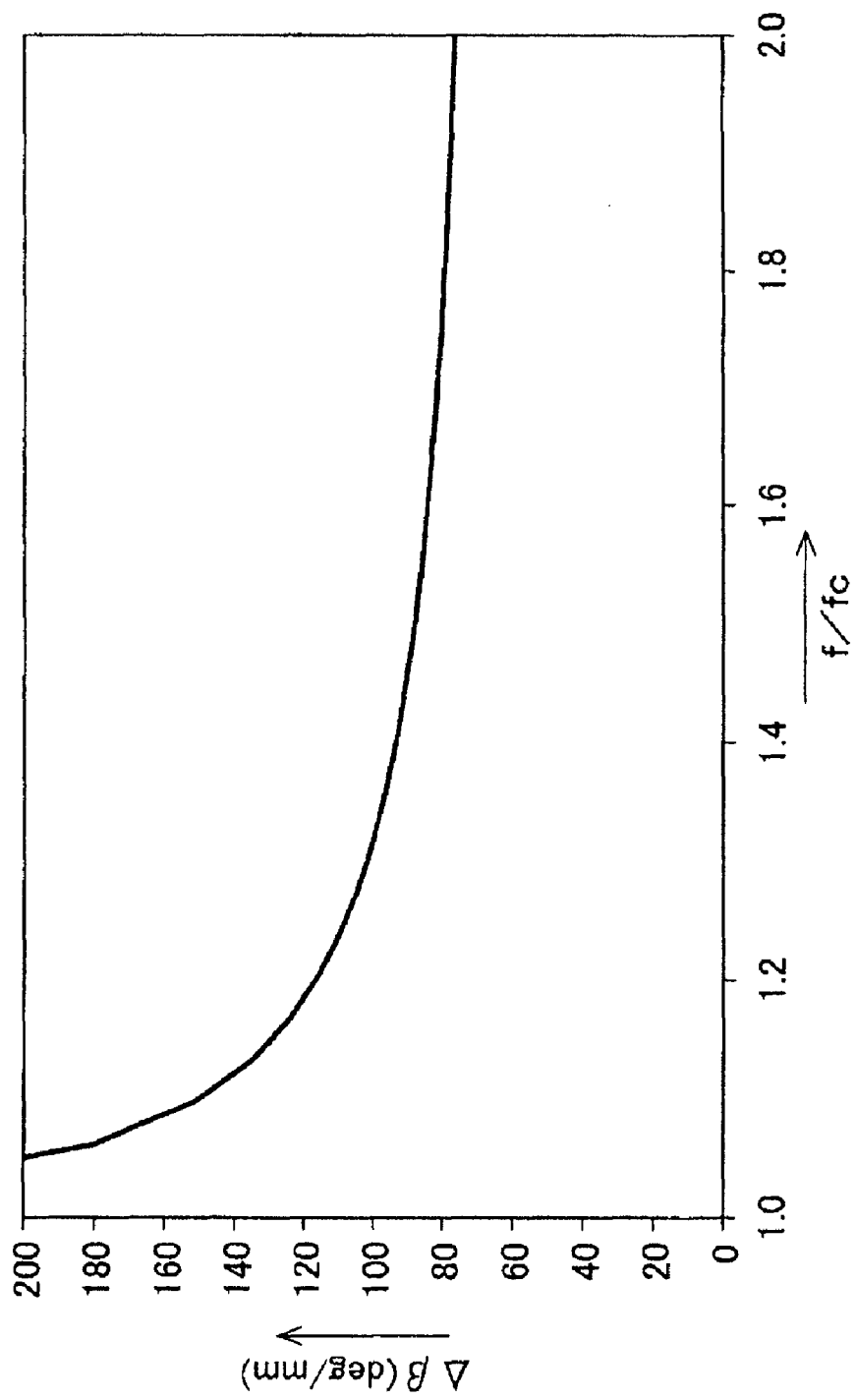
FIG. 16 is a graph showing the relationship between f/fc and Δβ.

FIG. 16 is a graph showing the relationship between f/fc and $\Delta\beta$. The horizontal axis of the graph represents a value (f/fc) that is obtained by dividing a usable frequency, that is, the frequency f of the electromagnetic wave guided along the dielectric part 2 by the cutoff frequency fc. The vertical axis of the graph represents the change amount $\Delta\beta$ of the phase constant $\beta$. Here, when the usable frequency f is at 77 GHz, the relationship between f/fc and $\Delta\beta$ is shown by calculating the cutoff frequency fc and the change amount $\Delta\beta$ of the phase constant $\beta$ while changing the long side a from among the inner dimensions of the waveguide tube.

As shown in FIG. 16, the smaller f/fc is, the more $\Delta\beta$ is increased. Accordingly, it can be seen that, as f/fc becomes smaller, reduction in size can be achieved. A length required for giving the phase change of 360° to the electromagnetic wave guided along the dielectric part 2 is 4.7 mm when f/fc=2, but it can be 3.1 mm or less when f/fc<1.2.

Figure 17:
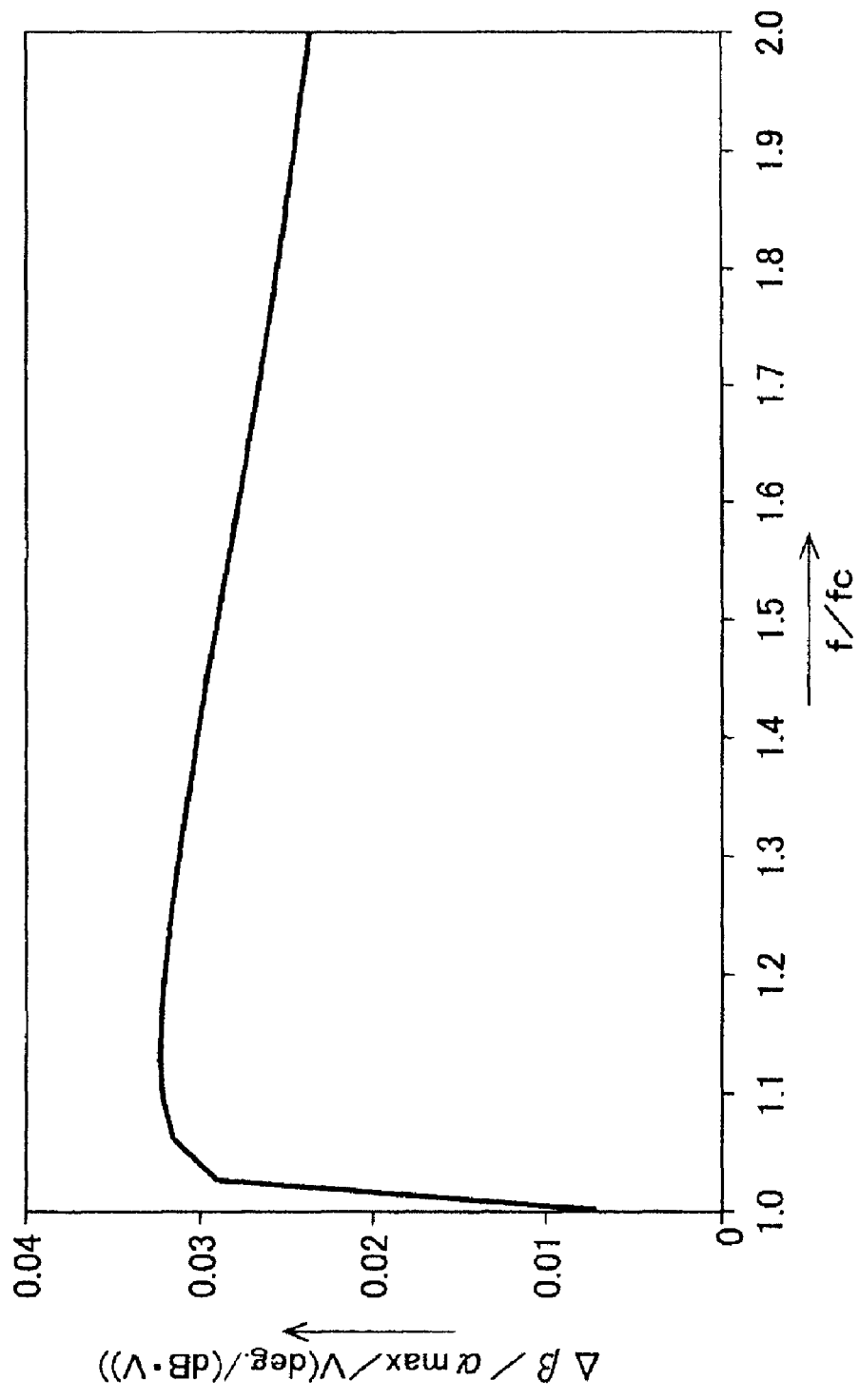
FIG. 17 is a diagram showing the relationship between f/fc and Δβ/αmax/V.

FIG. 17 is a diagram showing the relationship between f/fc and $\Delta\beta/\alpha_{max}/V$. The horizontal axis of the graph represents f/fc. The vertical axis of the graph represents a value ($\Delta\beta/\alpha_{max}/V$) that is obtained by dividing the amount ($\Delta\beta/\alpha_{max}$) of a phase change obtained with a predetermined loss, which is obtained by dividing the change amount $\Delta\beta$ of the phase constant $\beta$ by the maximum attenuation constant $\alpha$, by an operation voltage V. $\Delta\beta/\alpha_{max}/V$ is indicative of performance of the phase shifter. Here, $\Delta\beta/\alpha_{max}$ is calculated on the conditions $\tan\delta=0.05$ and $\sigma=9.52\times10^6$ S/m, and the operation voltage V is calculated on the conditions that electric field strength required for changing the relative dielectric constant $\varepsilon r$ from 800 to 760 is 17 kV/cm, and the voltage is applied a long side direction (the thickness direction Z). In this way, the relationship between f/fc and $\Delta\beta/\alpha_{max}/V$ is shown. As shown in the graph of FIG. 17, it can be seen that $\Delta\beta/\alpha_{max}/V$ has the maximum value at a predetermined value of f/fc.

When f/fc is 1.03 or less, a large phase change can be given to the electromagnetic wave at a short line length, but a loss is increased since the electromagnetic wave approaches a cutoff state. When f/fc is 1.5 or more, the line length needs to be longer, and a high voltage needs to be applied to the first and second electrodes 4a and 4b. If f/fc is in a range of 1.03<f/fc<1.5, a large phase change can be given to the electromagnetic wave at a short line length, and a voltage to be applied to the first and second electrodes 4a and 4b can be suppressed to be low. Therefore, a small and low-voltage operable phase shifter can be achieved. Preferably, f/fc is in a range of 1.03<f/fc<1.2. With this range, the condition $\Delta\beta/\alpha_{max}/V>0.03$ can be satisfied. As a result, a lower-voltage operable phase shifter can be achieved.

In the phase shifter 130, the first and second electrodes 4a and 4b form a rectangular waveguide tube. The cutoff frequency fc is determined in accordance with the dielectric constant of the dielectric forming the dielectric part 2 and the length a of the long side from among the inner dimensions of the waveguide tube. In this embodiment, the lengths a and b are set to be a=0.08 mm and b=0.04 mm, and thus the cutoff frequency fc when the relative dielectric constant is 760 is set to 68 GHz. That is, when the usable frequency f is 77 GHz, f/fc is 1.13. The electric field strength required for changing the relative dielectric constant $\varepsilon r$ of the dielectric forming the dielectric part 2 from 800 to 760 is 17 kV/cm. In order to obtain this electric field strength of 17 kV/cm, what is necessary is that a voltage of 136 V is applied between the first and second electrodes 4a and 4b. The amount of the phase change when the voltage is applied between the first and second electrodes 4a and 4b, and the dielectric constant of the dielectric part 2 is changed from 800 to 760 becomes 154°/mm. Therefore, a length required for obtaining the amount of the phase change of 360°, that is, a length c of the dielectric part 2 in the propagation direction X, to which an electric field is applied by the first and second electrodes 4a and 4b, is 2.3 mm.

As a comparative example, a coplanar waveguide type phase shifter is exemplified. BST was formed to have a thickness of 0.5 μm on an MgO single crystal substrate having a relative dielectric constant of 9.5, and an electrode was formed to have a center conductor width of 50 μm and a gap of 25 μm on the BST. In this case, if a voltage of 136 V is applied, the relative dielectric constant of the BST is changed from 800 to 680, and the amount of the phase change with 77 GHz becomes 18°/mm. Therefore, the length required for obtaining the phase change of 360° is 20 mm.

The length c of the dielectric part 2 in the propagation direction X, to which an electric field is applied by the first and second electrodes 4a and 4b, is set to a length by which a required phase change is obtained.

As described above, according to the phase shifter 130, the conductor part 3 forming the waveguide tube is formed by the first and second electrodes 4a and 4b. Accordingly, it is not necessary to form an electrode separately from the waveguide tube, and thus ease of manufacturing is achieved. If the waveguide tube includes the first and second electrodes 4a and 4b, even though the frequency of the electromagnetic wave propagating along the dielectric part 2 is set to be near the cutoff frequency, the electric field to be applied to the dielectric part 2 can be stably controlled, and thus the phase shifter 130 can be stably operated near the cutoff frequency. Accordingly, the frequency of the electromagnetic wave propagating along the dielectric part 2 can be set to be near the cutoff frequency, and a large phase change can be obtained at a short line length near the cutoff frequency. Therefore, the phase shifter 130 can be small in size. In addition, if the frequency of the electromagnetic wave propagating along the dielectric part 2 is set to be near the cutoff frequency, the sections of the dielectric part 2 perpendicular to the propagation direction of the electromagnetic wave are reduced in dimension. Therefore, the interval between the first and second electrodes 4a and 4b becomes small, and thus a large electric field can be applied to the dielectric part 2 at a low voltage. As a result, the phase shifter 130 that is small in size and can stably obtain a large phase change at a low voltage can be achieved.

When the cutoff frequency when a voltage is applied to the first and second electrodes 4a and 4b is fc, and the frequency of the electromagnetic wave propagating along the dielectric part is f, fc and f are set to satisfy the condition 1.03<f/fc<1.5. That is, since the phase shifter is used near the cutoff frequency at which the phase change is large, a large phase change is obtained at a short line length, and thus the phase shifter 130 can be small in size. In addition, the section of the dielectric part 2 in a direction perpendicular to the propagation direction of the electromagnetic wave is reduced in dimension. For this reason, the first and second electrodes 4a and 4b can be disposed to be close to each other. Therefore, large electric field strength can be obtained at a low voltage, and thus the phase shifter 130 can be operated at a low voltage. If electromagnetic wave near the cutoff frequency, that is, electromagnetic wave of a frequency satisfying the condition $1.03<f/fc<1.5$ is guided along the dielectric part 2, a transmission loss per unit length is increased, but a phase change per unit length is large, as compared with a case where electromagnetic wave of a frequency distant from the cutoff frequency, that is, electromagnetic wave satisfying the condition $f/fc?1.5$ is guided along the dielectric part 2. Therefore, a line length required for obtaining a predetermined phase change can be made short, and thus a transmission loss by the phase shifter 130 can be reduced.

In the phase shifter 130 according to the embodiment of the invention, the dielectric part 2 has a rectangular parallelepiped shape, but it is not limited to the rectangular parallelepiped shape. For example, the sections of the dielectric part 2 perpendicular to the propagation direction X may have a circular shape, an elliptical shape, a polygonal shape, or a different shape. With this shape, the same effects can be obtained.

Figure 15:
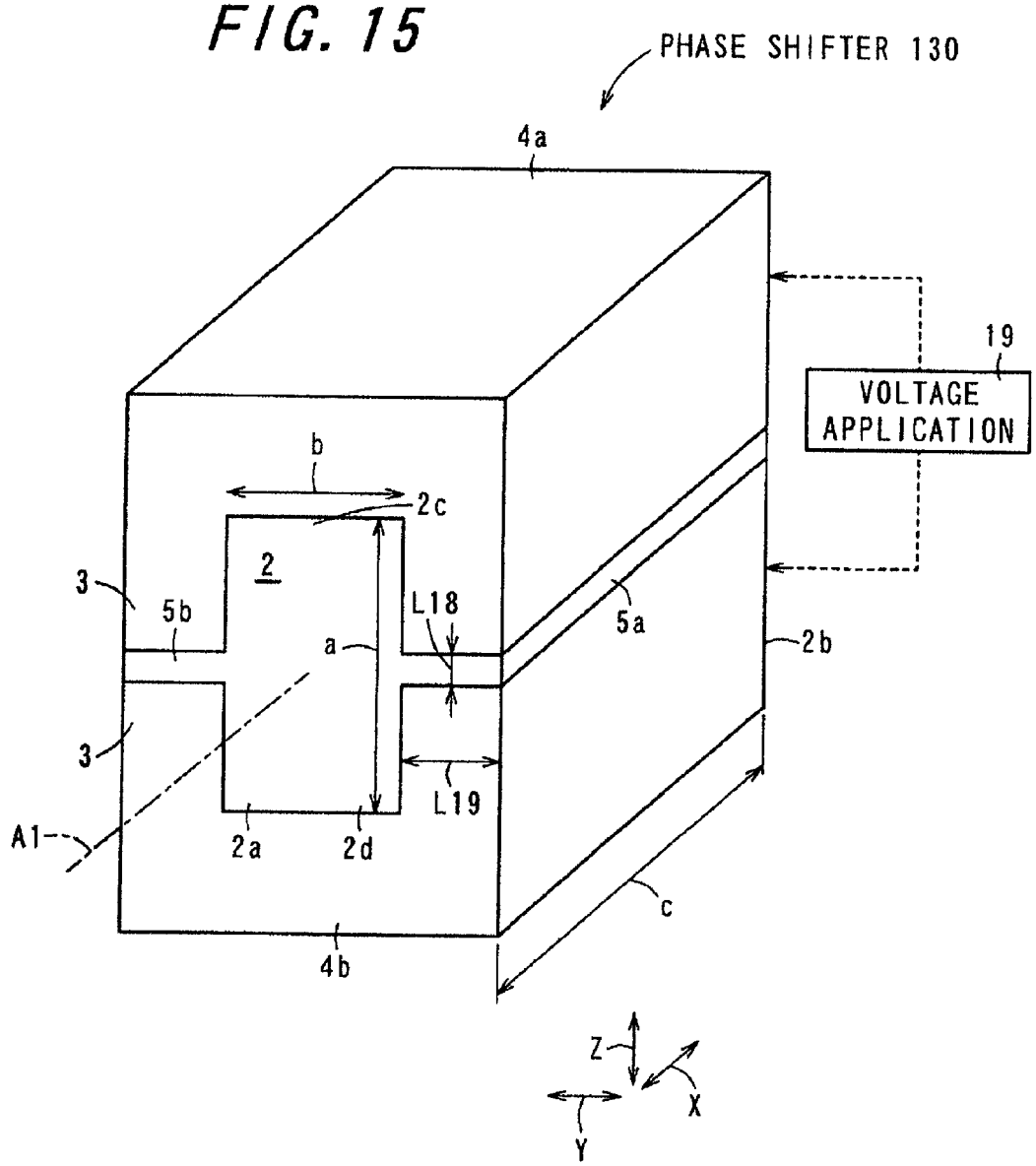
FIG. 15 is a sectional view schematically showing a phase shifter 130 according to yet another embodiment of the invention.

In the phase shifter 130 of the embodiment shown in FIG. 15, the dielectric part 2 is made of a material having a variable dielectric constant varies, but in yet another embodiment of the invention, the dielectric part 2 may include a variable part made of a material having a variable dielectric constant. The variable part is preferably formed in a portion where electric field strength of the propagating electromagnetic wave becomes large. For example, the variable part is formed in the central portion along the thickness direction Z. With this configuration, the amount of a phase change obtained when a phase shifter of the same size is manufactured is determined in accordance with an occupation ratio of the variable part in the dielectric part 2 and a region of the dielectric part 2 where the variable part is to be formed. Therefore, the amount of a phase change is small, as compared with the entire dielectric part 2 is made of a material having a variable dielectric constant, but similarly to the foregoing embodiments, a small phase shifter can be provided.

In the phase shifter 130 of the embodiment shown in FIG. 15, the first and second electrodes 4a and 4b are formed to be rotation symmetric around the axial line A1, any electrodes may be used insofar as they can apply an electric field to the dielectric part 2. For example, the number of electrodes is not limited to a pair, but it may be a plurality of pairs. If the electrodes are disposed so as to apply an electric field to the dielectric part 2, the same effects can be obtained.

In the phase shifter 130 of the embodiment shown in FIG. 15, the waveguide tube is formed only by the first and second electrodes 4a and 4b, but a waveguide tube may be formed by the first and second electrodes 4a and 4b and a waveguide tube forming part made of a conductor. In this case, the first and second electrodes 4a and 4b and the waveguide tube forming part are formed at a prescribed distance L1 around the axial line A1. With this configuration, the same effects can also be obtained.

In the phase shifter 130 of the embodiment shown in FIG. 15, when electromagnetic wave propagates the $TE_{10}$ mode, the maximum transmission efficiency is obtained, but electromagnetic wave may propagate other modes than the $TE_{10}$ mode. When electromagnetic wave propagates other modes than the $TE_{10}$ mode, mode conversion to a mode, such as a high-order mode or a low-order mode, is made. Therefore, transmission efficiency is lowered, as compared with a case where electromagnetic wave propagates the $TE_{10}$ mode, but the same effects as a case where electromagnetic wave propagates the $TE_{10}$ mode can be obtained.

Figure 18:
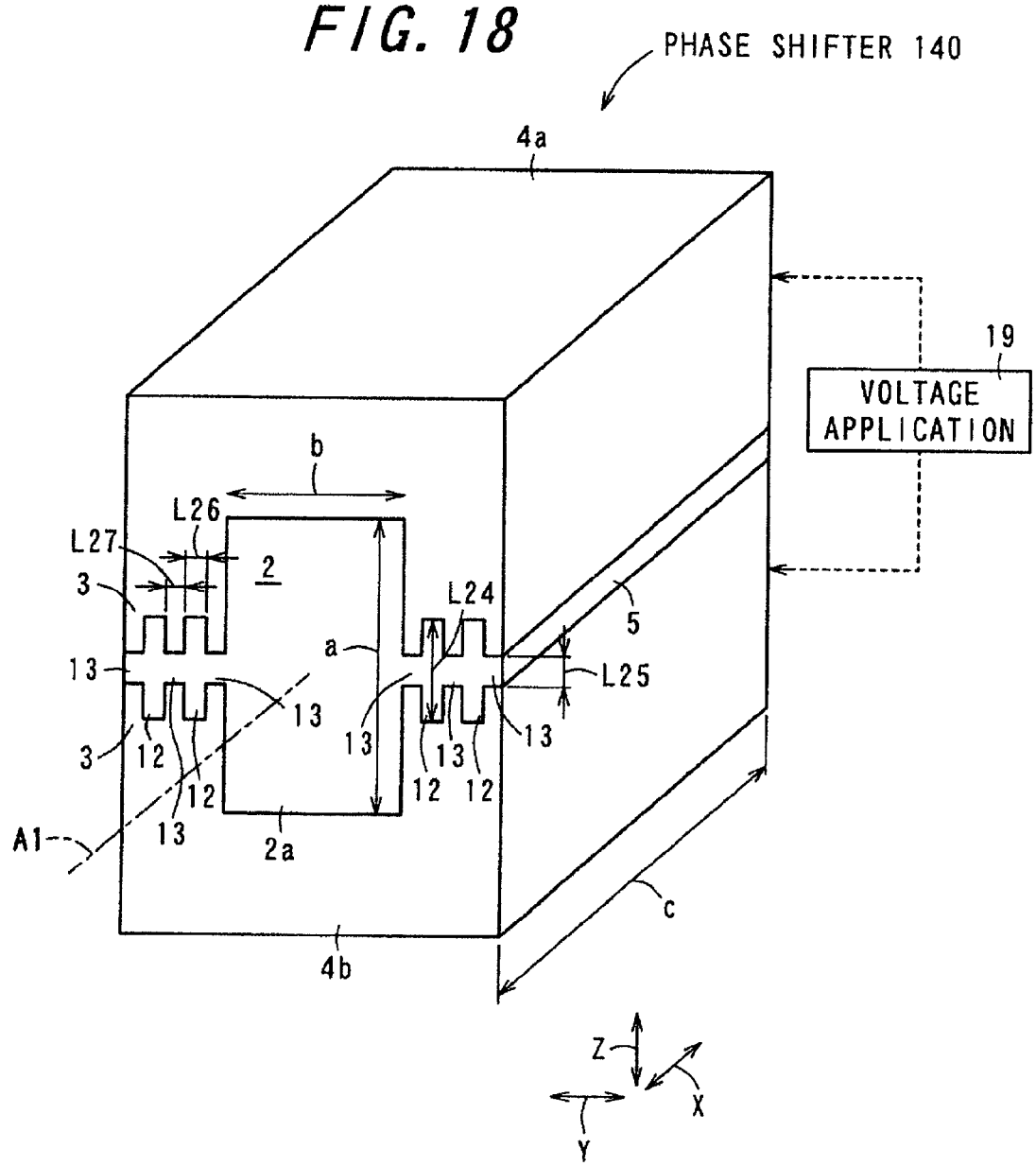
FIG. 18 is a sectional view schematically showing a phase shifter 140 according to yet another embodiment of the invention.

FIG. 18 is a sectional view schematically showing a phase shifter 140 according to another embodiment of the invention. The phase shifter 140 of this embodiment is similar to the phase shifter 130 shown in FIG. 15. The same parts as those of the phase shifter 130 are represented by the same reference numerals, and descriptions of the same parts will be omitted. Hereinafter, only different parts will be described. The section of the phase shifter 140 perpendicular to the propagation direction X of the electromagnetic wave has the same shape as the end face of the phase shifter 130 in the propagation direction X.

The phase shifter 140 includes a dielectric part 2 and first and second electrodes 4a and 4b. Each of insulating parts 5a and 5b is formed by repeatedly connecting a first portion 12 and a second portion 13, which has a dimension in the thickness direction Z smaller than that of the first portion 12, in the width direction Y. The first and second electrodes 4a and 4b are provided to be in contact with the first and second portions 12 and 13, and form a choke structure. The second portions 13 are provided at both end portions of the individual insulating parts 5a and 5b in the width direction Y.

The dimension L24 of the first portion 12 in the thickness direction Z and the dimension L25 of the second portion 13 in the thickness direction Z are preferably set such that the absolute value of a difference therebetween becomes as large as possible. The dimension L24 is set, for example, to be the same as the length a. The dimension L25 is set to the prescribed length L8.

The dimensions of the first and second portions 12 and 13 in the width direction Y are set to be $(2n_3-1)/4$ (where $n_3$ is a natural number) times of the wavelength of a plane wave propagating along the dielectric part 2. In this way, by forming the insulating parts 5a and 5b and the first and second electrodes 4a and 4b, in addition to the same effects as the phase shifter 1, leakage of high frequency wave propagating along the dielectric part 2 can be further suppressed.

FIG. 19 is a perspective view schematically showing a phase shifter 150 according to yet another embodiment of the invention. In this embodiment, the same parts as those in the foregoing embodiments are represented by the same reference numerals, and descriptions thereof will be omitted. The section of the phase shifter 150 the perpendicular to the propagation direction X of the electromagnetic wave has the same shape as the end face of the phase shifter 150 in the propagation direction X.

The phase shifter 150 is similar to the phase shifter 130 of the foregoing embodiment, and basically includes electrodes T in addition to the configuration of the phase shifter 130.

The electrodes T are embedded in the dielectric part 2 at intervals in the width direction Y. The electrodes T are formed between both end portions of the dielectric part 2 in the propagation direction X of the electromagnetic wave. The electrodes T are formed in parallel with each other along the propagation direction X. Adjacent electrodes T in the width direction Y are connected to different electrodes from among the electrodes 4a and 4b serving as first and second waveguide forming parts.

The voltage application unit 19 is connected to the first and second electrodes 4a and 4b, and thus it is possible to change the phase of the electromagnetic wave propagating along the phase shifter 130. Therefore, the same effects as the phase shifters in the foregoing embodiments can be obtained.

FIG. 20 is a perspective view schematically showing a phase shifter 160 according to yet another embodiment of the invention. In this embodiment, the same parts as those in the foregoing embodiments are represented by the same reference numerals, and descriptions thereof will be omitted. The section of the phase shifter 160 perpendicular to the propagation direction X of the electromagnetic wave has the same shape as the end face of the phase shifter 160 in the propagation direction X.

The phase shifter 160 forms a dielectric waveguide tube. The phase shifter 160 includes a waveguide tube 141, a dielectric part 142, and first and second electrodes 24a and 24b.

The waveguide tube 141 is made of the same material as the first and second plate conductor parts 23a and 23b, and has a cylindrical shape. The dielectric part 142 is surrounded by the waveguide tube 141 in a state where both end faces in the propagation direction X are exposed. The dielectric part 142 is in close contact with the inner peripheral surface of the waveguide tube 141.

The dielectric part 142 includes a first dielectric part 145 and second dielectric parts 146, and the first and second electrodes 24a and 24b are embedded in the dielectric part 142. The first dielectric part 145 is made of the same material as the first dielectric part 25 in the foregoing embodiment, and the second dielectric parts 146 are made of the same material as the second dielectric parts 26 in the foregoing embodiment.

The first dielectric part 145 is formed in the central portion of the dielectric part 142 in the thickness direction Z, and is provided to be sandwiched between the second dielectric parts 146 in the thickness direction Z. The first dielectric part 145 is formed between both end portions of the dielectric part 22 in the lateral direction Y along the lateral direction Y on the section perpendicular to the propagation direction X of the waveguide tube 141. The first and second electrodes 24a and 24b are individually laminated on both end faces of the first dielectric part 145 in the thickness direction Z, and are individually provided between the first dielectric part 145 and the second dielectric parts 146 with the first dielectric part 145 sandwiched therebetween. The first and second electrodes 24a and 24b are formed between both end portions of the dielectric part 142 along the propagation direction X of the electromagnetic wave. The first and second electrodes 24a and 24b are provided to be spaced from the waveguide tube 141 in the width direction Y. The dimension L20 of the first dielectric part 94 in the thickness direction Z is set to be in a range of 0.1 μm to 50 μm, similarly to the first dielectric parts 45, 54, 74, 84, 94, 104, and 114 in the foregoing embodiments.

The voltage application unit 19 is connected to the first and second electrodes 24a and 24b, and thus it is possible to change the phase of the electromagnetic wave propagating along the phase shifter 160. Therefore, the same effects as the phase shifters in the foregoing embodiments can be obtained.

Among the phase shifters in the foregoing embodiments, in the phase shifters 30, 40, 50, 60, 130, 150, and 160 having a cutoff frequency, when the cutoff frequency when a voltage is applied to the first and second electrodes 24a and 24b or the electrodes T is fc, and the frequency of the propagating electromagnetic wave propagating along each of the phase shifters 30, 40, 50, 60, 130, and 140 is f, fc and f are set to satisfy the condition $1.03<f/fc<1.5$, and preferably the condition $1.03<f/fc<1.2$.

FIG. 21 is a sectional view schematically showing a phase shifter 170 according to yet another embodiment of the invention. The phase shifter 170 includes a dielectric part 22, a pair of first and second plate conductor parts 23a and 23b, a pair of first and second electrodes 24a and 24b, and a voltage application unit 19. The phase shifter 170 according to the embodiment of the invention substantially has a rectangular parallelepiped shape. The section of the phase shifter 170 perpendicular to the propagation direction X of the electromagnetic wave has the same shape as the end face of the phase shifter 21 in the propagation direction X. In the embodiment of the invention, the same parts as those of the phase shifter 20 shown in FIG. 1 are represented by the same reference numerals, and descriptions thereof may be omitted. Hereinafter, only different parts will be described.

The dielectric part 22 is made of a dielectric, and includes a first dielectric part 25 including a variable part which varies in dielectric constant depending on an applied electric field, and second dielectric parts 26. The dielectric part 22 has a first input/output end 22a to which electromagnetic wave is inputted and a second input/output end 22b from which electromagnetic wave is outputted. The first input/output end 22a and the second input/output end 22b are individually formed on the upstream and downstream sides of the propagation direction X along the propagation direction X in which electromagnetic wave propagates. In the embodiment of the invention, the dielectric part 22 has a rectangular parallelepiped shape. The first input/output end 22a and the second input/output end 22b are formed by planes perpendicular to the propagation direction X, and are opposed to each other. The sections of the dielectric part 22 perpendicular to the propagation direction X have a rectangular shape. The directions which are perpendicular to the propagation direction X and are also perpendicular to each other are referred to as "width direction Y" and "thickness direction Z", respectively. In the embodiment of the invention, the width direction Y is a longitudinal direction on the section of the dielectric part 22 perpendicular to the propagation direction X, and the thickness direction Z is a lateral direction on the section of the dielectric part 22 perpendicular to the propagation direction X.

In the embodiment of the invention, the first dielectric part 25 has a rectangular parallelepiped shape, and is formed between both end portions of the dielectric part 22 in the propagation direction X and the width direction Y.

The second dielectric parts 26 are individually laminated on both sides of the first dielectric part 25 with the first dielectric part 25 sandwiched therebetween. The second dielectric parts 26 are individually provided on both sides of the first dielectric part 25 in the thickness direction Z with the first dielectric part 25 sandwiched therebetween. The second dielectric parts 26 have a rectangular parallelepiped shape.

The first and second plate conductor parts 23a and 23b are provided to sandwich the dielectric part 22 therebetween in the width direction Y perpendicular to the propagation direction X of the electromagnetic wave along the dielectric part 22 and the thickness direction Z, which is a lamination direction of the first and second dielectric parts 25 and 26. That is, the first and second plate conductor parts 23a and 23b are provided on both sides of the first and second dielectric parts 25 and 26. The first and second plate conductor parts 23a and 23b are conductive, have a plate shape, and are provided such that the surfaces facing the dielectric part 22 are in parallel with each other. The first and second plate conductor parts 23a and 23b are individually laminated on the end faces of the dielectric part 22 in the width direction Y over the entire end faces in the width direction Y.

The thickness of each of the first and second plate conductor parts 23a and 23b, that is, the thickness in the width direction Y, is set to be larger than a skin depth for electromagnetic wave propagating along the dielectric part 22.

An interval L1 between the first and second plate conductor parts 23a and 23b is set to be half or less of the wavelength of electromagnetic wave propagating along the second dielectric parts 26.

The first and second electrodes 24a and 24b are provided to sandwich the dielectric part 22 therebetween in the thickness direction Z, that is, are individually provided on both sides of the dielectric part 22. The first and second electrodes 24a and 24b are provided to be surface symmetric with respect to a virtual plane perpendicular to the thickness direction Z. The first and second electrodes 24a and 24b are individually provided on both end faces of the dielectric part 22 in the thickness direction Z. The first and second electrodes 24a and 24b are provided between both end portions of the dielectric part 22 in the propagation direction X to be spaced from the first and second plate conductor parts 23a and 23b, respectively. The first and second electrodes 24a and 24b have a rectangular parallelepiped shape, and are individually laminated on the second dielectric parts 26 within a range of, for example, 1 μm to 50 μm from both end faces of the second dielectric parts 26 in the width direction Y, excluding both end portions of the dielectric part 22 in the width direction Y.

The first and second electrodes 24a and 24b are formed such that the surfaces facing the dielectric part 22 are in parallel with each other, and an interval L4 is less than the interval L1. The first and second electrodes 24a and 24b are closer to each other than the interval L1, and accordingly the first dielectric part 25 can vary in dielectric constant at a low voltage, as compared with a case where the first dielectric part 25 varies in dielectric constant by applying a voltage to the first and second plate conductor parts 23a and 23b. The interval L4 is preferably set to a value equal to one-tenth of the interval L1 and smaller than the interval L1. As electric field strength is larger, the change amount is increased. For this reason, the interval L4 is preferably small since a voltage to be applied between the first and second electrodes 24a and 24b by the voltage application unit 19 can be reduced. However, if the interval L4 is excessively small, electromagnetic wave may be cut off and not propagate. Therefore, the interval L4 is preferably set to be one-tenth or more of the interval L1. In addition, by setting the interval L4 to a value smaller than the interval L1, an electric filed can be effectively applied to the variable part, as compared with a case where an electric field is applied between the first and second plate conductor parts 23a and 23b.

The voltage application unit 19 is connected to the first and second electrodes 24a and 24b.

In the phase shifter 170, the cutoff frequency fc of a transmission line formed by the dielectric part 22 and the first and second plate conductor parts 23a and 23b is determined in accordance with the dielectric constant of a dielectric forming the first dielectric part 25 and the size of the first dielectric part 25, the interval L4, the interval L1, and the dielectric constant of a dielectric forming the second dielectric parts 26. Let a cutoff frequency when a voltage is applied to the first and second electrodes 24a and 24b and the first dielectric part 25 varies in dielectric constant be fc, and a usable frequency, that is, the frequency of electromagnetic wave propagating along the dielectric part 22 be f. Then, the size of the first dielectric part 25, the interval L4, the interval L1, and the dielectric forming the second dielectric part 26 are set such that the condition 1.03<f/fc<1.5, and preferably the condition 1.03<f/fc<1.2 is satisfied. In manufacturing the phase shifter 170, first, the dielectrics forming the first dielectric parts 25 and 26 are determined, and subsequently the interval L1 is determined. Thereafter, the size of the first dielectric part 25 is determined, and subsequently the interval L4 is determined.

A length L5 of the first dielectric part 25 in the propagation direction X, to which an electric field is applied by the first and second electrodes 24a and 24b is set to a length by which a required phase change is obtained.

As described above, according to the phase shifter 170, the electromagnetic wave primarily propagates along the first dielectric part 25 sandwiched between the first and second plate conductor parts 24a and 24b and between the second dielectric parts 26. The change in dielectric constant of the first dielectric part 25 significantly affects the change in phase of the electromagnetic wave, and thus the line length for obtaining a required phase change can be reduced. Therefore, the phase shifter 170 can be small in size. In addition, the interval L4 is smaller than the interval L1, and thus a large electric field can be applied to the first dielectric part 25 at a low voltage.

If the first dielectric part 25 is sandwiched between the first and second electrodes 24a and 24b, that is, the first and second electrodes 24a and 24b are provided on both sides of the first dielectric part 25 to be in contact with the first dielectric part 25, the electromagnetic wave may be set in a cutoff state and may not propagate. In this case, however, the second dielectric parts 26 having a smaller dielectric constant than the dielectric constant of the first dielectric part 25 are individually interposed between the first dielectric part 25 and the electrodes, and thus the electromagnetic wave is attenuated, and it is possible to enable the electromagnetic wave to be set in the cutoff state.

In the phase shifter 170, as described above, the first and second electrodes 24a and 24b are provided to apply an electric field to the first dielectric part 25. Therefore, the phase shifter 170 can be operated near the cutoff frequency, and thus the frequency of the electromagnetic wave propagating along the dielectric part 22 can be set to be near the cutoff frequency. A large phase change is obtained at a short line length near the cutoff frequency, and thus the phase shifter 170 can be small in size. In addition, if the frequency of the electromagnetic wave propagating along the dielectric part 22 is set to be near the cutoff frequency, the sections of the dielectric part 2 perpendicular to the propagation direction of the electromagnetic wave are reduced in dimension. Therefore, the interval between the first and second electrodes 24a and 24b becomes small, and thus a large electric field can be applied to the dielectric part 2 at a low voltage. As a result, the phase shifter 170 that is small in size and can stably obtain a large phase change at a low voltage can be achieved.

In this embodiment, the interval between the first and second plate conductor parts 23a and 23b is set to be half or less of the wavelength of the electromagnetic wave propagating along the second dielectric parts 26, but in yet another embodiment of the invention, the interval between the first and second plate conductor parts 23a and 23b may be set to be larger than half of the wavelength in the second dielectric part 26. In this case, an H guide is formed by the first and second plate conductor parts 23a and 23b and the dielectric part 22. Although a transmission loss is increased, as compared with the phase shifter 170 of the embodiment shown in FIG. 21, the same effects can be obtained.

In this embodiment, the first and second electrodes 24a and 24b are formed to extend from the first input/output end 22a to the second input/output end 22b in the propagation direction X, but the first and second electrodes 24a and 24b may be continuously formed in the propagation direction X.

In the phase shifter 170 of the embodiment shown in FIG. 21, the first dielectric part 25 is made of a material having a variable dielectric constant, but in yet another embodiment of the invention, the first dielectric part 25 may include a variable part made of a material having a variable dielectric constant. The variable part is preferably formed in a portion where electric field strength of the propagating electromagnetic wave becomes large. For example, the variable part is formed in the central portion along the width direction Y and the thickness direction Z. With this configuration, the amount of a phase change obtained when a phase shifter of the same size is manufactured is determined in accordance with an occupation ratio of the variable part in the dielectric part 2 and a region of the dielectric part 2 where the variable part is to be formed. Therefore, the amount of the phase change is small, as compared with a case where the entire first dielectric part 25 is made of a material having a variable dielectric constant, but a small phase shifter can be provided, similarly to the foregoing embodiments. However, the variable part forming region in the first dielectric part 25 is preferably formed symmetrically in the width direction Y and the thickness direction Z.

Figure 22:
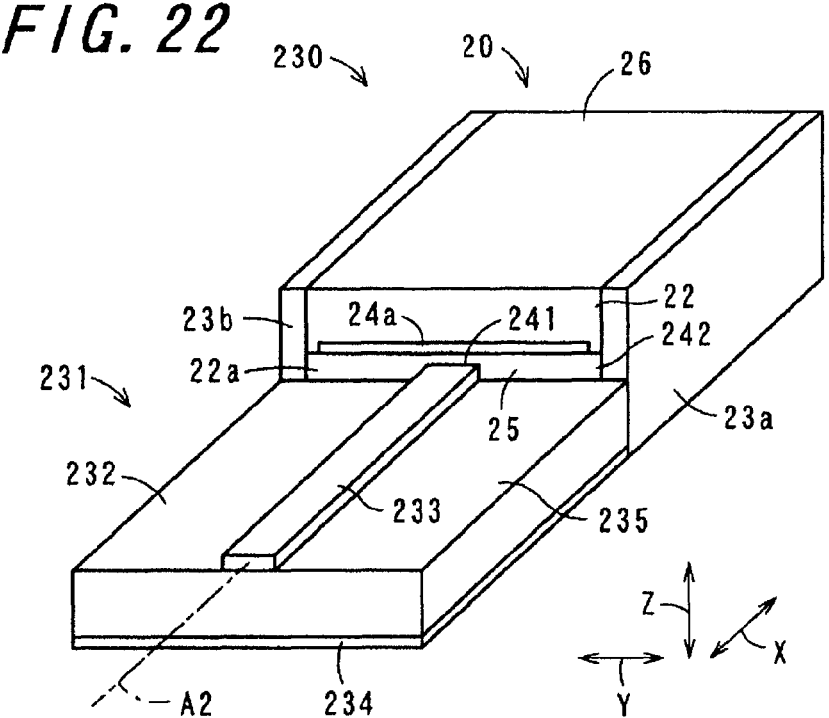
FIG. 22 is a perspective view schematically showing a connection structure 230 of the phase shifter 20 and a microstrip guide 231.
Figure 23:
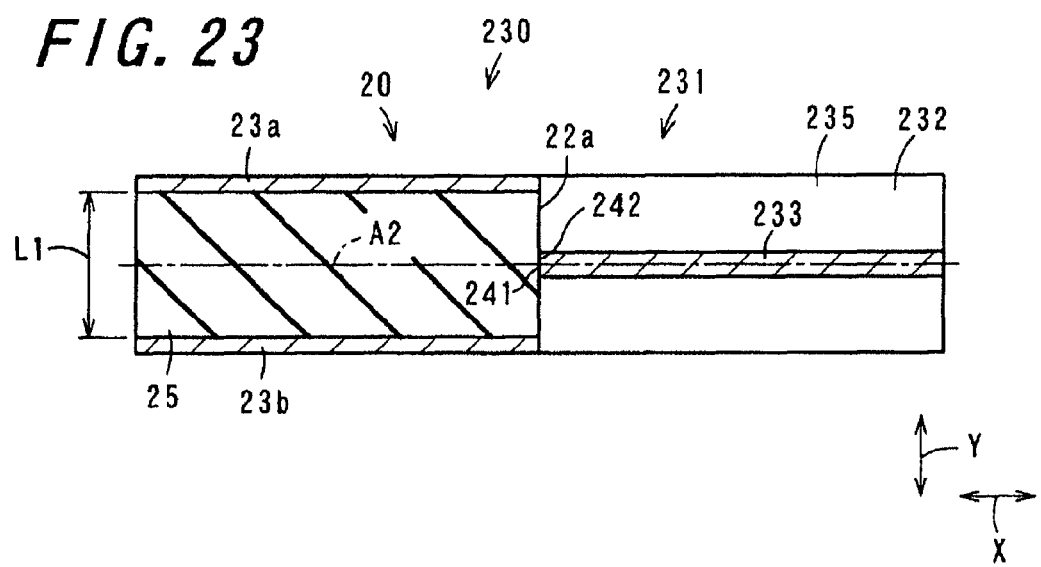
FIG. 23 is a sectional view of the connection structure 230 in a virtual plane which includes an axial line A2 along the propagation direction X of the phase shifter 20 and is perpendicular to the thickness direction Z.
Figure 24:
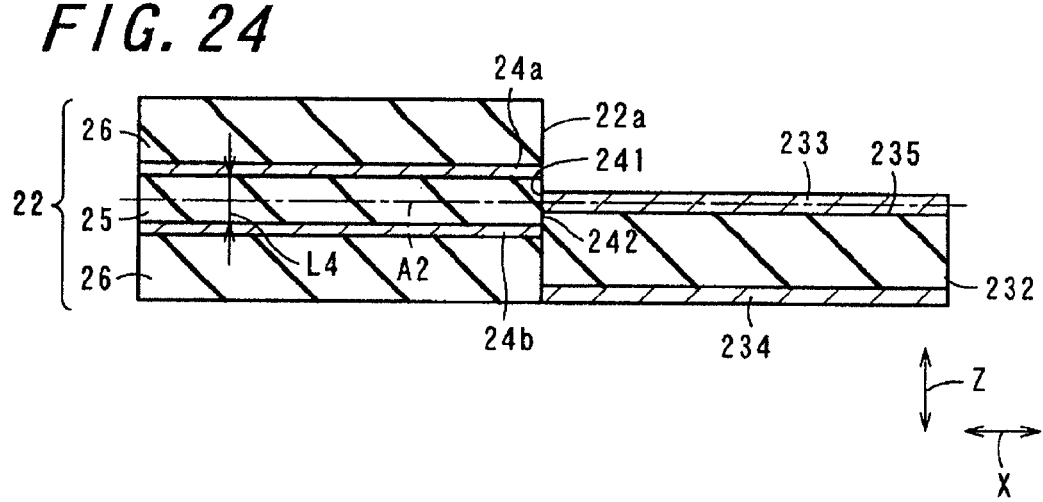
FIG. 24 is a sectional view of the connection structure 230 in a virtual plane which includes the axial line A2 along the propagation direction X of the phase shifter 20 and is perpendicular to the width direction Y.

FIG. 22 is a perspective view schematically showing a connection structure 230 of the phase shifter 20 and a microstrip guide 231. Hereinafter, the connection structure 230 of the phase shifter 20 and the microstrip guide 231 is simply referred to as "connection structure 230". FIG. 23 is a sectional view of the connection structure 230 in a virtual plane which includes an axial line A2 along the propagation direction X of the phase shifter 20 and is perpendicular to the thickness direction Z. FIG. 24 is a sectional view of the connection structure 230 in a virtual plane which includes the axial line A2 along the propagation direction X of the phase shifter 20 and is perpendicular to the width direction Y.

In the connection structure 230, the dimensions of the first dielectric part 25 in the width direction Y and the thickness direction Z is set such that electromagnetic wave can propagate an LSE mode near the cutoff state by increasing the ratio of a long side to a short side on the section perpendicular to the propagation direction X until an LSM mode is cut off and only the LSE mode is set in a propagation state. The cutoff frequency of the LSE mode is set to be less than the frequency of electromagnetic wave propagating along the first dielectric part 25.

In the LSE mode, the length of the first dielectric part 25 in the thickness direction Z can be set to be smaller than that in the LSM mode. Therefore, the first and second electrodes 24*a* and 24*b* can be disposed to be closer to each other, and thus a voltage required for obtaining a predetermined phase change can be further reduced.

The microstrip guide 231 serving as a plane guide is connected to at least one of the first input/output end 22*a* and the second input/output end 22*b* of the phase shifter 20. Here, a case where the microstrip guide 231 is connected to the first input/output end 22*a* of the phase shifter 20 is illustrated, but the same is applied to a case where the microstrip guide 231 is connected to the second input/output end 22*b* of the phase shifter 20. In the connection structure 230, a first end face of the phase shifter 20 in the propagation direction of the electromagnetic wave and a first end face of the microstrip guide 231 in the propagation direction of the electromagnetic wave are connected to abut each other.

The microstrip guide 231 includes a microstrip dielectric part 232, a strip conductor part 233 provided in the microstrip dielectric part 232, and a ground conductor part 234. The strip conductor part 233 and the ground conductor part 234 are provided to be spaced at an interval from each other. The strip conductor part 233 and the ground conductor part 234 are made of the same material as the first and second plate conductor parts 23*a* and 23*b*.

The microstrip dielectric part 232 is made of the same material as the second dielectric parts 26, and is made of a dielectric having the same dielectric constant as the second dielectric parts 26. If the microstrip dielectric part 232 is made of a dielectric having the same dielectric constant as the second dielectric part 26, a small reflective connection structure can be made. In the microstrip dielectric part 232, both surfaces in the thickness direction Z are planar surfaces. In the embodiment of the invention, the microstrip dielectric part 232 has a rectangular parallelepiped shape. On a first surface 235 of the microstrip dielectric part 232 in the thickness direction Z, the strip conductor part 233 is laminated in a central portion 236 along the width direction Y. The strip conductor part 233 has a rectangular parallelepiped shape. The strip conductor part 233 extends along the propagation direction X. The length of the strip conductor part 233 in the width direction Y is set to be less than the interval L1.

On a second surface 238 of the microstrip dielectric part 232 in the thickness direction Z, the ground conductor part 234 is formed. The ground conductor part 234 is formed over the entire second surface 238.

Among the end faces of the strip conductor part 233 in the propagation direction X of the electromagnetic wave, an end face 241 facing the phase shifter 20 and an end face 242 of the first dielectric part 25 of the first input/output end 22*a* are disposed to abut each other, such that a non-radioactive dielectric guide formed by the dielectric part 22 and the first and second plate conductor parts 23*a* and 23*b*, and the strip conductor part 233 are coupled to each other. The microstrip guide 231 is coupled to the LSE mode of the non-radioactive dielectric guide formed by the dielectric part 22 and the first and second plate conductor parts 23*a* and 23*b*. A center of the end face 241 of the strip conductor part 233 facing the phase shifter 20 is connected to a center of the end face 242 of the first dielectric part 25. The dimension of the microstrip dielectric part 232 in the width direction Y is set to be the same as the length between the outer surfaces of the first and second plate conductor parts 23*a* and 23*b* in the width direction Y of the phase shifter 20.

The lamination direction of the strip conductor part 233, the microstrip dielectric part 232, and the ground conductor part 234, and the lamination direction of the first and second dielectric parts 25 and 26 are arranged such that a longitudinal direction on a section of the strip conductor part 233 perpendicular to the propagation direction X is identical to a longitudinal direction on a section of the first dielectric part 25 perpendicular to the propagation direction X. Then, the strip conductor part 233 and the first dielectric part 25 are connected with each other. Therefore, a degree of freedom in design of the strip conductor part 233 can be improved.

The microstrip dielectric part 232 is provided to be in contact with the first input/output end 22*a*. The ground conductor part 234 is provided to be in contact with the first and second plate conductor parts 23*a* and 23*b*. The ground conductor part 234 is provided so as not to be in contact with the first and second plate conductor parts 23*a* and 23*b*. The strip conductor part 233 is not in contact with the first and second electrodes 24*a* and 24*b*.

The lengths of the strip conductor part 233 in the width direction Y and the thickness direction Z are set such that characteristic impedance of the microstrip guide 231 matches with characteristic impedance of the non-radioactive dielectric guide formed by the dielectric part 22 and the first and second plate conductor parts 23*a* and 23*b*.

With this configuration, the electromagnetic field distribution of high frequency wave in the microstrip guide 231 is approximated to the electromagnetic field distribution of the LSE mode in the non-radioactive dielectric guide formed by the dielectric part 22 and the first and second plate conductor parts 23a and 23b. For this reason, at a connection part of the microstrip guide 231 and the phase shifter 20, electromagnetic field transition is smoothly made. Therefore, a connection loss of the microstrip guide 231 and the phase shifter 20 can be reduced. In addition, a high frequency signal of the LSE mode is favorably extracted to the microstrip guide 231. Therefore, reliability of electrical connection between the phase shifter 20 and an electronic circuit, which is mounted on a board and uses a high frequency signal passing through the phase shifter 20, can be improved.

In the connection structure 230, the phase shifter 20 and the microstrip guide 231 may be formed as a single body, thereby forming a microstrip guide-equipped phase shifter.

Similarly to the phase shifter 20, the phase shifters 30 and 40 may be used while being connected to the microstrip guide 231.

Figure 25:
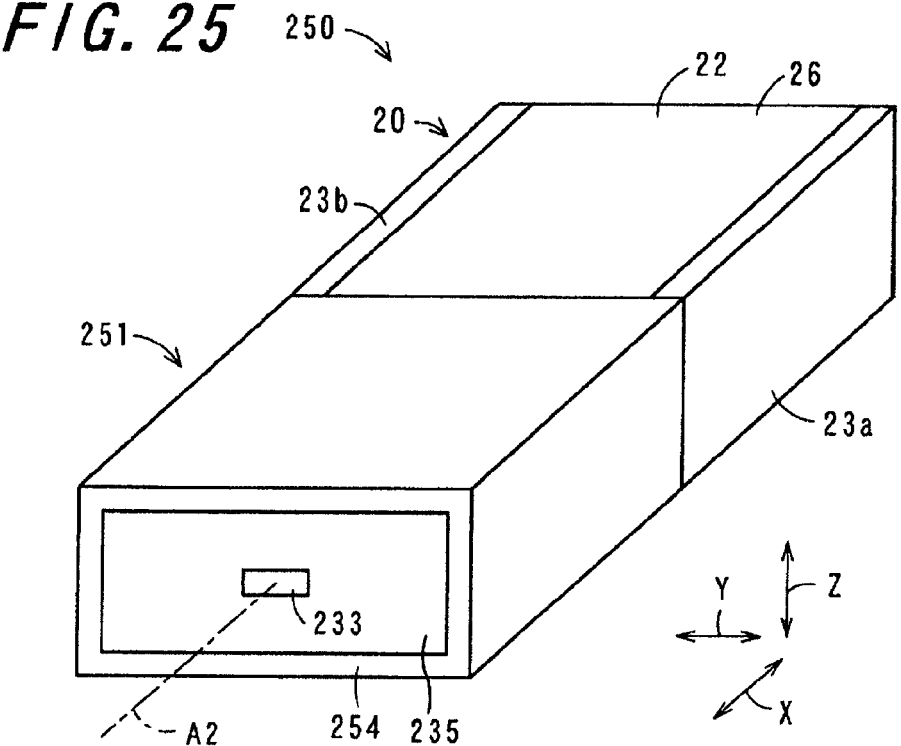
FIG. 25 is a perspective view schematically showing a connection structure 250 of the phase shifter 20 and a strip guide 251.
Figure 26:
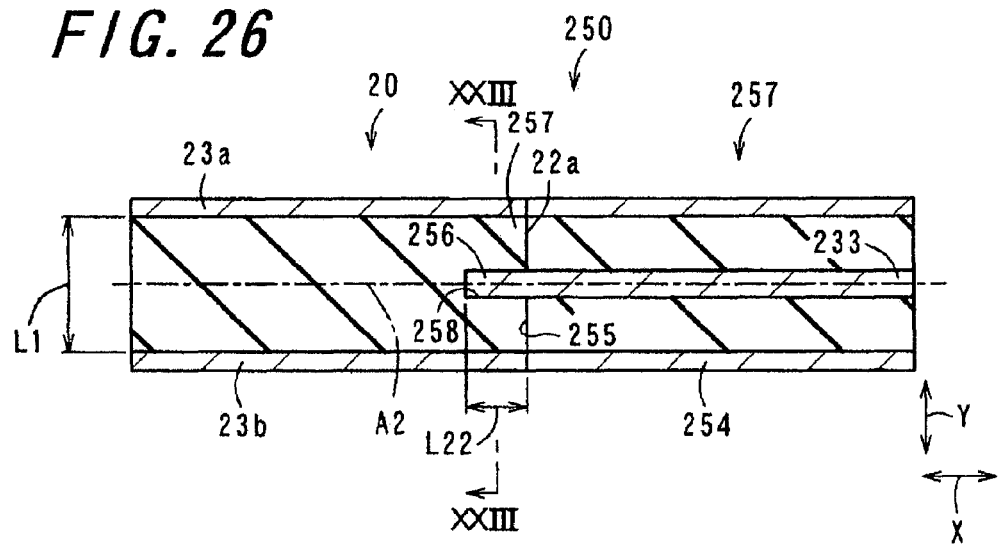
FIG. 26 is a sectional view of the connection structure 250 in a virtual plane which includes the axial line A2 along the propagation direction X of the phase shifter 20 and is perpendicular to the thickness direction Z.
Figure 27:
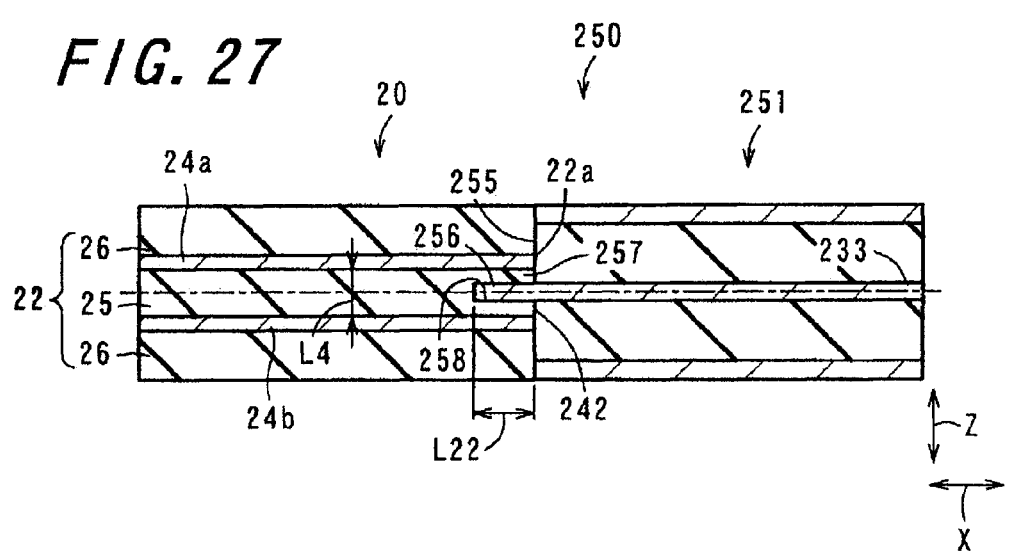
FIG. 27 is a sectional view of the connection structure 250 in a virtual plane which includes the axial line A2 along the propagation direction X of the phase shifter 20 and is perpendicular to the width direction Y.
Figure 28:
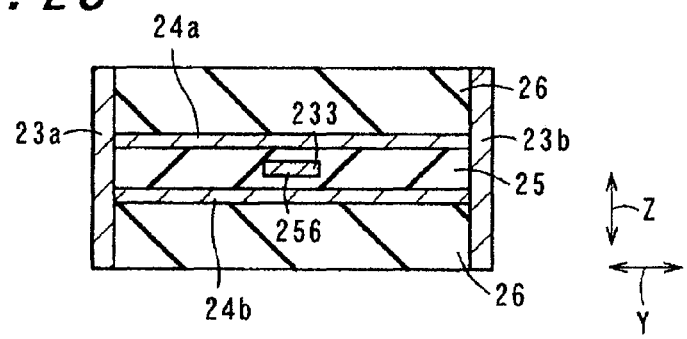
FIG. 28 is a sectional view as viewed from the line XXIII-XXIII of FIG. 26.

FIG. 25 is a perspective view schematically showing a connection structure 250 of the phase shifter 20 and a strip guide 251. Hereinafter, the connection structure 250 of the phase shifter 20 and the strip guide 251 is simply referred to as "connection structure 250". FIG. 26 is a sectional view of the connection structure 250 in a virtual plane which includes the axial line A2 along the propagation direction X of the phase shifter 20 and is perpendicular to the thickness direction Z. FIG. 27 is a sectional view of the connection structure 250 in a virtual plane which includes the axial line A2 along the propagation direction X of the phase shifter 20 and is perpendicular to the width direction Y. FIG. 28 is a sectional view as viewed from the line XXXII-XXIII of FIG. 26.

The connection structure 250 is similar to the connection structure 230 shown in FIG. 22, and has the same configuration. Therefore, the same parts are represented by the same reference numerals, and descriptions thereof will be omitted.

The strip guide 251 is connected to at least one of the first input/output end 22a and the second input/output end 22b of the phase shifter 20. Here, a case where the strip guide 251 is connected to the first input/output end 22a of the phase shifter 20 is illustrated, but the same is applied to a case where the strip guide 251 is connected to the second input/output end 22b of the phase shifter 20. In the connection structure 250, a first end face of the phase shifter 20 in the propagation direction of the electromagnetic wave and a first end face of the strip guide 251 in the propagation direction of the electromagnetic wave are connected to abut each other.

The strip guide 251 includes a strip dielectric part 252, a strip conductor part 233 provided in the strip dielectric part 252, and a ground conductor part 254. The strip conductor part 233 and the ground conductor part 234 are provided to be spaced at an interval from each other.

The strip dielectric part 252 is made of the same material as the microstrip dielectric part 232, and the ground conductor part 254 is made of the same material as the ground conductor part 234. The strip dielectric part 252 has a rectangular parallelepiped shape. On the surfaces of the strip dielectric part 252 in the thickness direction Z and the width direction Y, the ground conductor part 254 is formed. The ground conductor part 254 surrounds the strip dielectric part 252 around an axial line extending in the propagation direction X.

The strip conductor part 233 is embedded in the central portion of the strip dielectric part 252, and is formed between both end portions of the strip dielectric part 252 in the propagation direction X.

The strip conductor part 233 has a protrusion 256 that protrudes toward the phase shifter 20 from an end face 255 of the strip dielectric part 252 to be in contact with the phase shifter 20. In an end portion 257 of the first dielectric part 25 facing the strip guide 251, an insertion hole 258 into which the protrusion 256 is inserted is formed. The insertion hole 258 is formed to have the same size as the protrusion 256. The length L22 of the protrusion 256 or the insertion hole 258 along the propagation direction X is set to be approximately $(2n_5-1)/4$ (where $n_5$ is a natural number) times of the wavelength of the propagating electromagnetic wave in the protrusion 256. Therefore, a difference in phase between electromagnetic wave, which is reflected at an interface of the first input/output end 22a and the strip guide 251, and electromagnetic wave, which is reflected at an interface of a front end of the protrusion 256 and the first dielectric part 25, is set to π (rad), and thus reflected waves can cancel each other. In addition, reflection at an interface of the phase shifter 20 and the strip guide 251 is reduced, and thus a loss can be reduced.

The strip dielectric part 252 and the first and second dielectric parts 25 and 26 are connected to be in contact with each other. The ground conductor part 254 is provided to be in contact with the first and second plate conductor parts 23a and 23b. In addition, the ground conductor part 254 is provided to be not in contact with the first and second electrodes 24a and 24b.

The strip guide 251 is coupled to the LSE mode in the non-radioactive dielectric guide formed by the dielectric part 22 and the first and second plate conductor parts 23a and 23b. The strip conductor part 233 and the first dielectric part 25 are provided concentrically. The dimension of the strip guide 251 in the width direction Y is set to be the same as the length between the outer surfaces of the first and second plate conductor parts 23a and 23b in the width direction Y of the phase shifter 20. The dimension of the strip guide 251 in the thickness direction Y is set to be the same as the length between the outer surfaces in the thickness direction Z of the phase shifter 20.

The strip conductor part 233 and the first dielectric part 25 are connected with each other such that a longitudinal direction on a section of the strip conductor part 233 perpendicular to the propagation direction X is identical to a longitudinal direction on a section of the first dielectric part 25 perpendicular to the propagation direction X. Therefore, a degree of freedom in design of the strip conductor part 233 can be improved.

The lengths of the strip conductor part 233 in the width direction Y and the thickness direction Z are set such that characteristic impedance of the strip guide 251 matches with characteristic impedance of the non-radioactive dielectric guide formed by the dielectric part 22 and the first and second plate conductor parts 23a and 23b.

With this configuration, the electromagnetic field distribution of high frequency wave in the strip guide 251 is approximated to the electromagnetic field distribution of the LSE mode in the non-radioactive dielectric guide formed by the dielectric part 22 and the first and second plate conductor parts 23a and 23b. For this reason, at a connection part of the strip guide 251 and the phase shifter 20, electromagnetic field transition is smoothly made. Therefore, a connection loss can be reduced. In addition, a high frequency signal of the LSE mode can be favorably extracted to the strip guide 251. Therefore, reliability of electrical connection between the phase shifter 20 and an electronic circuit, which is mounted on a board and uses a high frequency signal passing through the phase shifter 20, can be improved.

In yet another embodiment of the invention, the phase shifter 20 and the strip guide 251 may be formed as a single body, thereby forming a strip guide-equipped phase shifter.

Similarly to the phase shifter 20, the phase shifters 30 and 40 may be used while being connected to the strip guide 251.

In the connection structure shown in FIG. 22, the protrusion 256 may be provided in the strip conductor part 233, and the protrusion 256 may be inserted into the insertion hole 258 provided in the first dielectric part 25.

Figure 29:
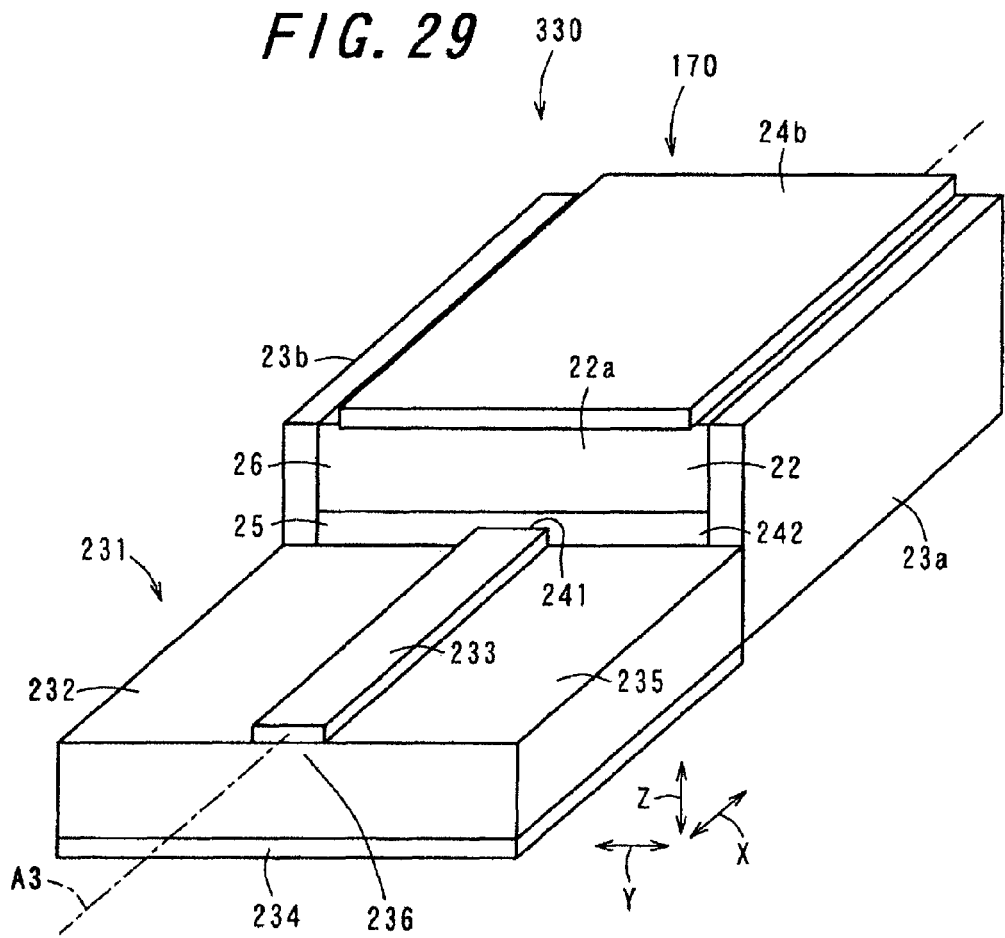
FIG. 29 is a perspective view schematically showing a connection structure 330 of the phase shifter 170 and the microstrip guide 231.
Figure 30:
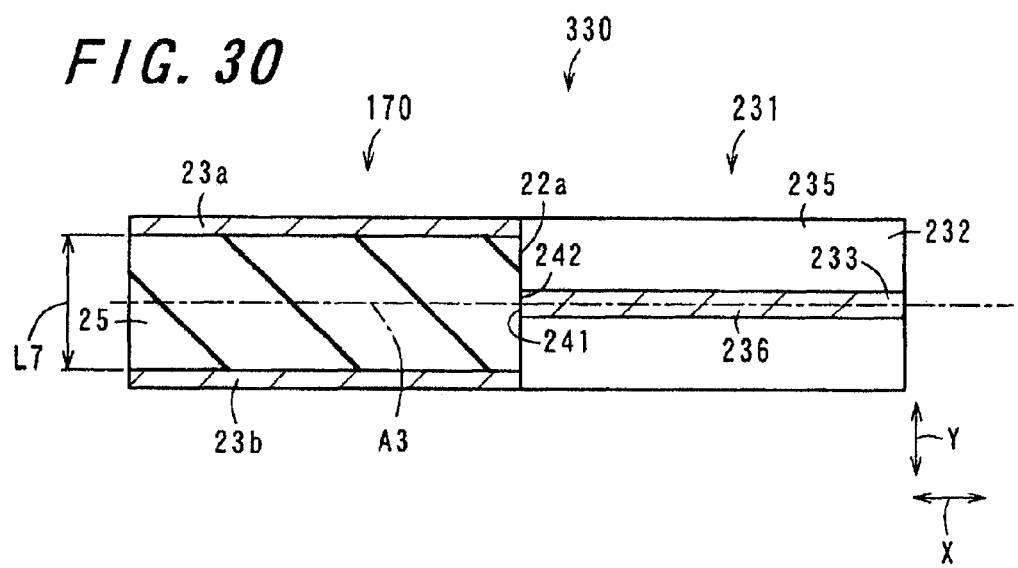
FIG. 30 is a sectional view of the connection structure 330 in a virtual plane which includes an axial line A2 along the propagation direction X of the phase shifter 170 and is perpendicular to the thickness direction Z.
Figure 31:
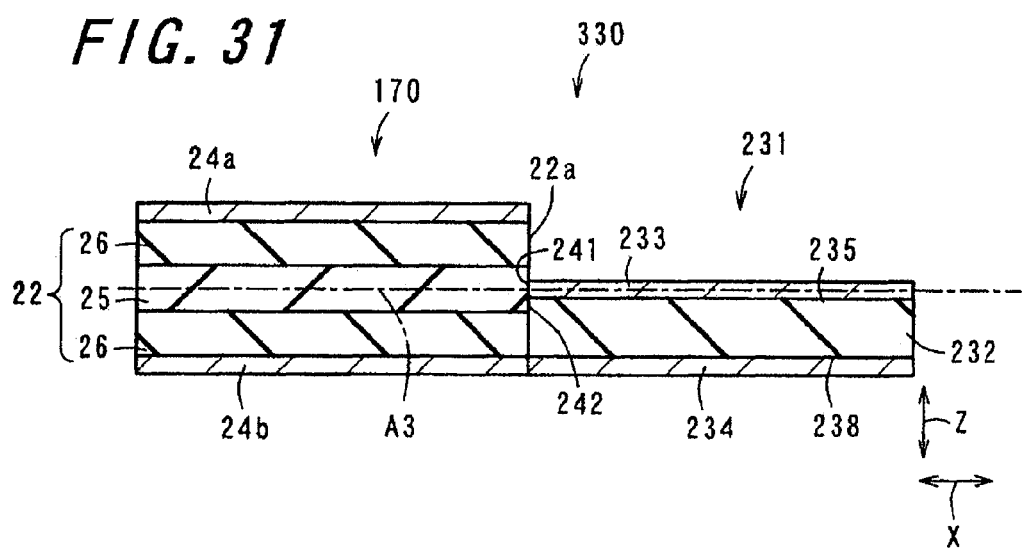
FIG. 31 is a sectional view of the connection structure 330 in a virtual plane which includes the axial line A2 along the propagation direction X of the phase shifter 170 and is perpendicular to the width direction Y.

FIG. 29 is a perspective view schematically showing a connection structure 330 of the phase shifter 170 and the microstrip guide 31. Hereinafter, the connection structure 330 of the phase shifter 170 and the microstrip guide 231 is simply referred to as "connection structure 330". FIG. 30 is a sectional view of the connection structure 330 in a virtual plane which includes an axial line A3 along the propagation direction X of the phase shifter 170 and is perpendicular to the thickness direction Z. FIG. 31 is a sectional view of the connection structure 330 in a virtual plane which includes the axial line A3 along the propagation direction X of the phase shifter 170 and is perpendicular to the width direction Y.

In the connection structure 330, the dimensions of the first dielectric part 25 in the width direction Y and the thickness direction Z are set such that electromagnetic wave can propagate an LSE mode near the cutoff state by increasing the ratio of a long side to a short side on the section perpendicular to the propagation direction X until an LSM mode is cut off and only the LSE mode is set in a propagation state. The cutoff frequency of the LSE mode is set to be less than the frequency of electromagnetic wave propagating along the first dielectric part 25.

The microstrip guide 231 serving as a plane guide is connected to at lease one of the first input/output end 22a and the second input/output end 22b of the phase shifter 170. Here, a case where the microstrip guide 231 is connected to the first input/output end 22a of the phase shifter 170 is illustrated, but the same is applied to a case where the microstrip guide 231 is connected to the second input/output end 22b of the phase shifter 170. In the connection structure 330, a first end face of the phase shifter 170 in the propagation direction of the electromagnetic wave and a first end face of the microstrip guide 231 in the propagation direction of the electromagnetic wave are connected to abut each other.

The first dielectric part 25 is set so as not to be in contact with the first and second electrodes 24a and 24b.

Among the end faces of the strip conductor part 233 in the propagation direction X of the electromagnetic wave, an end face 241 facing the phase shifter 170 and an end face 242 of the first dielectric part 25 of the first input/output end 22a are disposed to abut each other, such that the non-radioactive dielectric guide formed by the dielectric part 22 and the first and second plate conductor parts 23a and 23b, and the strip conductor part 233 are coupled to each other. The microstrip guide 231 is coupled to the LSE mode of the non-radioactive dielectric guide formed by the dielectric part 22 and the first and second plate conductor parts 23a and 23b. A center of the end face 241 of the strip conductor part 233 facing the phase shifter 170 is connected to a center of the end face 242 of the first dielectric part 25. The dimension of the microstrip dielectric part 232 in the width direction Y is set to be the same as the length between the outer surfaces of the first and second plate conductor parts 23a and 23b in the width direction Y of the phase shifter 170.

The lamination direction of the strip conductor part 233, the microstrip dielectric part 232, and the ground conductor part 234, and the lamination direction of the first and second dielectric parts 25 and 26 are arranged such that a longitudinal direction on a section of the strip conductor part 233 perpendicular to the propagation direction X is identical to a longitudinal direction on a section of the first dielectric part 25 perpendicular to the propagation direction X. Then, the strip conductor part 233 and the first dielectric part 25 are connected with each other. Therefore, a degree of freedom in design of the strip conductor part 233 can be improved.

The microstrip dielectric part 235 is provided to be in contact with the first input/output end 22a. The ground conductor part 234 is provided to be connected to the second electrode 24b. The ground conductor part 234 is provided so as not to be in contact with the first and second plate conductor parts 23a and 23b.

The lengths of the strip conductor part 233 in the width direction Y and the thickness direction Z are set such that characteristic impedance of the microstrip guide 231 matches with characteristic impedance of the non-radioactive dielectric guide formed by the dielectric part 22 and the first and second plate conductor parts 23a and 23b.

With this configuration, the electromagnetic field distribution of high frequency wave in the microstrip guide 231 is approximated to the electromagnetic field distribution of the LSE mode in the non-radioactive dielectric guide formed by the dielectric part 22 and the first and second plate conductor parts 23a and 23b. For this reason, at a connection part of the microstrip guide 231 and the phase shifter 170, electromagnetic field transition is smoothly made. Therefore, a connection loss of the microstrip guide 231 and the phase shifter 170 can be reduced. In addition, a high frequency signal of the LSE mode can be favorably extracted to the microstrip guide 231. Therefore, reliability of electrical connection between the phase shifter 170 and an electronic circuit, which is mounted on a board and uses a high frequency signal passing through the phase shifter 170, can be improved.

In yet another embodiment of the invention, the phase shifter 170 and the microstrip guide 231 may be formed as a single body, thereby forming a microstrip guide-equipped phase shifter.

Figure 32:
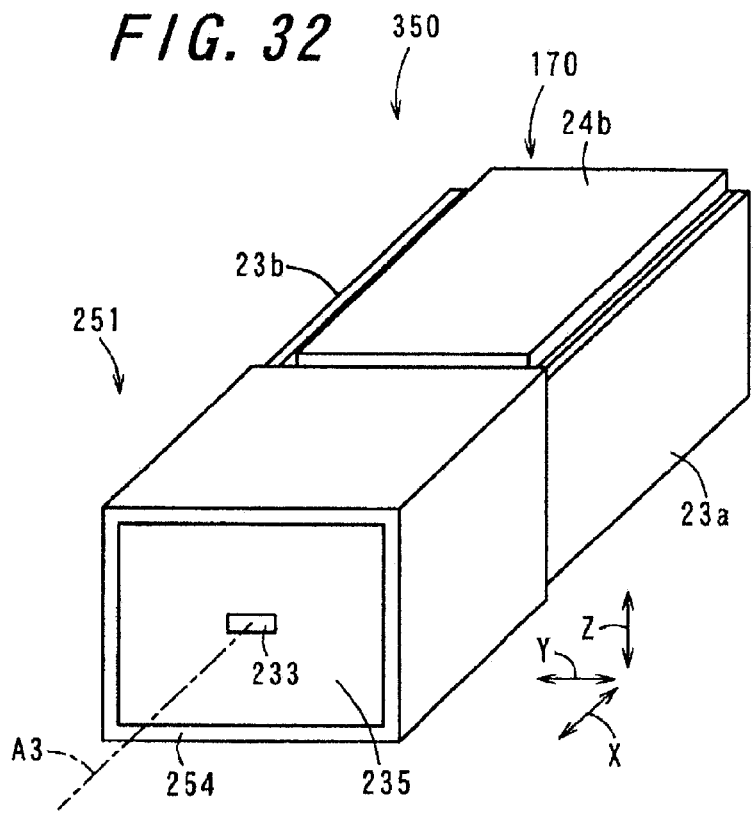
FIG. 32 is a perspective view schematically showing a connection structure 350 of the phase shifter 170 and the strip guide 251.
Figure 33:
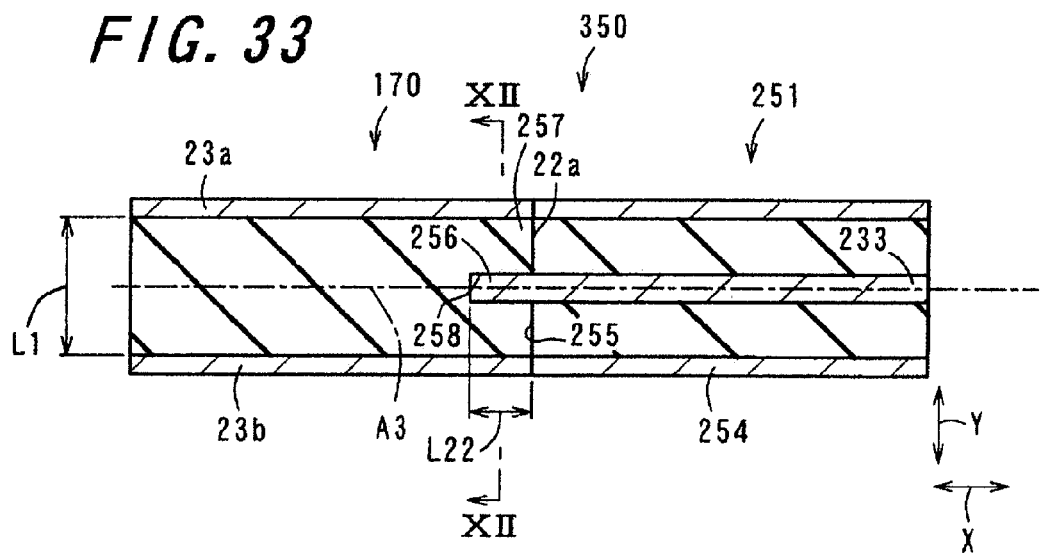
FIG. 33 is a sectional view of the connection structure 350 in a virtual plane which includes the axial line A2 along the propagation direction X of the phase shifter 170 and is perpendicular to the thickness direction Z.
Figure 34:
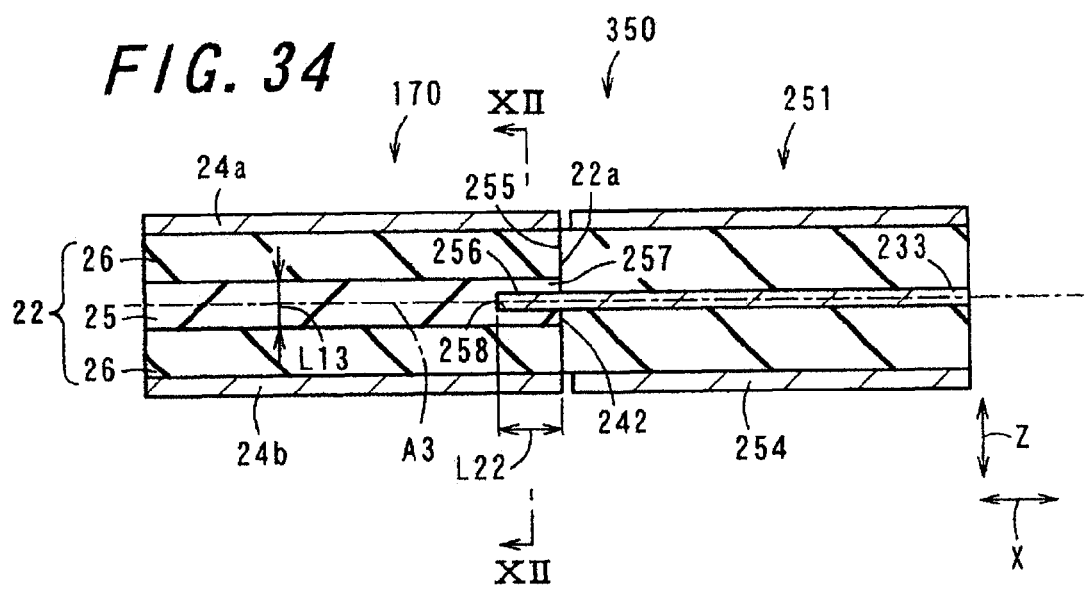
FIG. 34 is a sectional view of the connection structure 350 in a virtual plane which includes the axial line A2 along the propagation direction X of the phase shifter 170 and is perpendicular to the width direction Y.
Figure 35:
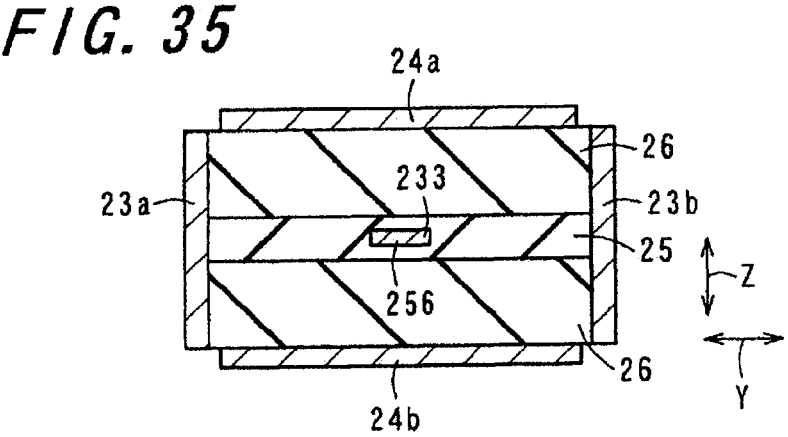
FIG. 35 is a sectional view as viewed from the line XII-XII of FIGS. 33 and 34.

FIG. 32 is a perspective view schematically showing a connection structure 350 of the phase shifter 170 and the strip guide 251. Hereinafter, the connection structure 350 of the phase shifter 170 and the strip guide 251 is simply referred to as "connection structure 350". FIG. 33 is a sectional view of the connection structure 350 in a virtual plane which includes the axial line A3 along the propagation direction X of the phase shifter 170 and is perpendicular to the thickness direction Z. FIG. 34 is a sectional view of the connection structure 350 in a virtual plane which includes the axial line A3 along the propagation direction X of the phase shifter 170 and is perpendicular to the width direction Y. FIG. 35 is a sectional view as viewed from the line XII-XII of FIGS. 33 and 34.

The connection structure 350 is similar to the connection structure 330 shown FIG. 29 and has the same configuration. Therefore, the same parts are represented by the same reference numerals, and descriptions thereof will be omitted.

The strip guide 251 is connected to at least one of the first input/output end 22a and the second input/output end 22b of the phase shifter 170. Here, a case where the strip guide 251 is connected to the first input/output end 22a of the phase shifter 170 is illustrated, but the same is applied to a case where the strip guide 251 is connected to the second input/output end 22b of the phase shifter 170. In the connection structure 350, a first end face of the phase shifter 170 in the propagation direction of the electromagnetic wave and a first end face of the strip guide 251 in the propagation direction of the electromagnetic wave are connected to abut each other.

The strip conductor part 233 has a protrusion 256 that protrudes toward the phase shifter 170 from an end face 255 of the strip dielectric part 252 to be in contact with the phase shifter 170. In an end portion 257 of the first dielectric part 25 facing the strip guide 251, an insertion hole 258 into which the protrusion 256 is inserted is formed. The insertion hole 258 is formed to have the same size as the protrusion 256. The protrusion 256 is provided to be inserted into the insertion hole 258. The length of protrusion 256 or the insertion hole 258 along the propagation direction X is set to be the same as the length L22. Therefore, a loss can be reduced.

The strip dielectric part 252 and the first and second dielectric parts 25 and 26 are connected to be in contact with each other. The ground conductor part 254 is provided to be in contact with the first and second plate conductor parts 23a and 23b. The ground conductor part 254 is provided to be not in contact with the first and second electrodes 24a and 24b. The ground conductor part 254 and the first and second electrodes 24a and 24b are provided to be spaced at a distance 1 μm to 50 μm from each other.

The strip guide 251 is coupled to the LSE mode of the non-radioactive dielectric guide formed by the dielectric part 22 and the first and second plate conductor parts 23a and 23b. The strip conductor part 233 and the first dielectric part 25 are provided concentrically. The dimension of the strip guide 251 in the width direction Y is set to be the same as the length between the outer surfaces of the first and second plate conductor parts 23a and 23b in the width direction Y of the phase shifter 170. The dimension of the strip guide 251 in the thickness direction Y is set to be the same as the length between the outer surfaces of the first and second electrodes 24a and 24b in the thickness direction Z of the phase shifter 170.

The strip conductor part 233 and the first dielectric part 25 are connected with each other such that a longitudinal direction on a section of the strip conductor part 233 perpendicular to the propagation direction X is identical to a longitudinal direction on a section of the first dielectric part 25 perpendicular to the propagation direction X. Therefore, a degree of freedom in design of the strip conductor part 233 can be improved.

The lengths of the strip conductor part 233 in the width direction Y and the thickness direction Z are set such that characteristic impedance of the strip guide 251 matches with characteristic impedance of the non-radioactive dielectric guide formed by the dielectric part 22 and the first and second plate conductor parts 23a and 23b.

With this configuration, the electromagnetic field distribution of high frequency wave in the strip guide 251 is approximated to the electromagnetic field distribution of the LSE mode in the non-radioactive dielectric guide formed by the dielectric part 22 and the first and second plate conductor parts 23a and 23b. For this reason, at a connection part of the strip guide 251 and the phase shifter 170, electromagnetic field transition is smoothly made. Therefore, a connection loss can be reduced. In addition, a high frequency signal of the LSE mode can be favorably extracted to the strip guide 251. Therefore, reliability of electrical connection between the phase shifter 170 and an electronic circuit, which is mounted on a board and uses a high frequency signal passing through the phase shifter 170, can be improved.

In yet another embodiment of the invention, the phase shifter 170 and the strip guide 251 may be formed as a single body, thereby forming a strip guide-equipped phase shifter.

In the connection structure shown in FIG. 29, the protrusion 256 may be provided in the strip conductor part 233, and the protrusion 256 may be inserted into the insertion hole 258 provided in the first dielectric part 25.

Figure 36:
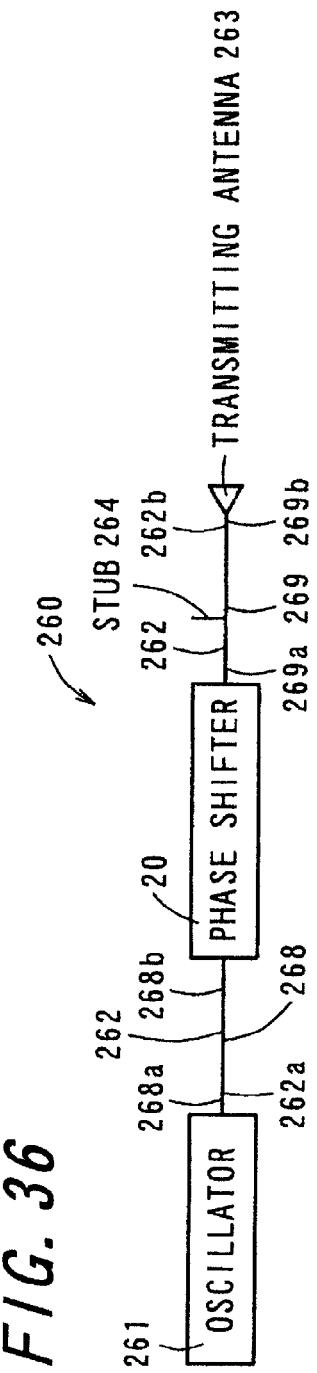
FIG. 36 is a schematic view showing the configuration of a high frequency transmitter 260 according to an embodiment of the invention.

FIG. 36 is a schematic view showing the configuration of a high frequency transmitter 260 according to an embodiment of the invention. The high frequency transmitter 260 includes the phase shifter 20 of the embodiment shown in FIG. 1, a high frequency oscillator 261, a transmission line 262, a transmitting antenna 263, and a stub 264. Hereinafter, the high frequency transmission line is simply referred to as a transmission line. The high frequency oscillator 261 includes a Gunn oscillator using a Gunn diode, an impact oscillator using an impact diode, or an MMIC (Microwave Monolithic Integrated Circuit) oscillator using a FET (Field Effect Transistor), and generates a high frequency signal. The transmission line 262 includes a microstrip guide or a strip guide. A first end portion 262a of the transmission line 262 in a transmission direction of the high frequency signal is connected to the high frequency oscillator 261, and a second end portion 262b of the transmission line 262 in the transmission direction of the high frequency signal is connected to the transmitting antenna 263. The transmitting antenna 263 is implemented by a patch antenna or a horn antenna. The transmission direction of the high frequency signal is the propagation direction of the electromagnetic wave.

The phase shifter 20 is inserted into the transmission line 262 such that the high frequency signal passes through the dielectric part 22 through the microstrip guide 231 or the strip guide 251. The stub 264 is implemented by, for example, an open stub, and functions as a characteristic control circuit of the high frequency oscillator 261. The stub 264 is provided in the transmission line 262 on at least one of the upstream and downstream sides of the phase shifter 20 in the transmission direction of the high frequency signal.

Specifically, the transmission line 262 includes first and second transmission lines 268 and 269. A first end portion 268a of the first transmission line 268 in the transmission direction of the high frequency signal is connected to the high frequency oscillator 261. A second end portion 268b of the first transmission line 268 in the transmission direction of the high frequency signal is connected to the first input/output end 22a of the phase shifter 20. A first end portion 269a of the second transmission line 269 in the transmission direction of the high frequency signal is connected to the second input/output end 22b of the phase shifter 20. A second end portion 269b of the second transmission line 269 in the transmission direction of the high frequency signal is connected to the transmitting antenna 263.

The high frequency signal generated at the high frequency oscillator 261 passes through the first transmission line 268, the dielectric part 22 of the phase shifter 20, and the second transmission line 268, is supplied to the transmitting antenna 263, and is radiated from the transmitting antenna 263 as electric wave.

In the high frequency transmitter 260, the stub 264 is provided between the high frequency oscillator 261 and the transmitting antenna 263, such that a mismatch at a connection part of the high frequency oscillator 261 to the transmission line 262 or a connection part of the transmitting antenna 263 to the transmission line 262 can be eliminated. Therefore, reflection at the connection part can be suppressed to be small, and stable oscillation characteristics are obtained. In addition, an insertion loss is suppressed to be small, and thus a high transmission output is obtained. In the high frequency transmitter 260, the phase shifter 20 is inserted into the transmission line 262 such that electromagnetic wave of the high frequency signal to be transmitted through the transmission line 262 passes through the dielectric part 22. For this reason, it is possible to achieve the high frequency transmitter 260 that can separately control a phase shift due to the transmission line 262 caused by a variation in shape of a wire and/or a bump for connecting the high frequency oscillator 261 and a variation in guide width of the transmission line, thereby obtaining a match, has stable oscillation characteristics, and can suppress an insertion loss to be small, thereby having a high transmission output. Furthermore, as described above, the phase shifter 20 can be small in size and operable at a low voltage. Therefore, even though the phase shifter 20 is provided, the high frequency transmitter 260 can be small in size, and the configuration for applying a voltage to the phase shifter 20 can be prevented from being complicated.

The high frequency transmitter 260 uses the phase shifter 20, but instead of the phase shifter 20, one of the phase shifters in the foregoing embodiments, for example, the phase shifter 30 in the foregoing embodiment, may be used. With this configuration, the same effects can also be obtained. Further, in the high frequency transmitter 260, the transmission line 262 may be implemented by, instead of a microstrip guide or a strip guide, a coplanar guide, a ground-equipped coplanar guide, a slot guide, a waveguide tube, or a dielectric waveguide tube.

Figure 37:
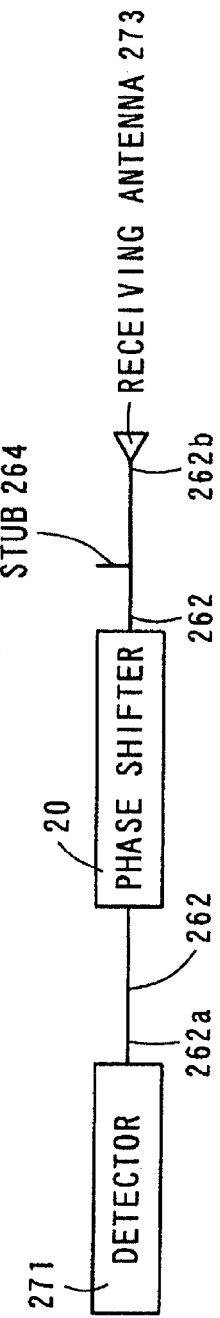
FIG. 37 is a schematic view showing the configuration of a high frequency receiver 270 according to an embodiment of the invention.

FIG. 37 is a schematic view showing the configuration of a high frequency receiver 270 according to an embodiment of the invention. The same parts as those in the high frequency transmitter 260 of the embodiment shown in FIG. 36 are represented by the same reference numerals, and descriptions thereof may be omitted.

The high frequency receiver 270 includes the phase shifter 20 of the foregoing embodiment, a high frequency detector 271, a transmission line 262, a stub 264, and a receiving antenna 273. The high frequency detector 271 is implemented by, for example, a Schottky barrier diode detector, a video detector, or a mixer MMIC.

A first end portion 262a of the transmission line 262 in the transmission direction of the high frequency signal is connected to the high frequency detector 271. A second end portion 262b of the transmission line 262 in the transmission direction of the high frequency signal is connected to the receiving antenna 273. The receiving antenna 273 is implemented by a patch antenna or a horn antenna.

The phase shifter 20 is inserted into the transmission line 262 such that the high frequency signal passes through the dielectric part 22. The stub 264 is provided in the transmission line 262 on at lease one of the upstream and downstream sides of the phase shifter 20 in the transmission direction of the high frequency signal.

If electric wave incoming from the outside is received by the receiving antenna 273, the receiving antenna 273 supplies a high frequency signal based on the electric wave to the transmission line 262. Then, the received high frequency signal passes through the dielectric part 22 of the phase shifter 20 and is then supplied to the high frequency detector 271. The high frequency detector 271 detects the high frequency signal to detect information included in the high frequency signal.

In the high frequency receiver 270, the high frequency signal received by the receiving antenna 273 is transmitted to the transmission line 262 and detected by the high frequency detector 271. The stub 264 is provided between the receiving antenna 273 and the high frequency detector 271, such that a mismatch at a connection part of the high frequency detector 271 to the transmission line 262 or a connection part of the receiving antenna 273 to the transmission line 262 is eliminated. Therefore, reflection at the connection part can be suppressed to be small, and stable detection characteristics are obtained. In addition, an insertion loss is suppressed to be small, and thus a high detection output is obtained. In the high frequency receiver 270, the phase shifter 20 is inserted into the transmission line 262 such that electromagnetic wave of the high frequency signal to be transmitted in the transmission line 262 passes through the dielectric part 22. For this reason, it is possible to achieve the high frequency receiver 270 that can separately control a phase shift due to the transmission line 262 caused by a variation in shape of a wire or a bump for connecting the high frequency detector 271 and a variation in guide width of the transmission line, thereby obtaining a match, has stable detection characteristics, and can suppress an insertion loss to be small, thereby having a high detection output. Furthermore, as described above, the phase shifter 20 can be small in size and operable at a low voltage. Therefore, even though the phase shifter 20 is provided, the high frequency receiver 270 can be small in size, and the configuration for applying a voltage to the phase shifter 20 can be prevented from being complicated.

The high frequency receiver 270 uses the phase shifter 20, but instead of the phase shifter 20, one of the phase shifters in the foregoing embodiments, for example, the phase shifter 30 of the foregoing embodiment, may be used. With this configuration, the same effects can also be obtained.

Figure 38:
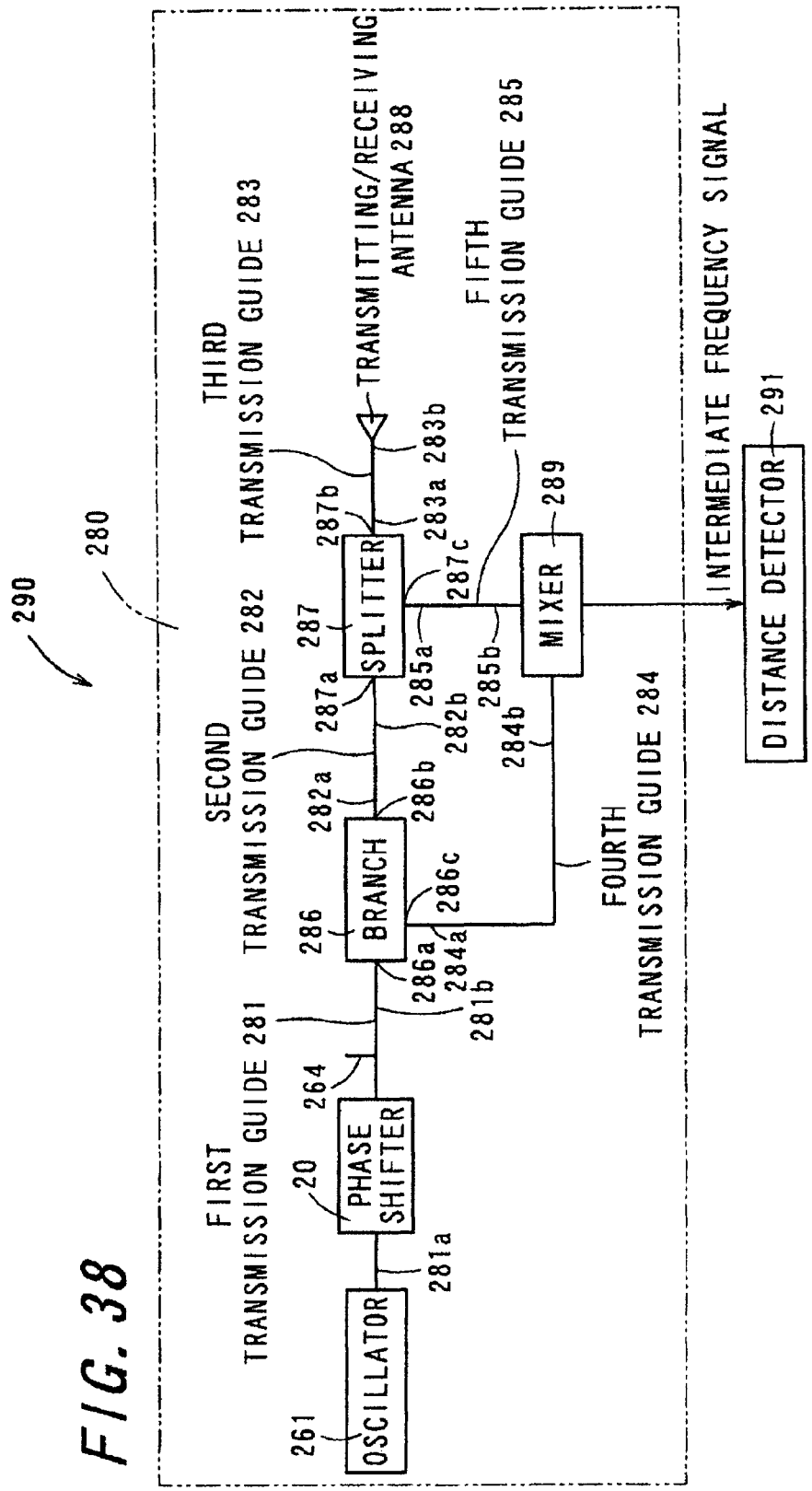
FIG. 38 is a schematic view showing the configuration of a radar device 290 including a high frequency transceiver 280 according to an embodiment of the invention.

FIG. 38 is a schematic view showing the configuration of a radar device 290 including a high frequency transceiver 280 according to an embodiment of the invention. In the radar device 290, the same parts as the high frequency transmitter 260 and the high frequency receiver 270 of the foregoing embodiment shown in FIGS. 36 and 37 are represented by the same reference numerals, and descriptions thereof may be omitted. The radar device 290 includes the high frequency transceiver 280, and a distance detector 291.

The high frequency transceiver 280 includes the phase shifter 20 of the foregoing embodiment, a high frequency oscillator 261, first to fifth transmission lines 281, 282, 283, 284, and 285, a branch 286, a splitter 287, a transmitting/receiving antenna 288, a mixer 289, and a stub 264. The transmitting/receiving antenna 288 is implemented by a patch antenna or a horn antenna. The first to fifth transmission lines 281, 282, 283, 284, and 285 have the same configuration as the transmission line 262.

A first end portion 281a of the first transmission line 281 in the transmission direction of the high frequency signal is connected to the high frequency oscillator 261. A second end portion 281b of the first transmission line 281 in the transmission direction of the high frequency signal is connected to the branch 286. The phase shifter 20 is inserted into the first transmission line 281 such that the high frequency signal passes through the dielectric part 22. The stub 264 is provided in the first transmission line 281 on at least one of the upstream and downstream sides of the phase shifter 20 in the transmission direction of the high frequency signal.

The branch (switch) 286 has first, second, and third terminals 286a, 286b, and 286c, and selectively outputs the high frequency signal inputted to the first terminal 286a to the second terminal 286b and the third terminal 286c. The branch 286 is implemented by, for example, a high frequency switch element. A control signal is supplied from a control unit (not shown) to the branch 286, and the first terminal 286a and the second terminal 286b or the first terminal 286a and the third terminal 286c are selectively connected with each other. The branch 286 is also implemented by, for example, a directional coupler. The radar device 290 is implemented by a pulse radar. The control unit connects the first terminal 286a and the second terminal 286b, and causes a pulsed high frequency signal to be outputted from the second terminal 286b. Then, the control unit connects the first terminal 286a and the third terminal 286c, and causes the high frequency signal to be outputted from the third terminal 286c. A first end portion 282a of the second transmission line 282 in the transmission direction of the high frequency signal is connected to the second terminal 286b. A first end portion 284a of the fourth transmission line 284 in the transmission direction of the high frequency signal is connected to the third terminal 286c.

The splitter 287 has fourth, fifth, and sixth terminals 287a, 287b, and 287c. The splitter 287 outputs to the fifth terminal 287b a high frequency signal, which is supplied to the fourth terminal 287a, and outputs to the to the sixth terminal 287c a high frequency signal, which is supplied to the fifth terminal 287b. A second end portion 282b of the second transmission line 282 in the transmission direction of the high frequency signal is connected to the fourth terminal 287a. A first end portion 283a of the third transmission line 283 in the transmission direction of the high frequency signal is connected to the fifth terminal 287b. A second end portion 283b of the third transmission line 283 in the transmission direction of the high frequency signal is connected to the transmitting/receiving antenna 288.

A first end portion 285a of the fifth transmission line 285 in the transmission direction of the high frequency signal is connected to the sixth terminal 288c. A second end portion 284b of the fourth transmission line 284 in the transmission direction of the high frequency signal, and a second end portion 285b of the fifth transmission line 285 in the transmission direction of the high frequency signal are connected to the mixer 289. The splitter 287 is implemented by a hybrid circuit. The hybrid circuit is a directional coupler and is implemented by magic T, hybrid ring, or rat race.

The high frequency signal generated at the high frequency oscillator 261 passes through the first transmission line 281 and the dielectric part 22 of the phase shifter 20, is supplied to the transmitting/receiving antenna 288 through the branch 286, the second transmission line 282, the splitter 287, and the third transmission line 282, and is radiated from the transmitting/receiving antenna 288 as electric wave. Further, the high frequency signal generated at the high frequency oscillator 261 passes through the first transmission line 281 and the dielectric part 22 of the phase shifter 20, and is supplied to the mixer 289 as a local signal through the branch 286 and the fourth transmission line 284.

If electric wave incoming from the outside is received by the transmitting/receiving antenna 288, the transmitting/receiving antenna 288 supplies a high frequency signal based on the electric wave to the third transmission line 283. Then, the high frequency signal is supplied to the mixer 289 through the splitter 287 and the fifth transmission line 285.

The mixer 289 mixes the high frequency signals supplied from the fourth and fifth transmission lines 284 and 285, and outputs an intermediate frequency signal. The intermediate frequency signal outputted from the mixer 289 is supplied to the distance detector 291.

The distance detector 291 includes the high frequency detector 271, and on the basis of the intermediate frequency signal obtained from the electric wave (echo) radiated from the high frequency transceiver 280 and reflected from an object to be measured, calculates a distance from the high frequency transceiver 280 to the object to be measured, for example, a distance from the transmitting/receiving antenna 288 to the object to be measured. The distance detector 291 is implemented by, for example, a microcomputer.

In the high frequency transceiver 280, the phase shifter 20 is inserted into the first transmission line 281 such that the high frequency signal passes through the dielectric part 22. Therefore, it is possible to achieve the high frequency transceiver 280 that can control the phase of a high frequency signal, which undesirably varies due to the transmission line 262 caused by a variation in guide width, has stable oscillation characteristics, and can suppress an insertion loss to be small, thereby having a high transmission output. It is also possible to achieve the high frequency transceiver 280 that has stable detection characteristics and can suppress an insertion loss to be small, thereby having a high detection output. It is also possible to improve reliability of the intermediate frequency signal generated by the mixer 289. In addition, as described above, the phase shifter 20 can be small and operable at a low voltage. Therefore, even though the phase shifter 20 is provided, the high frequency transceiver 280 can be small in size, and the configuration for applying a voltage to the phase shifter 20 can be prevented from being complicated.

In the radar device 290, the distance detector detects a distance to an object to be detected on the basis of the intermediate frequency signal from the high frequency transceiver 280. Therefore, the distance to the object to be detected can be accurately detected.

In this embodiment, the branch 286 is implemented by a directional coupler. Therefore, the high frequency signal supplied to the first terminal 286a is branched off to the second terminal 286b and the third terminal 286c. In this case, power of the electric wave outputted from the transmitting/receiving antenna 288 becomes low, as compared with a branch using a switch described below. However, since it is not necessary to control the branch 286, device control can be simplified.

In this embodiment, the phase shifter 20 is inserted into the first transmission line 281, but in yet another embodiment of the invention, the phase shifter 20 may be inserted into at least one of the first to fifth transmission lines 281 to 285 such that the high frequency signal passes through the dielectric part 22. With this configuration, the same effects can also be obtained.

The high frequency transceiver 280 uses the phase shifter 20, but instead of the phase shifter 20, one of the phase shifters in the foregoing embodiments, for example the phase shifter 30, may be used. With this configuration, the same effects can also be obtained.

In yet another embodiment of the invention, the splitter 287 may be implemented by a circulator. With this configuration, the same effects can also be obtained.

Figure 39:
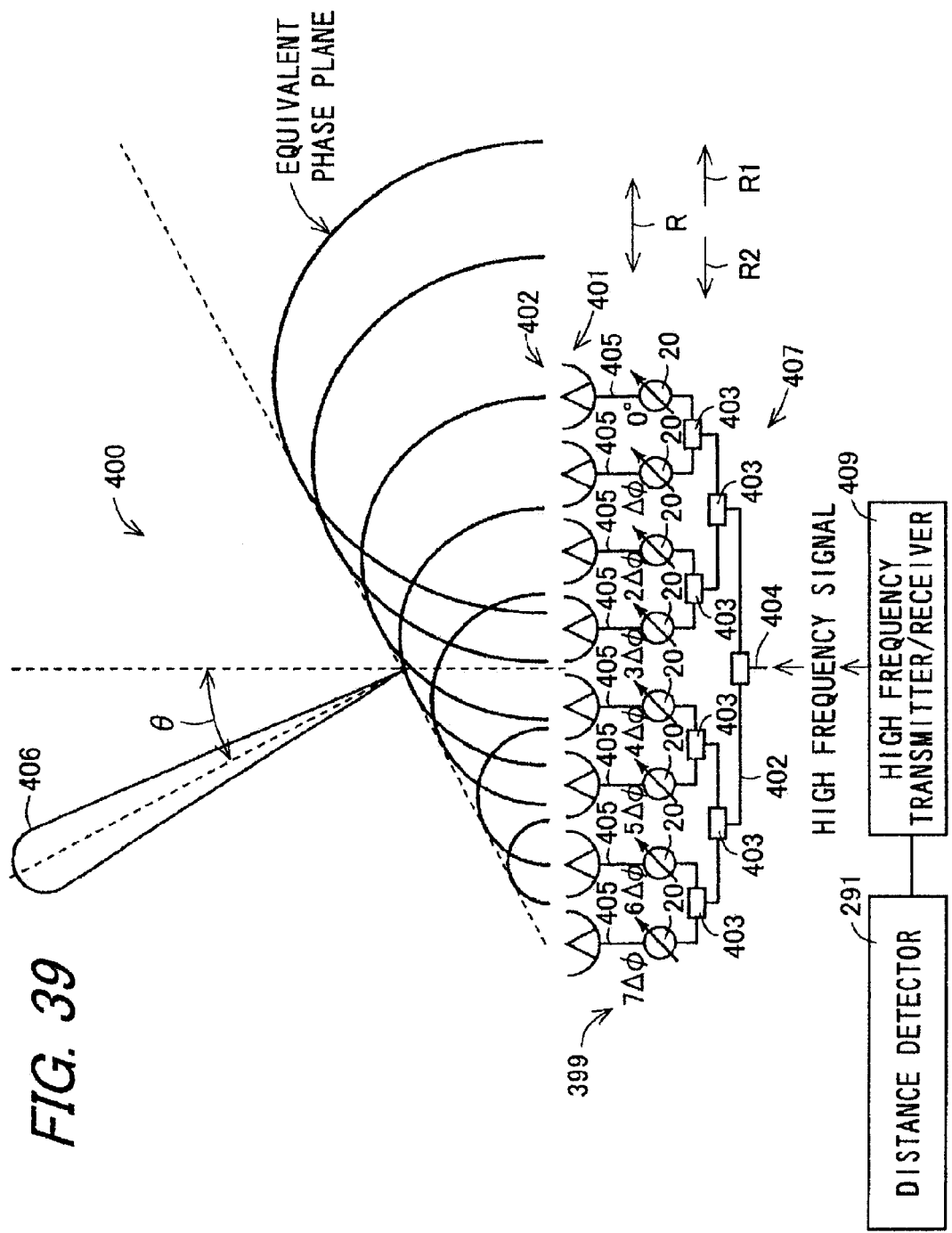
FIG. 39 is a schematic view showing the configuration of a radar device 400 that includes an array antenna 399 having the phase shifter 20 according to the embodiment of the invention.

FIG. 39 is a schematic view showing the configuration of a radar device 400 that includes an array antenna 399 having the phase shifter 20 according to the embodiment of the invention. In the embodiment of the invention, the same parts as those in the foregoing embodiments are represented by the same reference numerals, and descriptions thereof will be omitted. The radar device 400 includes the array antenna 399, a high frequency transceiver 409, and a distance detector 291.

The array antenna 399 includes an antenna array body 407 in which phase shifter-equipped antennas 405 each including an antenna element 401 and a phase shifter 20 attached to the antenna element 401 are arranged, and a transmission line 402 that is connected to the phase shifter-equipped antennas 405. In the embodiment of the invention, a plurality of antenna elements 401 are arranged in line with radiation directions arranged. The antenna elements 401 are provided at regular intervals along an arrangement direction R.

The antenna elements 401 are implemented by, for example, slot antennas, microstrip antennas, horn antennas, or reflector antennas. In the embodiment of the invention, the antenna device 400 has eight antenna elements 401 and eight phase shifters 20.

The transmission line 402 includes the branch 403, and branches off the high frequency signal inputted from an input part 404 into a plurality of signals by using the branch 403, and supplies the signals to the phase shifter-equipped antennas 405. The transmission line 402 is implemented in the same manner as the transmission line 262.

The high frequency transceiver 409 may include the high frequency transceiver 280 in the foregoing embodiment, the high frequency transceiver 280 having no phase shifter, or a known high frequency transceiver which supplies a high frequency signal to the array antenna 399, and receives a high frequency signal received by the array antenna 399.

The phase shifter 20 is provided between the transmission line 402 and the antenna element 401 of each of the phase shifter-equipped antennas 405. A high frequency signal propagating in the transmission line 402 passes through the dielectric part 22 of the phase shifter 20 and is then supplied to the antenna element 401. The phase of electric wave radiated from the antenna element is adjusted by shifting the phase of the high frequency signal by using the phase shifter 20. Then, as shown in FIG. 39, if the phases of electric waves radiated from adjacent antenna elements 401 are shifted by Δϕ as an equivalent phase plane moves from a first direction R1 of the arrangement direction R toward a second direction R2, the direction of a radiating beam 406 can be inclined from the front surface by an angle θ in the first direction R1 or the second direction R2 of the arrangement direction R.

The phase shifter 20 is small in size and operable at a low voltage, and thus there is no case where the antenna device 400 is increased in size. The array antenna 399 includes the phase shifter 20, and thus the direction of radiating beam can be changed. Therefore, the direction of radiating beam can be changed without mechanically operating the antenna elements 401, and thus convenience can be improved.

The direction of radiating beam can be easily changed without increasing the size of the radar device 400. Therefore, a convenient radar device can be achieved.

In the radar device 400, instead of the phase shifter 20, the phase shifter 30 or one of the phase shifters in the foregoing embodiments may be used.

A high frequency switch according to an embodiment of the invention has the same configuration as a phase shifter having cutoff characteristic from among the phase shifters of the foregoing embodiments, that is, any one of the phase shifters 20, 30, 40, 50, 60, 130, 140, 150, 160, and 170. Hereinafter, the "high frequency switch" is simply referred to as "switch". In such a switch, by applying a voltage to the first and second electrodes 24a and 24b, it is possible to change the cutoff frequency in the dielectric part 22.

The voltage application unit 19 applies an AC voltage or a DC voltage of a frequency lower than the frequency of the propagating electromagnetic wave to the first and second electrodes 24a and 24b. If the voltage application unit 19 applies a voltage to the first and second electrodes 24a and 24b, the dielectric part 22 becomes small in dielectric constant, and accordingly, the cutoff frequency of the switch is increased. When the voltage application unit 19 does not apply a voltage to the first and second electrodes 24a and 24b, the switch is configured such that the cutoff frequency of the switch becomes lower than the frequency (usable frequency) of the propagating electromagnetic wave. The voltage application unit 19 can apply a voltage to the first and second electrodes 24a and 24b such that the cutoff frequency of the switch becomes equal to or more than the usable frequency. Therefore, the switch can be switched between a propagation state where the cutoff frequency becomes lower than the frequency of electromagnetic wave propagating along the dielectric part 22 by the voltage application unit 19, and a cutoff state where the cutoff frequency becomes higher than the frequency of electromagnetic wave propagating along the dielectric part 22 by the voltage application unit 19. In the embodiment of the invention, the usable frequency is constant, and accordingly the switching enables an ON/OFF operation.

The switch having the above configuration can be switched in accordance with an electric field applied to the dielectric part 22 between the propagation state where the cutoff frequency in the dielectric part 22 becomes lower than the frequency of electromagnetic wave propagating along the dielectric part 22, and the cutoff state where the cutoff frequency becomes higher than the frequency of electromagnetic wave. Therefore, by changing the voltage applied to the first and second electrodes 24a and 24b, the switch can be easily switched between the propagation state and the cutoff state. In an OFF state, the switch is set in the cutoff state, and accordingly a high ON/OFF ratio can be inherently obtained. In addition, since no mechanical driving portion is provided, a high frequency switch having excellent durability and high reliability can be implemented. With this configuration, a switch that can change the cutoff frequency at a low voltage can be achieved. With the connection structure, the high frequency signal of the LSE mode can be favorably extracted to the plane guide. Therefore, a high frequency switch that can be favorably mounted on a planar circuit board can be achieved.

Even though a voltage to be applied to the first and second electrodes 24a and 24b in order to apply an electric field to the dielectric part 22 is made to be small, an electric field with large electric field strength can be applied to the variable part. In addition, even though the line length of the dielectric part 22 is made short, a high ON/OFF ratio that enables the cutoff state to achieve the OFF state can be obtained. Therefore, a small and low-voltage operable switch can be achieved. Furthermore, since no mechanical driving portion is provided, a switch having excellent durability and high reliability can be achieved.

An attenuator according to an embodiment of the invention has the same configuration as one of the phase shifters 20, 30, 40, 50, 60, 130, 140, 150, 160, and 170 in the foregoing embodiments. In such an attenuator, the cutoff frequency in the dielectric part 22 is changed by applying a voltage to the first and second electrodes 24a and 24b, and thus propagation characteristics can be changed. By changing the propagation characteristics in the dielectric part 22 in accordance with the electric field applied to the dielectric part 22, the high frequency signal can be attenuated. With the connection structure, the high frequency signal of the LSE mode can be favorably extracted to the plane guide. Therefore, an attenuator that can be favorably mounted on a planar circuit board can be achieved. The attenuator is formed such that, similarly to the phase shifter, when the cutoff frequency is fc and the usable frequency is f, the condition $1.03 < f/fc < 1.5$, and preferably the condition $1.03 < f/fc < 1.2$ is satisfied. In such an attenuator, even though a voltage to be applied to the first and second electrodes 24a and 24b is made to be small, an electric field with large electric field strength is applied to the variable part. In addition, since attenuation characteristics near the cutoff frequency are used, even though the line length of the transmission line is made short, electromagnetic wave can be sufficiently attenuated. Therefore, a small and low-voltage operable attenuator can be achieved. Furthermore, since no mechanical driving portion is provided, an attenuator having excellent durability and high reliability can be achieved.

Figure 40:
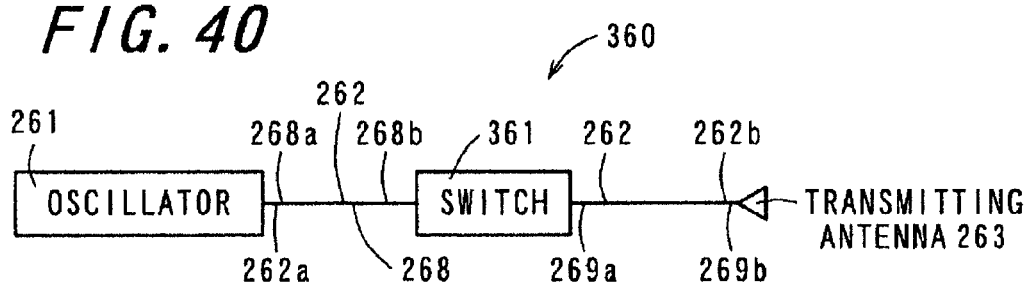
FIG. 40 is a schematic view showing the configuration of a high frequency transmitter 360 according to an embodiment of the invention.

FIG. 40 is a schematic view showing the configuration of a high frequency transmitter 360 according to an embodiment of the invention. The high frequency transmitter 360 is provided with, instead of the phase shifter 20 of the high frequency transmitter 260 shown in FIG. 36, a high frequency switch 361 with no stub 264 provided. The same parts are represented by the same reference numerals, and descriptions thereof will be omitted. The switch 361 has the same configuration as one of the phase shifters in the foregoing embodiments.

The switch 361 is inserted into the transmission line 262 through the microstrip guide 231 or the strip guide 71. The switch 361, when set in the propagation state, allows to be transmitted the high frequency signal to be transmitted to the transmission line 262, and, when set in the cutoff state, allows to be cut off the high frequency signal to be transmitted to the transmission line 262.

When the switch 361 is set in the propagation state, the high frequency signal generated by the high frequency oscillator 261 is transmitted to the transmission line 262, passes through the dielectric part 22 of the switch 361 to be then supplied to the transmitting antenna 263, and is radiated as electric wave. When the switch 361 is set in the cutoff state, the high frequency signal generated by the high frequency oscillator 261 does not transmit the switch 361, and is not transmitted to the transmitting antenna 263. By switching the switch 361 between the propagation state and the cutoff state, pulse signal wave can be radiated from the transmitting antenna 263. By using a high frequency switch that can obtain a large ON/OFF ratio, and has excellent durability and high reliability, the reliable frequency transmitter 360 can be achieved. If the voltage application unit 19 applies a voltage to the switch 361 on the basis of predetermined information to turn on/off the switch 361, electric wave corresponding to the predetermined information can be radiated from the transmitting antenna 263.

In the high frequency transmitter 360, the transmission line 262 may be implemented by, instead of a microstrip guide or a strip guide, a coplanar guide, a ground-equipped coplanar guide, a slot guide, a waveguide tube, or a dielectric waveguide tube.

Figure 41:
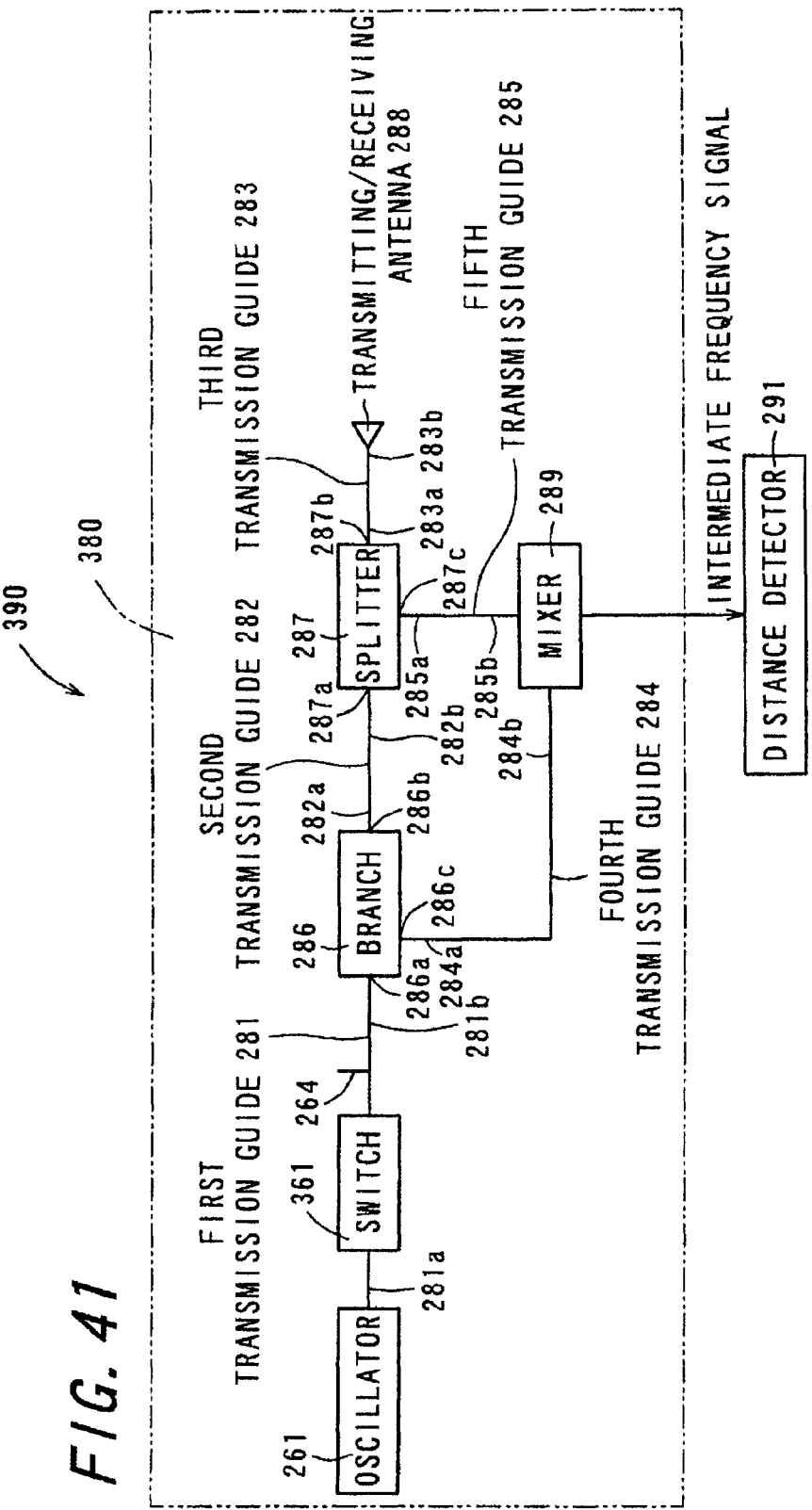
FIG. 41 is a schematic view showing the configuration of a radar device 390 including a high frequency transceiver 380 according to another embodiment of the invention.

FIG. 41 is a schematic view showing the configuration of a radar device 390 including a high frequency transceiver 380 according to another embodiment of the invention. The high frequency transceiver 380 is provided with, instead of the phase shifter 20 of the high frequency transceiver 280 shown in FIG. 38, a high frequency switch 361. The same parts are represented by the same reference numerals, and descriptions thereof will be omitted.

If the switch 361 inserted into the first transmission line 281 is set in the propagation state, the high frequency signal generated by the high frequency oscillator 261 is transmitted to the first transmission line 281 to be then supplied to the first terminal 286a of the branch 286, and is supplied from the second terminal 286b of the branch 286 to the second transmission line 282. Next, the high frequency signal is supplied to the fourth terminal 287a of the splitter 287, is supplied from the fifth terminal 287b of the splitter 287 to the third transmission line 283, and is radiated from the transmitting/receiving antenna 288. If the switch 361 inserted into the first transmission line 281 is set in the cutoff state, the high frequency signal generated by the high frequency oscillator 261 does not transmit the switch 361 to be then cut off and not radiated from the transmitting/receiving antenna 288. By switching the switch 361 between the propagation state and the cutoff state, pulse signal wave can be radiated from the transmitting/receiving antenna 288. By using the switch 361 that can obtain a large ON/OFF ratio, and has excellent durability and high reliability, a reliable high frequency transceiver can be achieved. In this embodiment, the switch 361 is inserted into the first transmission line 281, but in yet another embodiment of the invention, the switch 361 may be inserted into at least one of the first to third transmission lines 281 to 283. With this configuration, by setting all the switches 361 inserted into one or more of the first to third transmission lines 281 to 283 in the propagation state and setting one of the switches 361 inserted into one or more of the first to third transmission lines 281 to 283 in the cutoff state, pulse signal wave can be radiated from the transmitting/receiving antenna 288. Therefore, the same effects as the radar device can be obtained.

A radar device according to yet another embodiment of the invention, the branch 286 constituting the high frequency transceiver 280 in the radar devices of the foregoing embodiments may include two switches 361.

Figure 42:
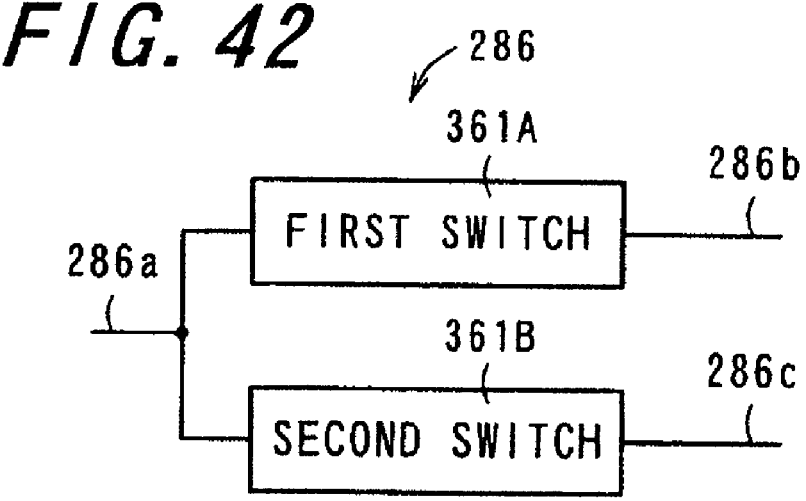
FIG. 42 is a schematic view showing the configuration of a branch 286 including switches 361.

FIG. 42 is a schematic view showing the configuration of a branch 286 including switches 361. The two switches 361 are referred to as a first switch 361A and a second switch 361B. If the first switch 361A is set in the propagation state, a high frequency signal is transmitted between the first terminal 286a and the second terminal 286b, and if it is set in the cutoff state, a high frequency signal is cut off between the first terminal 286a and the second terminal 286b. If the second switch 361B is set in the propagation state, a high frequency signal is transmitted between the first terminal 286a and the third terminal 286c, and if it is set in the cutoff state, a high frequency signal is cut off between the first terminal 286a and the third terminal 286c. The first end portions of the first and second switches 361A and 361B in the propagation direction X of the electromagnetic wave are connected with each other, and form the first terminal 286a. The second end portion of the first switch 361A in the propagation direction X of the electromagnetic wave forms the second terminal 386. The second end portion of the second switch 361B in the propagation direction X of the electromagnetic wave forms the third terminal 386.

A control signal is supplied from a control unit (not shown) to the first and second switches 361A and 361B. On the basis of the control signal, when the first switch 361A is set in the propagation state, the second switch 361B is set in the cutoff state, and when the first switch 361A is set in the cutoff state, the second switch 361B is set in the propagation state. Therefore, the high frequency signal inputted from the first terminal 286a can be selectively outputted from the second and third terminal 286b and 286c. The radar device 390 is implemented by a pulse radar. The control unit controls the first and second switches 361A and 361B to connect the first terminal 286a and the second terminal 286b, such that a pulsed high frequency signal is outputted from the second terminal 286b. Thereafter, the control unit controls the first and second switches 361A and 361B to connect the first terminal 286a and the third terminal 286c, such that a high frequency signal is outputted from the third terminal 286c. By configuring the branch 286 to include the switch 361, which can obtain a large ON/OFF ratio, and has excellent durability and high reliability, a reliable high frequency transceiver can be achieved.

In a radar device according to yet another embodiment of the invention, the splitter 287 constituting the high frequency transceiver 380 in the radar devices of the foregoing embodiments may include two switches 361.

Figure 43:
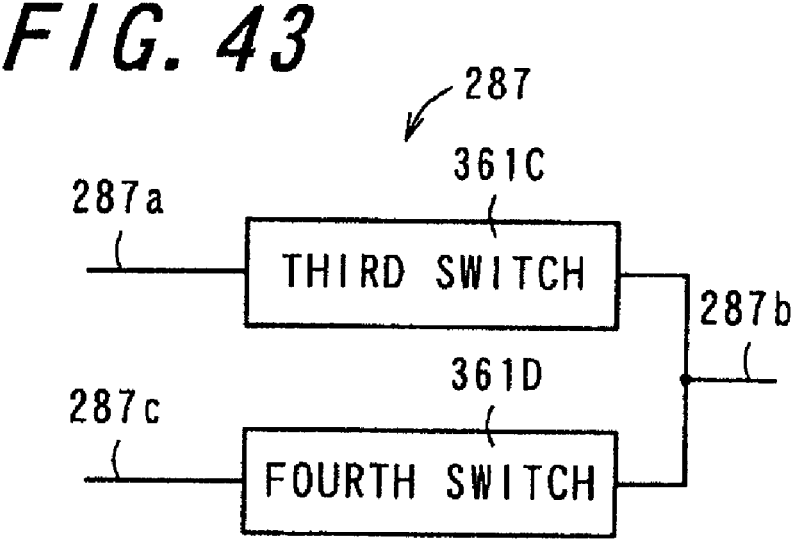
FIG. 43 is a schematic view showing the configuration of a splitter 287 including switches 361.

FIG. 43 is a schematic view showing the configuration of a splitter 287 including switches 361. The splitter 287 includes two switches 361. The two switches 361 are referred to as a third switch 361C and a fourth switch 361D, respectively. If the third switch 361C is set in the propagation state, the high frequency signal is transmitted between the fourth terminal 287a and the fifth terminal 287b, and if it is set in the cutoff state, a high frequency signal is cut off between the fourth terminal 287a and the fifth terminal 287b. If the fourth switch 361D is set in the propagation state, a high frequency signal is transmitted between the fifth terminal 287b and the sixth terminal 287c, and if it is set in the cutoff state, a high frequency signal is cut off between the fifth terminal 287b and the sixth terminal 287c. The first end portion third switch 361C in the propagation direction X of the electromagnetic wave forms the fourth terminal 287a. The second end portions of the third and fourth switches 361C and 361D in the propagation direction X of the electromagnetic wave are connected in common, and form the fifth terminal 287b. The first end portion of the fourth switch 361D in the propagation direction X of the electromagnetic wave forms the sixth terminal 287c.

A control signal is supplied from a control unit (not shown) to the third and fourth switches 361C and 361D. On the basis of the control signal, when the third switch 361C is set in the propagation state, the fourth switch 361D is set in the cutoff state, and when the third switch 361C is set in the cutoff state, the fourth switch 361D is set in the propagation state. Therefore, a high frequency signal inputted from the first terminal 287a can be outputted from the second terminal 287b, and a high frequency signal inputted from the second terminal 287b can be outputted from the third terminal 287c. The control unit controls the third and fourth switches 361C and 361D to connect the first terminal 287a and the second terminal 287b, such that a pulsed high frequency signal is transmitted to the transmitting/receiving antenna 288. Thereafter, the control unit controls the third and fourth switches 361C and 361D to connect the second terminal 287b and the third terminal 287c, such that a high frequency signal received by the transmitting/receiving antenna 288 is outputted from the third terminal 286c. The control unit controls the first to fourth switches 361A to 361D such that the first and third switches 361A and 361C are set in the propagation state, and the second and fourth switches 361B and 361D are set in the cutoff state, or such that the first and third switches 361A and 361C are set in the cutoff state, and the second and fourth switches 361B and 361D are set in the propagation state. By configuring the splitter 287 to include the switch 361, which can obtain a large ON/OFF ratio, and has excellent durability and high reliability, a reliable high frequency transceiver can be achieved.

According to yet another embodiment of the invention, a high frequency transceiver may be provided with, instead of the phase shifter 20 in the high frequency transceiver 280 of the embodiment shown in FIG. 38, the above-described attenuator. By inserting the attenuator into the first transmission line 281 and changing the amplitude of a high frequency signal, amplitude modulation can be made. Further, by adjusting a change in transmission output (a high frequency signal to be transmitted) and intermediate signal due to a change in frequency of the high frequency signal and a change in temperature, a stable high frequency transceiver of little signal change can be achieved. As described above, the attenuator can be small in size and operable at a low voltage. Therefore, even though the attenuator is provided, a high frequency transceiver can be small in size, and the configuration for applying a voltage to the attenuator can be prevented from being complicated. Alternatively, a high frequency transceiver may include an attenuator that is inserted into at least one of the first to fifth transmission lines 281, 282, 283, 284, and 285. In this case, the same effects can also be obtained.

According to yet another embodiment of the invention, a high frequency transceiver may be formed by combining the high frequency transceivers of the foregoing embodiments. For example, two or more of a phase shifter, a switch, and an attenuator may be inserted into the transmission line. Further, a phase shifter may be provided in one of the first to fifth transmission lines 281 to 285, a switch may be provided in one of the first to fifth transmission lines 281 to 285, and an attenuator may be provided in one of the first to fifth transmission lines 281 to 285.

In the foregoing embodiments, the variable part may be a piezoelectric element whose dimension is changed depending on an applied electric field. By changing the dimension of the piezoelectric element in the propagation direction of the electromagnetic wave, that is, the thickness of the piezoelectric element in the propagation direction, depending on the applied electric field, it is possible to change the phase of electromagnetic wave propagating along the dielectric part including the variable part. Therefore, the same effects as the foregoing embodiments can be obtained. The piezoelectric element is made of, for example, crystal, zinc oxide, aluminum nitride, $Pb(Zr,Ti)O_3$, $BaTiO_3$, $LiNbO_3$, or SbSI.

The phase shifter, the switch, and the attenuator in the foregoing embodiments are dielectric waveguide devices or dielectric waveguide tube devices. It should be noted that the invention is not limited to the foregoing embodiments, but various modifications and changes may be made within the scope without departing from the subject matter of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. A dielectric waveguide device comprising:
   a transmission line comprising a dielectric part including a variable part, which varies in at least one of a dielectric constant and a dimension of the variable part in accordance with an applied electric field, and that is configured to propagate an electromagnetic wave; and
   an electrode thinner than a skin depth for the frequency of the electromagnetic wave propagating along the transmission line, and that is embedded in the dielectric part, the electrode configured to apply the electric field to the variable part.

2. The dielectric waveguide device of claim 1, wherein the dielectric part further comprises second dielectric parts between which the variable part is sandwiched and which have a lower dielectric constant than the variable part,
   wherein the transmission line further comprises a pair of plate conductor parts between which the dielectric part is sandwiched in a direction perpendicular to a lamination direction of the variable part and the second dielectric parts, and a propagation direction of electromagnetic wave propagating along the transmission line, and
   wherein the electrode is between the variable part and the second dielectric parts.

3. The dielectric waveguide device of claim 1, further comprising:
   a plurality of electrodes embedded in the variable part at predetermined intervals in the direction perpendicular to the lamination direction of the variable part and the plate conductor part, and the propagation direction of the electromagnetic wave propagating along the transmission line,
   wherein the transmission line has a pair of plate conductor parts between which the dielectric part is sandwiched, and adjacent electrodes are connected to a different plate conductor part out of the pair of plate conductor parts.

4. The dielectric waveguide device of claim 3, wherein the dielectric part further comprises second dielectric parts that have a dielectric constant lower than the dielectric constant of the variable part, and between which the variable part is sandwiched in a direction perpendicular to a lamination direction of the variable part and the plate conductor parts, and the propagation direction of the electromagnetic wave propagating along the transmission line.

5. The dielectric waveguide device of claim 2 or 4, wherein an interval between the pair of plate conductor parts is half or less of the wavelength of electromagnetic wave propagating along the second dielectric parts.

6. A high frequency switch comprising:
the dielectric waveguide device of claim 1,
the transmission line having cutoff characteristics, the high frequency switch being operable to be switched between a propagation state in which the cutoff frequency in the transmission line becomes lower than the frequency of electromagnetic wave propagating along the transmission line, and a cutoff state in which the cutoff frequency becomes higher than the frequency of electromagnetic wave by varying at least one of dielectric constant and dimension of the variable part in accordance with the applied electric field.

7. A high frequency transmitter comprising:
a high frequency oscillator that generates a high frequency signal;
a high frequency transmission line that is connected to the high frequency oscillator, and transmits the high frequency signal from the high frequency oscillator;
an antenna that is connected to the high frequency transmission line, and radiates the high frequency signal; and
the high frequency switch of claim 6 that is inserted into the high frequency transmission line, wherein
the high frequency switch allows to be transmitted the high frequency signal to be transmitted along the high frequency transmission line when the high frequency switch is set in the propagation state, and allows to be cut off the high frequency signal to be transmitted along the high frequency transmission line when the high frequency switch is set in the cutoff state.

8. A high frequency transceiver comprising:
a high frequency oscillator that generates a high frequency signal;
a first high frequency transmission line that is connected to the high frequency oscillator, and transmits the high frequency signal;
a branch that has first, second and third terminals, and selectively outputs to one of the second terminal and the third terminal the high frequency signal which is supplied to the first terminal connected to the first high frequency transmission line;
a second high frequency transmission line that is connected to the second terminal, and transmits a high frequency signal supplied from the second terminal;
a splitter that has fourth, fifth and sixth terminals, outputs to the fifth terminal the high frequency signal which is supplied to the fourth terminal through the second high frequency transmission line, and outputs to the sixth terminal a high frequency signal, which is supplied to the fifth terminal;
a third high frequency transmission line that is connected to the fifth terminal, transmits the high frequency signal outputted from the fifth terminal, and transmits the high frequency signal to the fifth terminal;
an antenna that is connected to the third high frequency transmission line, and radiates and receives the high frequency signal;
a fourth high frequency transmission line that is connected to the third terminal, and transmits a high frequency signal outputted from the third terminal;
a fifth high frequency transmission line that is connected to the sixth terminal, and transmits the high frequency signal outputted from the sixth terminal; and
a mixer that is connected to the fourth and fifth high frequency transmission lines, and mixes the high frequency signals supplied from the fourth and fifth high frequency transmission lines to output an intermediate frequency signal,
the branch including two pieces of the high frequency switches of claim 6, a first high frequency switch allowing the high frequency signal to be transmitted between the first terminal and the second terminal when the first frequency switch is set in the propagation state, and allowing the high frequency signal to be cut off between the first terminal and the second terminal when the first frequency switch is set in the cutoff state, and a second high frequency switch allowing the high frequency signal to be transmitted between the first terminal and the third terminal when the second frequency switch is set in the propagation state, and allowing the high frequency signal to be cut off between the first terminal and the third terminal when the second frequency switch is set in the cutoff state.

9. The high frequency transceiver of claim 8, wherein the splitter is formed by a hybrid circuit or is formed by a circulator.

10. A radar device comprising:
the high frequency transceiver of claim 8; and
a distance detector that detects a distance from the high frequency transceiver to an object to be detected on the basis of the intermediate frequency signal from the high frequency transceiver.

11. A high frequency transceiver comprising:
a high frequency oscillator that generates a high frequency signal;
a first high frequency transmission line that is connected to the high frequency oscillator, and transmits the high frequency signal;
a branch that has first, second, and third terminals, and selectively outputs to one of the second terminal and the third terminal the high frequency signal which is supplied to the first terminal connected to the first high frequency transmission line;
a second high frequency transmission line that is connected to the second terminal, and transmits a high frequency signal supplied from the second terminal;
a splitter that has fourth, fifth, and sixth terminals, outputs to the fifth terminal the high frequency signal which is supplied to the fourth terminal through the second high frequency transmission line, and outputs to the sixth terminal a high frequency signal which is supplied to the fifth terminal;
a third high frequency transmission line that is connected to the fifth terminal, transmits the high frequency signal outputted from the fifth terminal, and transmits the high frequency signal to the fifth terminal;
an antenna that is connected to the third high frequency transmission line, and radiates and receives the high frequency signal;

a fourth high frequency transmission line that is connected to the third terminal, and transmits a high frequency signal outputted from the third terminal;
a fifth high frequency transmission line that is connected to the sixth terminal, and transmits the high frequency signal outputted from the sixth terminal;
a mixer that is connected to the fourth and fifth high frequency transmission lines, and mixes the high frequency signals supplied from the fourth and fifth high frequency transmission lines to output an intermediate frequency signal; and
the high frequency switch of claim 6 that is inserted into at least one of the first to third transmission lines such that the high frequency signal passes through the dielectric part in the propagation state.

12. The high frequency transceiver of claim 11, wherein the splitter is formed by a hybrid circuit or is formed by a circulator.

13. A radar device comprising:
the high frequency transceiver of claim 11;
and a distance detector that detects a distance from the high frequency transceiver to an object to be detected on the basis of the intermediate frequency signal from the high frequency transceiver.

14. An attenuator comprising:
the dielectric waveguide device of claim 1,
the attenuator attenuating electromagnetic wave propagating along the transmission line by varying at least one of dielectric constant and dimension of the variable part in accordance with the applied electric field.

15. A high frequency transceiver comprising:
a high frequency oscillator that generates a high frequency signal;
a first high frequency transmission line that is connected to the high frequency oscillator, and transmits the high frequency signal;
a branch that has first, second, and third terminals, and selectively outputs to one of the second terminal and the third terminal the high frequency signal which is supplied to the first terminal connected to the first high frequency transmission line;
a second high frequency transmission line that is connected to the second terminal, and transmits a high frequency signal supplied from the second terminal;
a splitter that has fourth, fifth, and sixth terminals outputs to the fifth terminal the high frequency signal which is supplied to the fourth terminal through the second high frequency transmission line, and outputs to the sixth terminal a high frequency signal which is supplied to the fifth terminal;
a third high frequency transmission line that is connected to the fifth terminal, transmits the high frequency signal outputted from the fifth terminal, and transmits the high frequency signal to the fifth terminal;
an antenna that is connected to the third high frequency transmission line, and radiates and receives the high frequency signal;
a fourth high frequency transmission line that is connected to the third terminal, and transmits a high frequency signal outputted from the third terminal;
a fifth high frequency transmission line that is connected to the sixth terminal, and transmits the high frequency signal outputted from the sixth terminal;
a mixer that is connected to the fourth and fifth high frequency transmission lines, and mixes the high frequency signals supplied from the fourth and fifth high frequency transmission lines to output an intermediate frequency signal; and
the attenuator of claim 14 that is inserted into at least one of the first to fifth high frequency transmission lines such that the high frequency signal passes through the dielectric part.

16. A radar device comprising:
the high frequency transceiver of claim 15;
and a distance detector that detects a distance from the high frequency transceiver to an object to be detected on the basis of the intermediate frequency signal from the high frequency transceiver.

17. A dielectric waveguide tube device comprising:
a dielectric part comprising a variable part, which varies in at least one of a dielectric constant and a dimension of the variable part in accordance with an applied electric field, and that propagates electromagnetic wave; and
a conductor part that comprises a pair of electrodes for applying the electric field to the variable part, and surrounds the dielectric part to form a waveguide tube.

18. A dielectric waveguide device comprising:
A dielectric part comprises
a first dielectric part including a variable park, which varies in at least one of dielectric constant and dimension of the variable part in accordance with an applied electric field, and
second dielectric parts, which have a dielectric constant lower than the first dielectric constant of the first dielectric part and between which the first dielectric part is sandwiched;
a pair of plate conductor parts between which the dielectric part is sandwiched in a direction perpendicular to a propagation direction of electromagnetic wave propagating along the dielectric part and a lamination direction of the first and second dielectric parts; and
a pair of electrodes between which the dielectric part is sandwiched in the lamination direction, and which are spaced from each other at an interval smaller than an interval between the pair of plate conductor parts, the electrodes configured to apply the electric field to the variable part.

19. The dielectric waveguide device of claim 18, wherein an interval between the pair of plate conductor parts is half or less of the wavelength of electromagnetic wave propagating along the second dielectric parts.

20. A phase shifter comprising:
the dielectric waveguide device of claim 1 or claim 18, or the dielectric waveguide tube device of claim 17,
the phase shifter changing the phase of the electromagnetic wave propagating along the transmission line by varying at least one of the dielectric constant and the dimension of the variable part in accordance with an applied electric field.

21. The phase shifter of claim 20, wherein a ratio of fc and f satisfies the condition $1.03 < f/fc < 1.5$, where fc is a cutoff frequency and f is the frequency of electromagnetic wave propagating along the dielectric waveguide in a case where a prescribed voltage is applied to the pair of electrodes.

22. A high frequency transmitter comprising:
a high frequency oscillator that generates a high frequency signal;
a high frequency transmission line that is connected to the high frequency oscillator, and transmits the high frequency signal from the high frequency oscillator;
an antenna that is connected to the high frequency transmission line, and radiates the high frequency signal;

the phase shifter of claim 20 that is inserted into the high frequency transmission line such that the high frequency signal passes through the dielectric part; and a stub that is provided in the high frequency transmission line on at least one of upstream and downstream sides of the phase shifter in a transmission direction of the high frequency signal.

23. A high frequency receiver comprising:

an antenna that receives a high frequency signal;

a high frequency transmission line that is connected to the antenna, and transmits the high frequency signal received by the antenna;

a high frequency detector that is connected to the high frequency transmission line, and detects the high frequency signal to be transmitted to the high frequency transmission line;

the phase shifter of claim 20 that is inserted into the high frequency transmission line such that the high frequency signal passes through the dielectric part; and a stub that is provided in the high frequency transmission line on at least one of upstream and downstream sides of the phase shifter in a transmission direction of the high frequency signal.

24. A high frequency transceiver comprising:

a high frequency oscillator that generates a high frequency signal;

a first high frequency transmission line that is connected to the high frequency oscillator, and transmits the high frequency signal;

a branch that has first, second and third terminals, and selectively outputs to one of the second terminal and the third terminal the high frequency signal which is supplied to the first terminal connected to the first high frequency transmission line;

a second high frequency transmission line that is connected to the second terminal, and transmits a high frequency signal from the second terminal;

a splitter that has fourth, fifth and sixth terminals, outputs to the fifth terminal the high frequency signal which is supplied to the fourth terminal through the second high frequency transmission line, and outputs to the sixth terminal a high frequency signal which is supplied to the fifth terminal;

a third high frequency transmission line that is connected to the fifth terminal, transmits the high frequency signal outputted from the fifth terminal, and transmits the high frequency signal to the fifth terminal;

an antenna that is connected to the third high frequency transmission line, and radiates and receives the high frequency signal;

a fourth high frequency transmission line that is connected to the third terminal, and transmits a high frequency signal outputted from the third terminal;

a fifth high frequency transmission line that is connected to the sixth terminal, and transmits the high frequency signal outputted from the sixth terminal;

a mixer that is connected to the fourth and fifth high frequency transmission lines, and mixes the high frequency signals supplied from the fourth and fifth high frequency transmission lines to output an intermediate frequency signal; and the phase shifter of claim 20 that is inserted into at least one of the first to fifth high frequency transmission lines such that the high frequency signal passes through the dielectric part.

25. The high frequency transceiver of claim 24, wherein the splitter is formed by a hybrid circuit or is formed by a circulator.

26. A radar device comprising:

the high frequency transceiver of claim 24; and a distance detector that detects a distance from the high frequency transceiver to an object to be detected on the basis of the intermediate frequency signal from the high frequency transceiver.

27. An array antenna comprising:

a plurality of phase shifter-equipped antennas that are arranged in line, each antenna having an antenna element and the phase shifter of claim 20.

28. A radar device comprising:

the array antenna of claim 27; and a high frequency transceiver that is connected to the array antenna, supplies a high frequency signal to the array antenna, and receives a high frequency signal trapped by the array antenna.

29. A dielectric waveguide device comprising:

a transmission line comprising a dielectric part including a variable part which varies at least one of a dielectric constant and a dimension of the variable part in accordance with an applied electric field, and that is configure to propagate an electromagnetic wave; and an electrode thinner than a skin depth for the frequency of the electromagnetic wave propagating along the transmission line, and that is embedded in the dielectric part, the electrode configure to apply the electric field to the variable part, wherein a ratio of fc and f satisfies the condition $1.03<f/fc<1.5$, where fc is a cutoff frequency and f is the frequency of electromagnetic wave propagating along the dielectric waveguide in a case where a prescribed voltage is applied to the pair of electrodes.

30. A dielectric waveguide tube device comprising:

a dielectric part comprising a variable part which varies at least one of a dielectric constant and a dimension of the variable part in accordance with an applied electric field, and that is configured to propagate an electromagnetic wave; and a conductor part comprising a pair of electrodes configured to apply the electric field to the variable part, and surrounds the dielectric part to form a waveguide tube, wherein the dielectric part further comprises second dielectric parts between which the variable part is sandwiched and which have a lower dielectric constant than the variable part, and wherein the electrode is between the variable part and the second dielectric parts.

* * * * *

UNITED STATES PATENT AND TRADEMARK OFFICE
CERTIFICATE OF CORRECTION

PATENT NO. : 8,013,694 B2  
APPLICATION NO. : 12/295586  
DATED : September 6, 2011  
INVENTOR(S) : Hiramatsu et al.

It is certified that error appears in the above-identified patent and that said Letters Patent is hereby corrected as shown below:

On the Title Page, at line number 75, inventor name "Djuniadi A. Sagala" should be amended to "Djuniadi Arifin SAGALA".

Signed and Sealed this
Seventeenth Day of January, 2012

David J. Kappos
*Director of the United States Patent and Trademark Office*